United States Patent [19]

Andersen et al.

[11] Patent Number: 5,631,053

[45] Date of Patent: *May 20, 1997

[54] HINGED ARTICLES HAVING AN INORGANICALLY FILLED MATRIX

[75] Inventors: Per J. Andersen; Simon K. Hodson, both of Santa Barbara, Calif.

[73] Assignee: E. Khashoggi Industries, Santa Barbara, Calif.

[*] Notice: The term of this patent shall not extend beyond the expiration date of Pat. No. 5,580,624.

[21] Appl. No.: 472,554

[22] Filed: Jun. 7, 1995

Related U.S. Application Data

[60] Division of Ser. No. 192,965, Feb. 7, 1994, which is a continuation-in-part of Ser. No. 163,681, Dec. 6, 1993, abandoned, and Ser. No. 152,354, Nov. 19, 1993, Pat. No. 5,508,072, said Ser. No. 163,681, is a continuation-in-part of Ser. No. 101,500, Aug. 3, 1993, Ser. No. 95,662, Jul. 21, 1993, Pat. No. 5,385,764, Ser. No. 19,151, Feb. 17, 1993, Pat. No. 5,453,310, and Ser. No. 929,898, Aug. 11, 1992, abandoned, said Ser. No. 152,354, is a continuation-in-part of Ser. No. 101,500, Aug. 3, 1993, Ser. No. 95,662, Jul. 21, 1993, Pat. No. 5,385,764, and Ser. No. 982,383, Nov. 25, 1992, abandoned, said Ser. No. 95,662, is a continuation-in-part of Ser. No. 929,898, Aug. 11, 1992, abandoned, said Ser. No. 19,151, is a continuation-in-part of Ser. No. 929, 898, Aug. 11, 1992, abandoned, said Ser. No. 982,383, is a continuation-in-part of Ser. No. 929,898, Aug. 11, 1992, abandoned.

[51] Int. Cl.[6] .............................. B32B 5/16; B32B 19/02; B32B 25/02; E05F 1/08

[52] U.S. Cl. ........................... 428/36.4; 16/221; 16/277; 16/385; 206/524.7; 206/562; 428/35.7; 428/35.8; 428/159; 428/168; 428/182; 428/339; 428/532

[58] Field of Search ........................ 16/221, 277, 385; 206/524.7, 562; 428/159, 168, 182, 233, 317.9, 339, 532, 36.4, 35.7, 35.8

[56] References Cited

U.S. PATENT DOCUMENTS 109,669  11/1870  Rowland .

| 128,980 | 7/1872 | Rowland . |
|---|---|---|
| 591,168 | 10/1897 | Heinzerling . |
| 882,538 | 3/1908 | Sargent . |
| 1,223,834 | 4/1917 | Sanger . |
| 1,234,692 | 7/1917 | Poznanski . |
| 1,874,974 | 8/1932 | Hammenecker . |

(List continued on next page.)

FOREIGN PATENT DOCUMENTS

| 619559 | 5/1961 | Canada . |
|---|---|---|
| 627550 | 9/1961 | Canada . |
| 0003481 | 8/1979 | European Pat. Off. . |
| 0006390A1 | 1/1980 | European Pat. Off. . |

(List continued on next page.)

OTHER PUBLICATIONS

Andersen, *Control and Monitoring of Concrete Production A Study of Particle Packing and Rheology*, The Danish Academy of Technical Sciences (1990).

Andersen, *Effect of Organic Superplasticizing Admixtures and Their Components on Zeta Potential and Related Properties of Cement Materials*, Pennsylvania State University (1987).

(List continued on next page.)

*Primary Examiner*—Marion E. McCamish
*Assistant Examiner*—Blaine R. Copenheaver
*Attorney, Agent, or Firm*—Workman, Nydegger & Seeley

[57]  ABSTRACT

A hinge for use in inorganically filled composite materials is provided. The hinge has an inorganically filled structural matrix comprising a water-dispersable organic polymer binder, an aggregate material, and a fibrous material. The hinge allows inorganically filled materials to be bent along a line without breakage of the material. The hinge is preferably formed by scoring a formed sheet of inorganically filled material. The hinge is particularly useful in containers that require bending of various container parts, such as in food containers and boxes made from inorganically filled materials.

104 Claims, 12 Drawing Sheets

U.S. PATENT DOCUMENTS

| | | |
|---|---|---|
| 1,932,150 | 10/1933 | Tada . |
| 1,954,117 | 4/1934 | Caldwell . |
| 1,965,538 | 7/1934 | Stewart . |
| 2,045,099 | 6/1936 | Pond . |
| 2,170,102 | 8/1939 | Thompson . |
| 2,205,735 | 6/1940 | Scherer, Jr. . |
| 2,262,458 | 11/1941 | Bastioli et al. . |
| 2,307,629 | 1/1943 | MacIldowie . |
| 2,432,971 | 12/1947 | Ruthman et al. . |
| 2,496,895 | 2/1950 | Staley . |
| 2,549,507 | 4/1951 | Morgan et al. . |
| 2,629,667 | 2/1953 | Kaveler . |
| 2,700,615 | 1/1955 | Heismer . |
| 2,754,207 | 7/1956 | Schur et al. . |
| 2,793,957 | 5/1957 | Mangold et al. . |
| 2,820,713 | 1/1958 | Wagner . |
| 2,837,435 | 6/1958 | Miller et al. . |
| 2,917,778 | 12/1959 | Lyon et al. . |
| 2,943,013 | 6/1960 | Arledter . |
| 2,959,489 | 11/1960 | Wagner . |
| 2,968,561 | 1/1961 | Birnkrant . |
| 3,006,615 | 10/1961 | Mason, Jr. . |
| 3,007,222 | 11/1961 | Ragan . |
| 3,027,266 | 3/1962 | Wikne . |
| 3,030,258 | 4/1962 | Wagner . |
| 3,042,578 | 7/1962 | Denning . |
| 3,052,595 | 9/1962 | Pye . |
| 3,097,929 | 7/1963 | Ragan . |
| 3,117,014 | 1/1964 | Klug . |
| 3,149,986 | 9/1964 | Zelmanoff . |
| 3,169,877 | 2/1965 | Bartoli et al. . |
| 3,215,549 | 11/1965 | Ericson . |
| 3,253,978 | 5/1966 | Bodendorf et al. . |
| 3,305,613 | 2/1967 | Spence . |
| 3,306,961 | 2/1967 | Spence . |
| 3,356,779 | 12/1967 | Schulze . |
| 3,393,261 | 7/1968 | Herzig et al. . |
| 3,432,317 | 3/1969 | Kelly et al. . |
| 3,458,329 | 7/1969 | Owens et al. . |
| 3,468,993 | 9/1969 | Bierlich . |
| 3,470,005 | 9/1969 | Flachsenberg et al. . |
| 3,492,385 | 1/1970 | Simunic . |
| 3,520,707 | 7/1970 | Steinberg et al. . |
| 3,526,172 | 9/1970 | Stuart . |
| 3,558,070 | 1/1971 | Gabriels . |
| 3,579,366 | 5/1971 | Rehmard . |
| 3,622,393 | 11/1971 | Sherwood . |
| 3,683,760 | 8/1972 | Silva . |
| 3,689,294 | 9/1972 | Bramnauer . |
| 3,754,954 | 8/1973 | Gabriel et al. . |
| 3,759,729 | 9/1973 | Fahn . |
| 3,770,859 | 11/1973 | Bevan . |
| 3,806,571 | 4/1974 | Ronnmark et al. . |
| 3,819,389 | 6/1974 | Uchikawa et al. . |
| 3,824,107 | 7/1974 | Weiant . |
| 3,857,715 | 12/1974 | Humphrey . |
| 3,902,912 | 9/1975 | Wolf . |
| 3,904,341 | 9/1975 | Putti . |
| 3,914,359 | 10/1975 | Bevan . |
| 3,917,781 | 11/1975 | Gabriel et al. . |
| 3,927,163 | 12/1975 | Gabriel et al. . |
| 3,952,130 | 4/1976 | Nason . |
| 3,954,490 | 5/1976 | Cockram . |
| 3,968,004 | 7/1976 | Coffey et al. . |
| 3,989,534 | 11/1976 | Plungian et al. . |
| 3,998,651 | 12/1976 | Baudouin et al. . |
| 4,002,482 | 1/1977 | Coenen . |
| 4,017,321 | 4/1977 | Reighter . |
| 4,017,324 | 4/1977 | Eggers . |
| 4,028,454 | 6/1977 | Davidovits . |
| 4,040,851 | 8/1977 | Ziegler . |
| 4,043,862 | 8/1977 | Roberts . |
| 4,044,166 | 8/1977 | Koizumi . |
| 4,046,584 | 9/1977 | Snyder et al. . |
| 4,070,196 | 1/1978 | Kraak et al. . |
| 4,070,199 | 1/1978 | Downing et al. . |
| 4,073,658 | 2/1978 | Ohtani et al. . |
| 4,076,846 | 2/1978 | Nakatsuka et al. . |
| 4,077,809 | 3/1978 | Plunguian et al. . |
| 4,080,213 | 3/1978 | Mori et al. . |
| 4,084,980 | 4/1978 | Motoki . |
| 4,085,001 | 4/1978 | Fukuwatari et al. . |
| 4,089,691 | 5/1978 | Cummisford et al. . |
| 4,093,690 | 6/1978 | Murray . |
| 4,117,059 | 9/1978 | Murray . |
| 4,117,060 | 9/1978 | Murray . |
| 4,124,550 | 11/1978 | Kobayashi et al. . |
| 4,133,619 | 1/1979 | Wise . |
| 4,135,940 | 1/1979 | Peltier . |
| 4,149,550 | 4/1979 | Green et al. . |
| 4,157,998 | 6/1979 | Berntsson et al. . |
| 4,172,154 | 10/1979 | von Rymon Lipinski . |
| 4,185,923 | 1/1980 | Bouette et al. . |
| 4,188,231 | 2/1980 | Valore . |
| 4,190,454 | 2/1980 | Yamaguchi et al. . |
| 4,202,857 | 5/1980 | Lowe . |
| 4,209,336 | 6/1980 | Previte . |
| 4,210,490 | 7/1980 | Taylor . |
| 4,225,247 | 9/1980 | Hodson . |
| 4,225,357 | 9/1980 | Hodson . |
| 4,225,383 | 9/1980 | McReynolds . |
| 4,230,502 | 10/1980 | Lustig et al. . |
| 4,233,080 | 11/1980 | Koeppel . |
| 4,233,368 | 11/1980 | Baehr et al. . |
| 4,234,344 | 11/1980 | Tinsley et al. . |
| 4,239,716 | 12/1980 | Ishda et al. . |
| 4,244,781 | 1/1981 | Heckman . |
| 4,248,664 | 2/1981 | Atkinson et al. . |
| 4,249,991 | 2/1981 | Baes et al. . |
| 4,257,710 | 3/1981 | Delcoigne et al. . |
| 4,257,814 | 3/1981 | Kellet et al. . |
| 4,261,754 | 4/1981 | Krenchel et al. . |
| 4,264,367 | 4/1981 | Schutz . |
| 4,264,368 | 4/1981 | Schutz . |
| 4,266,713 | 5/1981 | Maroszek . |
| 4,269,657 | 5/1981 | Gomez et al. . |
| 4,271,228 | 6/1981 | Foster et al. . |
| 4,303,690 | 12/1981 | Haas, Sr. et al. . |
| 4,305,758 | 12/1981 | Powers et al. . |
| 4,306,059 | 12/1981 | Yokobayashi et al. . |
| 4,310,996 | 1/1982 | Mulvey et al. . |
| 4,313,997 | 2/1982 | Ruff et al. . |
| 4,326,891 | 4/1982 | Sadler . |
| 4,328,136 | 5/1982 | Blount . |
| 4,329,177 | 5/1982 | George . |
| 4,353,748 | 10/1982 | Birchall et al. . |
| 4,362,679 | 12/1982 | Malinowski . |
| 4,370,166 | 1/1983 | Powers et al. . |
| 4,373,957 | 2/1983 | Pedersen . |
| 4,373,992 | 2/1983 | Bondoc . |
| 4,377,440 | 3/1983 | Gasland . |
| 4,378,271 | 3/1983 | Hargreaves et al. . |
| 4,379,198 | 4/1983 | Jaeschke et al. . |
| 4,383,862 | 5/1983 | Dyson . |
| 4,394,930 | 7/1983 | Korpman . |
| 4,406,703 | 9/1983 | Guthrie et al. . |
| 4,410,571 | 10/1983 | Korpman . |
| 4,415,366 | 11/1983 | Copening . |
| 4,427,610 | 1/1984 | Murray . |
| 4,428,775 | 1/1984 | Johnson et al. . |
| 4,444,593 | 4/1984 | Schutz . |
| 4,445,970 | 5/1984 | Post et al. . |

| | | |
|---|---|---|
| 4,462,835 | 7/1984 | Car . |
| 4,470,877 | 9/1984 | Johnstone et al. . |
| 4,481,037 | 11/1984 | Beale et al. . |
| 4,487,657 | 12/1984 | Gomez . |
| 4,497,662 | 2/1985 | Chisholm et al. . |
| 4,504,315 | 3/1985 | Allemann et al. . |
| 4,508,595 | 4/1985 | Gasland . |
| 4,522,772 | 6/1985 | Bevan . |
| 4,524,828 | 6/1985 | Sabins et al. . |
| 4,529,653 | 7/1985 | Hargreaves et al. . |
| 4,529,662 | 7/1985 | Lancaster et al. . |
| 4,529,663 | 7/1985 | Lancaster et al. . |
| 4,533,393 | 8/1985 | Neuschaeffer et al. . |
| 4,533,581 | 8/1985 | Asaumi et al. . |
| 4,545,854 | 10/1985 | Gomez et al. . |
| 4,549,876 | 10/1985 | Baker et al. . |
| 4,549,930 | 10/1985 | Dessauer . |
| 4,551,384 | 11/1985 | Aston et al. . |
| 4,552,463 | 11/1985 | Hodson . |
| 4,562,218 | 12/1985 | Fornandel et al. . |
| 4,585,486 | 4/1986 | Fujita et al. . |
| 4,588,443 | 5/1986 | Bache . |
| 4,595,623 | 6/1986 | Du Pont et al. . |
| 4,613,627 | 9/1986 | Sherman et al. . |
| 4,623,150 | 11/1986 | Moehlman et al. . |
| 4,636,345 | 1/1987 | Jensen et al. . |
| 4,637,860 | 1/1987 | Harper et al. . |
| 4,640,715 | 2/1987 | Heitzmann et al. . |
| 4,642,137 | 2/1987 | Heitzman et al. . |
| 4,650,523 | 3/1987 | Kikuchi et al. . |
| 4,652,218 | 3/1987 | Fornandel et al. . |
| 4,655,981 | 4/1987 | Nielsen . |
| 4,673,438 | 6/1987 | Wittwer et al. . |
| 4,707,187 | 11/1987 | Tsuda et al. . |
| 4,707,221 | 11/1987 | Beer et al. . |
| 4,710,422 | 12/1987 | Fredenucci . |
| 4,711,669 | 12/1987 | Paul et al. . |
| 4,746,481 | 5/1988 | Schmidt . |
| 4,753,710 | 6/1988 | Langley et al. . |
| 4,754,589 | 7/1988 | Leth . |
| 4,755,494 | 7/1988 | Ruben . |
| 4,772,439 | 9/1988 | Trevino-Gonzalez . |
| 4,775,580 | 10/1988 | Dighton . |
| 4,784,693 | 11/1988 | Kirkland et al. . |
| 4,786,670 | 11/1988 | Tracy et al. . |
| 4,789,244 | 12/1988 | Dunton et al. . |
| 4,799,961 | 1/1989 | Friberg . |
| 4,814,012 | 3/1989 | Paul et al. . |
| 4,828,650 | 5/1989 | Wagle et al. . |
| 4,833,191 | 5/1989 | Bushway et al. . |
| 4,836,940 | 6/1989 | Alexander . |
| 4,842,649 | 6/1989 | Heitzman et al. . |
| 4,846,932 | 7/1989 | Karita et al. . |
| 4,861,649 | 8/1989 | Browne . |
| 4,863,655 | 9/1989 | Lacourse et al. . |
| 4,868,142 | 9/1989 | Waisala et al. . |
| 4,872,913 | 10/1989 | Dunton et al. . |
| 4,879,173 | 11/1989 | Randall . |
| 4,888,059 | 12/1989 | Yamaguchi et al. . |
| 4,889,428 | 12/1989 | Hodson . |
| 4,889,594 | 12/1989 | Gavelin . |
| 4,892,589 | 1/1990 | Kirkland et al. . |
| 4,892,590 | 1/1990 | Gill et al. . |
| 4,895,598 | 1/1990 | Hedberg et al. . |
| 4,912,069 | 3/1990 | Ruben . |
| 4,919,758 | 4/1990 | Wagle et al. . |
| 4,921,250 | 5/1990 | Ayers . |
| 4,923,665 | 5/1990 | Andersen et al. . |
| 4,925,530 | 5/1990 | Sinclair et al. . |
| 4,927,573 | 5/1990 | Alpar et al. . |
| 4,927,655 | 5/1990 | Ito . |
| 4,927,656 | 5/1990 | Ito . |
| 4,935,097 | 6/1990 | Tashiro et al. . |
| 4,939,192 | 7/1990 | t'Sas . |
| 4,941,922 | 7/1990 | Snyder . |
| 4,943,349 | 7/1990 | Gomez . |
| 4,944,595 | 7/1990 | Hodson . |
| 4,948,429 | 8/1990 | Arfaei . |
| 4,952,278 | 8/1990 | Gregory et al. . |
| 4,957,558 | 9/1990 | Ueda et al. . |
| 4,957,754 | 9/1990 | Munk et al. . |
| 4,963,309 | 10/1990 | Gohlisch et al. . |
| 4,963,603 | 10/1990 | Felegi, Jr. et al. . |
| 4,985,119 | 1/1991 | Vinson et al. . |
| 4,999,056 | 3/1991 | Rasmussen . |
| 5,017,268 | 5/1991 | Clitherow et al. . |
| 5,021,093 | 6/1991 | Beshay . |
| 5,030,282 | 7/1991 | Matsuhashi et al. . |
| 5,035,930 | 7/1991 | Lacourse et al. . |
| 5,039,003 | 8/1991 | Gordon et al. . |
| 5,039,378 | 8/1991 | Pommier et al. . |
| 5,039,560 | 8/1991 | Durgin et al. . |
| 5,043,196 | 8/1991 | Lacourse et al. . |
| 5,047,086 | 9/1991 | Hayakawa et al. . |
| 5,049,237 | 9/1991 | Bohm et al. . |
| 5,051,217 | 9/1991 | Alpar et al. . |
| 5,061,346 | 10/1991 | Taggart et al. . |
| 5,071,512 | 12/1991 | Bixler et al. . |
| 5,076,985 | 12/1991 | Koch et al. . |
| 5,082,500 | 1/1992 | Nachtman et al. . |
| 5,085,366 | 2/1992 | Durgin et al. . |
| 5,089,186 | 2/1992 | Moore et al. . |
| 5,095,054 | 3/1992 | Lay et al. . |
| 5,096,650 | 3/1992 | Renna . |
| 5,102,596 | 4/1992 | Lempfer et al. . |
| 5,104,487 | 4/1992 | Taggart et al. . |
| 5,104,669 | 4/1992 | Wolke et al. . |
| 5,106,423 | 4/1992 | Clarke . |
| 5,106,880 | 4/1992 | Miller et al. . |
| 5,108,677 | 4/1992 | Ayres . |
| 5,108,679 | 4/1992 | Rirsche et al. . |
| 5,110,413 | 5/1992 | Steer . |
| 5,122,231 | 6/1992 | Anderson . |
| 5,126,013 | 6/1992 | Wiker et al. . |
| 5,126,014 | 6/1992 | Chung . |
| 5,132,155 | 7/1992 | Singh et al. . |
| 5,134,179 | 7/1992 | Felegi, Jr. et al. . |
| 5,139,615 | 8/1992 | Conner et al. . |
| 5,141,797 | 8/1992 | Wheeler . |
| 5,153,037 | 10/1992 | Altieri . |
| 5,156,718 | 10/1992 | Neubert . |
| 5,160,368 | 11/1992 | Begovich . |
| 5,160,676 | 11/1992 | Singh et al. . |
| 5,167,894 | 12/1992 | Baumgarten . |
| 5,178,730 | 1/1993 | Bixler et al. . |
| 5,185,382 | 2/1993 | Neumann et al. . |
| 5,186,990 | 2/1993 | Starcevich . |
| 5,194,206 | 3/1993 | Koch et al. . |
| 5,206,087 | 4/1993 | Tokiwa et al. . |
| 5,208,267 | 5/1993 | Neumann et al. . |
| 5,221,040 | 6/1993 | Sorenson . |
| 5,221,435 | 6/1993 | Smith, Jr. . |
| 5,224,595 | 7/1993 | Sugimoto et al. . |
| 5,232,496 | 8/1993 | Jennings et al. . |
| 5,240,561 | 8/1993 | Johansson et al. . |
| 5,248,702 | 9/1993 | Neumann et al. . |
| 5,252,271 | 10/1993 | Jeffs . |
| 5,256,711 | 10/1993 | Tokiwa et al. . |
| 5,258,430 | 11/1993 | Bastioli et al. . |
| 5,264,030 | 11/1993 | Tanabe et al. . |
| 5,264,080 | 11/1993 | Shaw et al. . |
| 5,266,368 | 11/1993 | Miller . |
| 5,268,187 | 12/1993 | Quinlan . |
| 5,269,845 | 12/1993 | Grunau et al. . |

| | | |
|---|---|---|
| 5,272,181 | 12/1993 | Bochmer et al. |
| 5,273,821 | 12/1993 | Olson et al. |
| 5,275,774 | 1/1994 | Bahr et al. |
| 5,277,762 | 1/1994 | Felegi, Jr. et al. |
| 5,277,764 | 1/1994 | Johansson et al. |
| 5,278,194 | 1/1994 | Tickner et al. |
| 5,279,658 | 1/1994 | Aung. |
| 5,284,672 | 2/1994 | Ito. |
| 5,288,318 | 2/1994 | Mayer et al. |
| 5,288,765 | 2/1994 | Bastioli et al. |
| 5,290,350 | 3/1994 | Besnard et al. |
| 5,294,299 | 3/1994 | Zeunner et al. |
| 5,298,273 | 3/1994 | Ito. |
| 5,300,333 | 4/1994 | Wilkerson et al. |
| 5,308,879 | 5/1994 | Akamatu et al. |
| 5,314,754 | 5/1994 | Knight. |
| 5,316,624 | 5/1994 | Racine. |
| 5,317,037 | 5/1994 | Golden et al. |
| 5,317,119 | 5/1994 | Ayres. |
| 5,320,669 | 6/1994 | Lim et al. |
| 5,332,147 | 7/1994 | Sorenson. |
| 5,338,349 | 8/1994 | Farrar. |
| 5,340,558 | 8/1994 | Friedman et al. |
| 5,346,541 | 9/1994 | Goldman et al. |
| 5,354,424 | 10/1994 | Rha et al. |
| 5,360,586 | 11/1994 | Wyatt et al. |
| 5,362,776 | 11/1994 | Barenberg et al. |
| 5,362,777 | 11/1994 | Tomka. |
| 5,372,877 | 12/1994 | Kannankeril. |
| 5,411,639 | 5/1995 | Kurrie. |
| 5,506,046 | 4/1996 | Andersen et al. .......... 428/34.5 |
| 5,508,072 | 4/1996 | Andersen et al. .......... 428/34.5 |

FOREIGN PATENT DOCUMENTS

| | | |
|---|---|---|
| 0118240B1 | 9/1984 | European Pat. Off. |
| 0265745A2 | 5/1988 | European Pat. Off. |
| 0271853B2 | 6/1988 | European Pat. Off. |
| 0304401B1 | 2/1989 | European Pat. Off. |
| 0340707A2 | 11/1989 | European Pat. Off. |
| 0370913B1 | 5/1990 | European Pat. Off. |
| 0405146B1 | 1/1991 | European Pat. Off. |
| 0447797A2 | 9/1991 | European Pat. Off. |
| 0453980A2 | 10/1991 | European Pat. Off. |
| 0546956A2 | 6/1993 | European Pat. Off. |
| 0551954A2 | 7/1993 | European Pat. Off. |
| 0608031A1 | 7/1994 | European Pat. Off. |
| 453555 | 1/1936 | France. |
| 1278195 | 2/1981 | France. |
| 2642731 | 8/1990 | France. |
| 3011330 | 3/1980 | Germany. |
| 2841172 | 4/1980 | Germany. |
| 3420195A1 | 12/1985 | Germany. |
| 4008862C1 | 11/1991 | Germany. |
| 47-20190 | 9/1972 | Japan. |
| 51-2729 | 1/1976 | Japan. |
| 53-16730 | 2/1978 | Japan. |
| 54-31320 | 3/1979 | Japan. |
| 54-48821 | 3/1979 | Japan. |
| 55-37407 | 3/1980 | Japan. |
| 55-100256 | 7/1980 | Japan. |
| 56-17965 | 2/1981 | Japan. |
| 58-120555 | 7/1983 | Japan. |
| 60-36056 | 8/1985 | Japan. |
| 60-36055 | 8/1985 | Japan. |
| 60-264375 | 12/1985 | Japan. |
| 60-260484 | 12/1985 | Japan. |
| 62-39204 | 2/1987 | Japan. |
| 62-46941 | 2/1987 | Japan. |
| 63-123851 | 5/1988 | Japan. |
| 63-210082 | 8/1988 | Japan. |
| 63-218589 | 9/1988 | Japan. |
| 63-248759 | 10/1988 | Japan. |
| 63-310780 | 12/1988 | Japan. |
| 64-37478 | 2/1989 | Japan. |
| 2-51460 | 2/1990 | Japan. |
| 2-141484 | 5/1990 | Japan. |
| 2-190304 | 7/1990 | Japan. |
| 3-80141 | 4/1991 | Japan. |
| 3-153551 | 7/1991 | Japan. |
| 3-187962 | 8/1991 | Japan. |
| 3-208847 | 9/1991 | Japan. |
| 3-202313 | 9/1991 | Japan. |
| 3-202310 | 9/1991 | Japan. |
| 4-70304 | 3/1992 | Japan. |
| 5-320401 | 12/1993 | Japan. |
| 6-32386 | 2/1994 | Japan. |
| 9100590 | 11/1992 | Netherlands. |
| 2050459 | 1/1981 | United Kingdom. |
| 1584387 | 2/1981 | United Kingdom. |
| 2192392 | 1/1988 | United Kingdom. |
| 2214516 | 6/1989 | United Kingdom. |
| 2208651 | 12/1989 | United Kingdom. |
| WO87/00828 | 2/1987 | WIPO. |
| WO89/02225 | 3/1989 | WIPO. |
| WO91/12186 | 8/1991 | WIPO. |
| WO92/04408 | 3/1992 | WIPO. |
| WO93/01242 | 7/1994 | WIPO. |
| WO94/18394 | 8/1994 | WIPO. |
| WO94/18388 | 8/1994 | WIPO. |

OTHER PUBLICATIONS

Andersen, et al., *Tailoring of Cement–Bound Materials By the Use of Packing and Rheological Models* American Ceramic Society (1988).

Andersen, *Tailoring of Concrete Materials,* R&H Annual Review (1988).

Ashby, *Materials Selection in Engineering Design,* Indian Journal of Technology, vol. 28, 217–225 (Jun.–Aug. 1990).

Ashby, *Overview No. 80: On the Engineering Properties of Materials,* Acta Metall, vol. 3, No. 5, 1273–1293 (1989).

Attwood, *Paperboard, The Wiley Encyclopedia of Packaging Technology* 500–506 (Marilyn Bakker ed., 1986).

Bach, *Cement–Based Products Processed the Plastics Way.*

Bajza, *On The Factors Influencing the Strength of Cement Compacts,* Cement and Concrete Research, vol. 2, 67–78 (1972).

Balaguru, et al., *Flexural Behavior of Slurry Infiltrated Fiber Concrete (SIFCON) Made Using Condensed Silica Fume.*

Baum, et al., *Paper, Kirk–Othmer Concise Encyclopedia of Chemical Technology,* 834–836 (Martin Grayson ed., 1985).

Berger et al., *Acceleration of Hydration of Calcium Silicates by Carbon Dioxide Treatment,* Nature Physical Science, vol. 240 (Nov. 6, 1972).

*Biomat 32–Production Unit for Natural Packaging, Starch Foam at Burger King's.*

Brady, et al., *Materials Handbook,* 588–594 (1991).

Brown, et al., *An Investigation of a High Speed Shear Mixer on Selected Pastes and Mortars,* Mat. Res. Soc. Symp. Proc., vol. 137 (1989).

Bukowski et al., *Reactivity and Strength Development of $CO_2$ Activated Non–Hydraulic Calcium Silicates,* Cement and Concrete Research, vol. 9, 57–68 (1979).

Clauson–Kaas, *Opsprojtet Glasfiberbeton i Byggeriet* (1987) (No translation).

Collepardi et al., *Influence of Polymerization of Sulfonated Naphthalene Condenate and Its Interaction With Cement.*

Davidson, et al., *Water–Soluble Resins,* New York: Reinhold Publishing Corp., Chapman & Hall Ltd., London.

Fordos, *Natural or Modified Cellulose Fibers As Reinforcement in Cement Composites*, Concrete Technology and Design, vol. 5, Natural Fiber Reinforced Cement and Concrete (1988).
Greminger, et al., *Alkyl and Hydroxyalkylalkycellulose*, Dow Chemical U.S.A., Midland, Oregon.
Hlavac, *The Technology of Glass and Ceramics*, Glass Science and Technology, 4: The Technology of Glass and Ceramics, Elsevier Publishing (1983).
Hyland, *F–Flute Inches Its Way Into Folding Carton Market*, Paperboard Packaging, 28–29 (May 1993).
Johansen, et al., *Particle Packing and Concrete Properties*, Materials Science of Concrete II, 111–147.
Jones, et al., *Raw Materials Processing*, Ceramics: Industrial Processing and Testing, Iowa State University Press (1972).
Kline, *Paper and Paperboard Manufacturing and Converting Fundamentals*, 19–28 (2d ed. 1982).
Kline, Corrugating Operations and Raw Materials, in *Paper and Paperboard: Manufacturing and Converting Fundamentals*, 184–195, 2nd ed. (1991).
Knab, et al., *Effects of Maximum Void Size and Aggregate Characteristics on the Strength of Mortar*, Cement and Concrete Research, vol. 13, 383–390 (1983).
Lawrence, *The Properties of Cement Paste Compacted Under High Pressure: Research Report 19*, Cement and Concrete Association Research Report 19 (Jun. 1969).
Lecznar, et al., *Strength of Neat Cement Pastes Molded Under Pressure*, Journal of the American Concrete Institute Briefs (Feb. 1961).
Lewis, et al., *Microstructure–Property Relationships in Macro–Defect–Free Cement*, MRS Bulletin (Mar. 1993).
Lewis, Condensed Chemical Dictionary, 870 (12th ed. 1993).
Maycock et al., *Carbonation of Hydrated Calcium Silicates*, Cement and Concrete Research, vol. 4, 69–76 (1974).
Miyagi et al., *Superplasticized Concrete Using Refined Lignosulfate and its Action Mechanism*, Cement and Concrete Research, vol. 15, 295–302 (1985).
Naaman, et al., *Tensile Stress–Strain Properties of SIFCON*, ACI Materials Journal (May–Jun. 1989).
Niel, *Supplementary Paper II–117. The Influence of Alkyl–Carbonate on the Hydration of Cement* (1968).
Putnam, et al., *Papermaking Additives, Kirk–Othmer Concise Encyclopedia of Chemical Technology*, 836–837 (Martin Grayson ed., 1985).
Robinson, *Extrusion Defects*.
Rosenberg, et al., *A New Mineral Admixture for High–Strength Concrete–Proposed Mechanism for Strength Enhancement*, Second International Conference on the Use of Fly Ash, Silica Fume, Slage and Natural Pozzoplans in Concrete (Apr. 21–25, 1986).
Roy, et al., *Very High Strength Cement Pastes Prepared by Hot Pressing and Other High Pressure Techniques*, Cement and Concrete Research, vol. 2, 349–366 (1972).
Roy, et al., *Processing of Optimized Cements and Concretes and Via Particle Packing*, MRS Bulletin (Mar. 1993).
Sequa Chemicals, Inc., Technical Data, *Sunrez® 700 Series Insolubilizers Coating Additive*.
Sikora, *Paper, The Wiley Encyclopedia of Packaging Technology*, 497–500 (Marylin Bakker ed., 1986).
Skalny et al., *Low Water to Cement Ratio Concretes*, Cement and Concrete Research, vol. 3, 29–40 (1973).
Skalny, et al., *Properties of Cement Pastes by High Pressure Compaction*, ACI Journal, (Mar. 1970).
Staley Starch and Specialty Products Group, Technical Data, *Sta–Lok® 400 Cationic Potato Starch*.

Stix, *Concrete Solutions*, Scientific American (Apr. 1993).
Strabo et al., *Cemenbaserede Hybridkompositte*, Teknologisk Institut, Byggeteknik, TR–Projekt 1985–133/177–85.533 (1987).
English translation—Strabo, et al, *Cement–Based Hybrid Composites*, Technological Institute of Denmark, Department of Building Technology, TR–Project 1985–133/177–85.533 (1987).
Strabo, et al., *Fiberbeton Teknologi*, Teknologisk Institut, Byggeteknik, TR–Projekt 133/117–82.042 (1986).
English translation—Strabo, et al., *Fiber Concrete Technology*, Technological Institute of Denmark, Department of Building Technology, TR–Project 133/117–82.042 (1986).
Strabo, et al., *Ekstrudering af Fiberbeton*, Teknologisk Institut, Byggeteknik, TR–Projekt 1985–133/177–85.538 (Oct. 1987).
English translation—Strabo, et al., *Extrusion of Fiber Concrete*, Danish Technological Institute, Department of Building Technology, TR–Project 1985–133/177–85.538 (Oct. 1987).
Strabo, et al., *Nye Formgivningsmetoder til Fiberbeton*, Teknologisk Institute, Byggeteknik, TR–Projekt 1984–133/117–84.028 (Apr. 1987).
English translation—Strabo, et al., *New Design Methods for Fiber Concrete*, Technological Institute of Denmark, Department of Building Technology, TR–Project 1984–133/117–84.028 (Apr. 1987).
Suzuki et al., *Formation and Carbonation of C–S–H In Water*, Cement and Concrete Research, vol. 15, 213–224 (1985).
Unwalla, et al., ed., *Recycled Materials for Making Concrete*, The Concrete Journal, vol. 53, No. 9 (Sep. 1979).
Verbeck, *Carbonation of Hydrated Portland Cement*, Cement and Concrete Special Technical Publication No. 203 (1958).
Vrana, *Khashoggi Kin Reported Planning Private Placement of Shares in New Container Firm* (Mar. 28, 1993).
Westman, et al., *The Packing of Particles* (1930).
Weinrich, *German Comes Up With Recycled Product to Replace Foam Chips*.
Young et a., *Introduction to MDF Cement Composites*, ACBM vol. 1, No. 2 (Fall 1989).
Yudenfreund et al., *Hardened Portland Cement Pastes of Low Porosity. II. Exploratory Studies. Dimensional Changes*, Cement and Concrete Research, vol. 2, 331–348 (1972).
Zeneca, *Biopol, Nature's Plastic–Born from Nature, Back to Nature*.
Zukowski, et al., *Rheology of Cementitious Systems*, MRS Bulletin (Mar. 1993).
*The Coating Process for Paper* (1993).
*The Colcrete Process*, Undated Publication.
*Fiberbeton–nyt*, Teknologisk Institu, Byggeteknik, Blad nr. 1 (Oct. 1987).
English translation–13 *Fiber Concrete News*, The Technological Institute of Denmark, Department of Building Technology, Pamphlet No. 1 (Oct. 1987).
*Nye Metoder i Beton Kan Betyde Teknisk Knock–out For Plast*.
English Translation—*New Method for Concrete May Mean Technical Knock–Out for Plastic*, The Engineer, No. 14 (1986).
*Plastic–Forming Processes*.
*Report of the Panel on Solids Processing*.
*Thermoforming Process Guide*, Dow Plastics.
*Zien In The Food Industry*, Freeman Industries, Inc.

HINGED ARTICLES HAVING AN INORGANICALLY FILLED MATRIX

This application is a divisional of application Ser. No. 08/192,965, filed Feb. 7, 1994, now allowed, which is a continuation-in-part of U.S. Ser. No. 08/163,681, filed Dec. 6, 1993, now abandoned, and a continuation-in-part of U.S. Ser. No. 08/152,354, filed Nov. 19, 1993, now U.S. Pat. No. 5,508,072. Said U.S. Ser. No. 08/163,681 is a continuation-in-part of U.S. Ser. No. 08/101,500, filed Aug. 3, 1993, pending, and a continuation-in-part of U.S. Ser. No. 08/095,662, filed Jul. 21, 1993, now U.S. Pat. No. 5,385,764, and a continuation-in-part of U.S. Ser. No. 08/019,151, filed Feb. 17, 1993, now U.S. Pat. No. 5,453,310, and a continuation-in-part of U.S. Ser. No. 07/929,898, filed Aug. 11, 1992, now abandoned. Said U.S. Ser. No. 08/152,354 is a continuation-in-part of U.S. Ser. No. 08/101,500, filed Aug. 3, 1993, pending, and a continuation-in-part of U.S. Ser. No. 08/095,662, filed Jul. 21, 1993, now U.S. Pat. No. 5,385,764, and a continuation-in-part of U.S. Ser. No. 07/982,383, filed Nov. 25, 1992, now abandoned. Said U.S. Ser. No. 08/095,662 is a continuation-in-part of U.S. Ser. No. 07/929,898, filed Aug. 11, 1992, now abandoned. Said U.S. Ser. No. 08/019, 151 is a continuation-in-part of U.S. Ser. No. 07/929,898, filed Aug. 11, 1992, now abandoned. Said U.S. Ser. No. 07/982,383 is a continuation-in-part of U.S. Ser. No. 07/929,898, filed Aug. 11, 1992, now abandoned.

BACKGROUND

1. Field of the Invention

The invention relates generally to hinges for use with highly inorganically filled composite materials. More particularly, the invention relates to a hinge integrally made in a highly inorganically filled composite sheet, which can be formed into various containers or other products.

2. Related Applications

The present application is a divisional of copending U.S. application Ser. No. 08/192,965 entitled "Hinges for Highly Inorganically Filled Composite Materials," filed Feb. 7, 1994, which is a continuation-in-part of co-pending U.S. application Ser. No. 08/163,681 entitled "Hinges for Hydraulically Settable Materials," filed Dec. 6, 1993 (now abandoned), which is a continuation-in-part of the following co-pending applications: Ser. No. 08/101,500 entitled "Methods and Apparatus for Manufacturing Moldable Hydraulically Settable Sheets Used in Making Containers, Printed Materials, and Other Objects," filed Aug. 3, 1993 (pending); Ser. No. 08/095,662 entitled "Hydraulically Settable Containers and Other Articles for Storing, Dispensing, and Packaging Food and Beverages and Methods for Their Manufacture," filed Jul. 21, 1993, now issued as U.S. Pat. No. 5,385,764; Ser. No. 08/019,151 entitled "Cementitious Materials For Use In Packaging Containers and Their Methods of Manufacture," filed Feb. 17, 1993, now issued as U.S. Pat. No. 5,453,310; and Ser. No. 07/929,898 entitled "Cementitious Food and Beverage Storage, Dispensing, and Packaging Containers and The Methods of Manufacturing Same," filed Aug. 11, 1992 (now abandoned).

The aforementioned U.S. application Ser. No. 08/192,965 is also a continuation-in-part of co-pending U.S. application Ser. No. 08/152,354 entitled "Sheets Having a Highly Inorganically Filled Organic Polymer Matrix," filed Nov. 19, 1993 (now U.S. Pat. No. 5,508,072), which is a continuation-in-part of the following co-pending applications: Ser. No. 08/095,662 entitled "Hydraulically Settable Containers and Other Articles for Storing, Dispensing, and Packaging Food and Beverages and Methods for Their Manufacture," filed Jul. 21, 1993, now issued as U.S. Pat. No. 5,385,764; Ser. No. 07/982,383 entitled "Food and Beverage Containers Made from Inorganic Aggregates and Polysaccharide, Protein, or Synthetic Organic Binders, and the Methods of Manufacturing Such Containers," filed Nov. 25, 1992 (now abandoned); and Ser. No. 08/101,500 entitled "Methods And Apparatus For Manufacturing Moldable Hydraulically Settable Sheets Used In Making Containers, Printed Materials, And Other Objects," filed Aug. 3, 1993 (pending). Each of these co-pending applications is a continuation-in-part of U.S. application Ser. No. 07/929,898 entitled "Cementitious Food And Beverage Storage, Dispensing, And Packaging Containers And The Methods Of Manufacturing Same," filed Aug. 11, 1992 (now abandoned).

For purposes of disclosure of the present invention, each of the applications identified in this section are incorporated herein by specific reference.

3. The Relevant Technology

A. Sheets, Containers, and Other Packaging Materials

Thin, flexible sheets made from materials such as paper, paperboard, plastic, polystyrene, and even metals are presently used in enormous quantity as printed materials, labels, mats, and in the manufacture of other objects such as containers, separators, dividers, envelopes, lids, tops, cans, and other packaging materials. Advanced processing and packaging techniques presently allow an enormous variety of liquid and solid goods to be stored, packaged, or shipped while being protected from harmful elements.

Containers and other packaging materials protect goods from environmental influences and distribution damage, particularly from chemical and physical influences. Packaging helps protect an enormous variety of goods from gases, moisture, light, microorganisms, vermin, physical shock, crushing forces, vibration, leaking, or spilling. Some packaging materials also provide a medium for the dissemination of information to the consumer, such as the origin of manufacture, contents, advertising, instructions, brand identification, and pricing.

Typically, most containers and cups (including disposable containers) are made from paper, paperboard, plastic, polystyrene, glass and metal materials. Each year over 100 billion aluminum cans, billions of glass bottles and thousands of tons of paper and plastic are used in storing and dispensing soft drinks, juices, processed foods, grains, beer, etc. Outside of the food and beverage industry, packaging containers (and especially disposable containers) made from such materials are ubiquitous. Paper for printing, writing, photocopying, magazines, newspapers, books, wrappers, and other flat items made primarily from tree derived paper sheets are also manufactured each year in enormous quantities. In the United States alone, approximately 5½ million tons of paper are consumed each year for packaging purposes, which represents only about 15% of the total annual domestic paper production.

B. Paper Materials

The general term "paper" is used for a wide range of matted or felted webs of vegetable fiber (mostly wood) that have been formed on a screen from a water suspension. The sheet materials that most people refer to as "paper" or "paperboard" are generally "tree paper" because these materials are manufactured from wood pulp derived from trees. Although tree paper may include inorganic fillers or extenders, starches, or other minor components, it will typically contain a relatively high wood fiber content, generally from about 80% to as high as 98% by volume of the paper sheet.

Tree paper is manufactured by processing wood pulp to the point of releasing the lignins and hemicellulose constituents of the raw wood pulp fibers, as well as fraying and fracturing the fibers themselves, in order to obtain a mixture of fibers, lignins, and hemicellulose that will be essentially self-binding through web physics. The broad category of cellulose-based paper, mainly plant, vegetable, or tree paper, will hereinafter collectively be referred to as "conventional paper."

The properties of an individual conventional paper or paperboard are extremely dependent on the properties of the pulps used. Pulp properties are dependent on both the source and the processing technique(s) used to prepare the pulp for paper-making. For example, coarse packaging papers are almost always made of unbleached kraft softwood pulps. Fine papers, generally made of bleached pulp, are typically used in applications demanding printing, writing, and special functional properties such as barriers to liquid and/or gaseous penetrants.

Conventional paper is typically manufactured by creating a highly aqueous slurry, or furnish, which is then substantially dewatered by first placing the slurry on a porous screen or wire sieve and then "squeegeeing" out the water using a roller nip. This first dewatering process results in a sheet having a water content of about 50–60%. After that, the partially dried paper sheet is further dried by heating the sheet, often by means of heated rollers. Because of the paper manufacturing process, as well as the limitations imposed by web physics, there has been an upper limit of the amount of inorganic aggregate fillers than can be impregnated within a conventional paper sheet.

In order to obtain the well-known properties that are typical of paper, substitute fibrous substrates have been added instead of wood derived fibers. These include a variety of plant fibers (known as "secondary fibers"), such as straw, flax, abaca, hemp, and bagasse. The resultant paper is often referred to as "plant paper". As in tree paper, plant paper relies on web physics, highly processed fibers, and highly aqueous fiber slurries in its manufacture.

C. The Impact of Paper, Plastic, Polystyrene, and Metals

A huge variety of objects such as containers, packing materials, mats, disposable utensils, reading or other printed materials, and decorative items are presently mass-produced from paper, cardboard, plastic, polystyrene, and metals. The vast majority of such items eventually wind up within our ever diminishing landfills, or worse, are scattered on the ground or dumped into bodies of water as litter.

Since plastic and polystyrene are essentially nonbiodegradable, they persist within the land and water as unsightly, value diminishing, and (in some cases) toxic foreign materials. Even paper or cardboard, believed by many to be biodegradable, can persist for years, even decades, within landfills where they are shielded from air, light, and water, which are all necessary for normal biodegradation activities. Metal products utilize valuable natural resources in their manufacture, and if not recycled, remain in the landfill and are unusable essentially forever.

Recently there has been a debate as to which of these materials (e.g., paper, cardboard, plastic, polystyrene, glass, or metal) is most damaging to the environment. Consciousness-raising organizations have convinced many people to substitute one material for another in order to be more environmentally "correct." The debate often misses the point that each of these materials has its own unique environmental weaknesses. One material may appear superior to another when viewed in light of a particular environmental problem, while ignoring different, often larger, problems associated with the supposedly preferred material. In fact, paper, cardboard, plastic, polystyrene, glass, and metal materials each has its own unique environmental weaknesses. The debate should, therefore, not be directed to which of these materials is more or less harmful to the environment, but should rather be directed toward asking: Can we find an alternative material that will solve most, if not all, of the various environmental problems associated with each of these presently used materials?

With the public's attention being focused on environmental issues, certain containment products have come under heavy scrutiny, especially disposable packing materials and boxes. Polystyrene products have more recently attracted the ire of environmental groups, particularly containers and other packaging materials. While polystyrene itself is a relatively inert substance, its manufacture involves the use of a variety of hazardous chemicals and starting materials. Unpolymerized styrene is very reactive and therefore presents a health problem to those who must handle it. Because styrene is manufactured from benzene (a known mutagen and probably a carcinogen), residual quantities of benzene can be found in styrene.

Most notably subject to criticism have been styrofoam products, which typically require the use of chlorofluorocarbons (or "CFC's") in their manufacture, as well as use of vast amounts of the ever shrinking petroleum reserves. In the manufacture of foams, including styrofoam (or blown polystyrene), CFC's (which are highly volatile liquids) are used to "puff" or "blow" the polystyrene which is then molded into foam cups and other food containers or packing materials. Unfortunately, CFC's have been linked to the destruction of the ozone layer, because they release chlorine products into the stratosphere. Even the substitution of less "environmentally damaging" blowing agents (e.g., HCFC, $CO_2$, and pentanes) are still significantly harmful and their elimination would be beneficial.

As a result, there has been widespread clamor for companies to return to using more environmentally safe and low cost containers. Some environmentalists have even favored a return to more extensive use of paper products instead of polystyrene, if only because it is thought by some that paper represents the lesser of two evils. Nevertheless, although paper products are ostensibly biodegradable and have not been linked to the destruction of the ozone layer, recent studies have shown that the manufacture of paper probably more strongly impacts the environment than does the manufacture of polystyrene.

In fact, the wood pulp and paper industry has been identified as one of the five top polluters in the United States. For instance, products made from paper require ten times as much steam, fourteen to twenty times the electricity, and twice as much cooling water compared to an equivalent polystyrene product. Various studies have shown that the effluent from paper manufacturing contains ten to one hundred times the amount of contaminants produced in the manufacture of polystyrene foam.

Another drawback of the manufacture of paper and paperboard is the relatively large amount of energy that is required to produce paper. This includes the energy required to process wood pulp to the point that the fibers are sufficiently delignified and fray so that they are essentially self-binding under the principles of web physics. In addition, a large amount of energy is required in order to remove the water within conventional paper slurries, which contain water in amount of up to about 99.5% by volume. Because so much water must be removed from the slurry, it is necessary to literally suck water out of the slurry even before heated rollers can be used to dry the sheet. Moreover, much of the water that is sucked out of the sheets during the dewatering processes is usually discarded into the environment. This process, which has changed little in decades, is energy intensive, time consuming, and requires a significant initial investment.

Further, it is often necessary to coat many paper containers with a wax or plastic material in order to give the containers waterproofing properties. Moreover, if insulative properties are necessary, even more drastic modifications to the paper material in the container are necessary. Many types of plastic containers as well as coatings utilized with paper containers are derived from fossil fuels, mainly petroleum, and share many of the environmental concerns of petroleum refinement.

Paper or paperboard, believed by many to be biodegradable, can persist for years, even decades, within landfills where they are shielded from air, light, and water—all of which are required for normal biodegradation activities. There are reports of telephone books and newspapers having been lifted from garbage dumps that had been buried for decades. This longevity of paper is further complicated since it is common to treat, coat, or impregnate paper with various protective materials which further slow or prevent degradation.

Another problem with paper, paperboard, polystyrene, and plastic is that each of these requires relatively expensive organic starting materials, some of which are nonrenewable, such as the use of petroleum in the manufacture of polystyrene and plastic. Although trees used in making paper and paperboard are renewable in the strict sense of the word, their large land requirements and rapid depletion in certain areas of the world undermines this notion. Hence, the use of huge amounts of essentially nonrenewable starting materials in making sheets and objects therefrom cannot be sustained and is not wise from a long term perspective.

Furthermore, the processes used to make the packaging stock raw materials (such as paper pulp, styrene, or metal sheets) are very energy intensive, cause major amounts of water and air pollution, and require significant capital requirements. The manufacturing processes of plastic sheets or products vary, but they typically require precise control of both temperature and shear stress in order to make a usable product. In addition, the typical polystyrene or plastic manufacturing process is a high consumer of energy.

The manufacturing processes of forming metal sheets into containers (particularly cans made of aluminum and tin), blowing glass bottles, and shaping ceramic containers utilize high amounts of energy because of the necessity to melt and then separately work and shape the raw metal into an intermediate or final product. These high energy and processing requirements not only utilize valuable energy resources, but they also result in significant air, water, and heat pollution to the environment. While glass can be recycled, that portion that ends up in landfills is essentially non-degradable. Broken glass shards are very dangerous and can persist for years.

About the only effective way to reduce the shear volume of traditional container and packing wastes is through recycling. Recycling is not, however, without its contribution of large amounts of pollution into the environment in the form of fuel spent in transporting recyclables to recycling centers, as well as fuels and chemicals used in the recycling process itself. While significant efforts have been expended in recycling programs, only a portion of the raw material needs come from recycling—most of the raw material still comes from nonrenewable resources.

In spite of the more recent attention that has been given to reduce the use of the above materials, they continue to be used because of their superior properties of strength and, especially, mass productivity. Moreover, for any given use for which they were designed, such materials are relatively inexpensive, lightweight, easy to mold, strong, durable, and resistant to degradation during the use of the object in question.

D. Inorganic Materials

Essentially nondepletable inorganic materials such as clay, natural minerals, or stone have been used for millennia. Clay has found extensive use because of its ready moldability into a variety of objects including containers, tiles, and other useful objects. Some of the drawbacks of clay include the time it takes for clay to harden, the need to fire or sinter clay in order to achieve optimum strength properties, and the generally large, heavy, and bulky nature of clay. Unfired clay, in particular, has low tensile strength and is very brittle. Nevertheless, clay has found some use in the manufacture of other materials as a plentiful, inexhaustible, and low-cost filler, such as in paper or paperboard. However, because of the brittle and non-cohesive nature of clay when used as a filler, clay has generally not been included in amounts greater than about 20% by weight of the overall paper material.

Stone has been used in the manufacture of buildings, tools, containers, and other large, bulky objects. An obvious drawback of stone, however, is that it is very hard, brittle, and heavy, which limits its use to large, bulky objects of relatively high mass. Nevertheless, smaller or crushed stone can be used as an aggregate material in the manufacture of other products, such as hydraulically settable, or cementitious materials.

Hydraulically settable materials such as those that contain hydraulic cement or gypsum (hereinafter "hydraulically settable," "hydraulic," or "cementitious" compositions, materials, or mixtures) have been used to create useful, generally large, bulky structures that are durable, strong, and relatively inexpensive. For example, cement is a hydraulically settable binder derived from clay and limestone, and it is essentially nondepletable. Those materials containing a hydraulic cement are generally formed by mixing hydraulic cement with water and usually some type of aggregate to form a cementitious mixture, which hardens into concrete.

Ideally, a freshly mixed cementitious mixture is fairly nonviscous, semi-fluid, and capable of being mixed and formed by hand. Because of its fluid nature, concrete is generally shaped by being poured into a mold, worked to eliminate large air pockets, and allowed to harden. If the surface of the concrete structure is to be exposed, such as on a concrete sidewalk, additional efforts are made to finish the surface to make it more functional and to give it the desired surface characteristics.

Due to the high level of fluidity required for typical cementitious mixtures to have adequate workability, the uses of concrete and other hydraulically settable mixtures have been limited mainly to simple shapes which are generally large, heavy, and bulky, and which require mechanical forces to retain their shape for an extended period of time until sufficient hardening of the material has occurred. Another aspect of the limitations of traditional cementitious mixtures or slurries is that they have little or no form stability and they are molded into final form by pouring the mixture into a space having externally supported boundaries or walls.

It is precisely because of this lack of moldability (which may be the result of poor workability and/or poor form stability), coupled with the low tensile strength per unit weight, that hydraulically settable materials have traditionally been useful only for applications where size and weight are not limiting factors and where the forces or loads exerted on the concrete are generally limited to compressive forces or loads, as in, e.g., roads, foundations, sidewalks, and walls.

Moreover, previous hydraulically settable materials have been brittle, rigid, unable to be folded or bent, and have low elasticity, deflection and flexural strength. The brittle nature and lack of tensile strength (about 1–4 Mpa) in concrete is ubiquitously illustrated by the fact that concrete readily cracks or fractures upon the slightest amount of shrinkage or bending, unlike other materials such as metal, paper, plastic, or ceramic. Consequently, typical hydraulically settable materials have not been suitable for making small, lightweight objects, such as containers or thin sheets, which are better if made from materials with much higher tensile and flexural strengths per unit weight compared to typical hydraulically settable materials.

Another problem with traditional, and even more recently developed high strength concretes has been the lengthy curing times almost universally required for most concretes. Typical concrete products formed from a flowable mixture require a hardening period of 10–24 hours before the concrete is mechanically self-supporting, and upwards of a month before the concrete reaches a substantial amount of its maximum strength. Extreme care has had to be used to avoid moving the hydraulically settable articles until they have obtained sufficient strength to be demolded. Movement or demolding prior to this time has usually resulted in cracks and flaws in the hydraulically settable structural matrix. Once self-supporting, the object could be demolded, although it has not typically attained the majority of its ultimate strength until days or even weeks later.

Since the molds used in forming hydraulically settable objects are generally reused in the production of concrete products and a substantial period of time is required for even minimal curing of the concrete, it has been difficult to economically and commercially mass produce hydraulically settable objects. Although zero slump concrete has been used to produce large, bulky objects (such as molded slabs, large pipes, or bricks which are immediately self-supporting) on an economically commercial scale, such production is only useful in producing objects at a rate of a few thousand per day. Such compositions and methods cannot be used to mass produce small, thin-walled objects at a rate of thousands per hour.

Demolding a hydraulically settable object can create further problems. As concrete cures, it tends to bond to the forms unless expensive releasing agents are used. It is often necessary to wedge the forms loose to remove them. Such wedging, if not done properly and carefully each time, often results in cracking or breakage around the edges of the structure. This problem further limits the ability to make thin-walled hydraulically settable articles or shapes other than flat slabs, particularly in any type of a commercial mass production.

If the bond between the outer wall of the molded hydraulically settable article and the mold is greater than the internal cohesive or tensile strengths of the molded article, removal of the mold will likely break the relatively weak walls or other structural features of the molded article. Hence, traditional hydraulically settable objects must be large in volume, as well as extraordinarily simple in shape, in order to avoid breakage during demolding (unless expensive releasing agents and other precautions are used).

Typical processing techniques of concrete also require that it be properly consolidated after it is placed in order to ensure that no voids exist between the forms or in the structural matrix. This is usually accomplished through various methods of vibration or poking. The problem with consolidating, however, is that extensive overvibration of the concrete after it has been placed can result in segregation or bleeding of the concrete.

"Bleeding" is the migration of water to the top surface of freshly placed concrete caused by the settling of the heavier aggregate. Excessive bleeding increases the water to cement ratio near the top surface of the concrete slab, which correspondingly weakens and reduces the durability of the surface of the slab. The overworking of concrete during the finishing process not only brings an excess of water to the surface, but also fine material, thereby resulting in subsequent surface defects.

Although hydraulically settable materials have heretofore found commercial application only in the manufacture of large, bulky structural type objects, hydraulically settable mixtures have been created using a microstructural engineering approach which can be molded or shaped into relatively small, thin-walled objects. Indeed, such mixtures, which were developed by the inventors hereof, have been found to be highly moldable and can be extruded and/or rolled into thin-walled sheets, even as thin as 0.1 mm. Such mixtures and methods used to manufacture sheets therefrom are set forth more fully in copending U.S. patent application Ser. No. 08/101,500, entitled "Methods and Apparatus for Manufacturing Moldable Hydraulically Settable Sheets Used in Making Containers, Printed Materials, and Other Objects," filed Aug. 3, 1993 (pending) (hereinafter the "Andersen-Hodson Technology").

Although the hydraulically settable binder is believed to impart a significant amount of strength, including tensile and (especially) compressive strengths, such materials have been found in lower quantities to act less as a binding agent and more like an aggregate filler. As a result, studies have been conducted to determine whether sheets which do not necessarily use a hydraulically settable binder (or which only use such a binder in low enough quantities so that it will act mainly as an aggregate material) but which incorporate high concentrations of inorganic material can be manufactured. Such sheets would have the advantages of hydraulically settable sheets over prior art paper, plastic, and metal materials in terms of their low cost, low environmental impact, and the ready availability of abundant starting materials.

Due to the more recent awareness of the tremendous environmental impacts of using paper, paperboard, plastic, polystyrene, and metals for a variety of single-use, mainly disposable, items such as printed sheets or containers made therefrom (not to mention the ever mounting political pressures), there has been an acute need (long since recognized by those skilled in the art) to find environmentally sound substitute materials. In particular, industry has sought to develop highly inorganically filled materials for these high waste volume items.

In spite of such economic and environmental pressures, extensive research, and the associated long-felt need, the technology simply has not existed for the economic and feasible production of highly inorganically filled, organic polymer bound materials which could be substituted for paper, paperboard, plastic, polystyrene, or metal sheets or container products made therefrom. Some attempts have been made to fill paper with inorganic materials, such as kaolin and/or calcium carbonate, although there is a limit (about 20–35% by volume) to the amount of inorganics that can be incorporated into these products. In addition, there have been attempts to fill certain plastic packaging materials with clay in order to increase the breathability of the product and improve the ability of the packaging material to keep fruits or vegetables stored therein fresh. In addition, inorganic materials are routinely added to adhesives and coatings in order to impart certain properties of color or texture to the cured product.

Nevertheless, inorganic materials only comprise a fraction of the overall material used to make such products, rather than making up the majority of the packaging mass. Because highly inorganically filled materials essentially comprise such environmentally neutral components as rock, sand, clay, and water, they would be ideally suited from an ecological standpoint to replace paper, paperboard, plastic, polystyrene, or metal materials as the material of choice for such applications. Inorganic materials also enjoy a large advantage over synthetic or highly processed materials from the standpoint of cost.

Inorganic materials not only use significant amounts of nondepletable components, they do not impact the environment nearly as much as do paper, paperboard, plastic, polystyrene, or metal. Another advantage of inorganically filled materials is that they are far less expensive than paper, paperboard, plastic, polystyrene, or metals. Inorganically filled materials also require far less energy to manufacture.

Based on the foregoing, what is needed are improved compositions and methods for manufacturing highly inorganically filled organic polymer mixtures that can be formed into sheets and other objects presently formed from paper, paperboard, polystyrene, plastic, glass, or metal.

It would be a significant improvement in the art if such compositions and methods yielded highly inorganically filled sheets which had properties similar to paper, paperboard, polystyrene, plastic, or metal sheets. It would also be a tremendous advancement in the art to provide compositions and methods which allow for the production of highly inorganically filled sheets having greater flexibility, tensile strength, toughness, moldability, and mass-producibility compared to materials having a high content of inorganic filler.

In addition, it would be a significant improvement in the art if such sheets, as well as containers or other objects made therefrom, were readily degradable into substances which are commonly found in the earth. It would also be a tremendous improvement in the art if such sheets could be formed into a variety of containers or other objects using existing manufacturing equipment and techniques presently used to form such objects from paper, paperboard, polystyrene, plastic, or metal sheets.

Many containers, which can be formed without the need for any bending or folding, are readily adaptable to be manufactured from inorganic materials. These include plates, cups, utensils, etc. Many other types of containers such as boxes, clamshells, etc., however, require a material that can be bent and/or folded to form the desired shape and still be competitive in cost to manufacture. Accordingly, what is needed is a hinge adapted for use with an inorganically filled material and, more particularly, a hinge that can be integrally formed as part of a sheet of inorganically filled material that permits the sheet to be bent or folded into various configurations to form a variety of types of containers.

Hinges known as "living hinges" have been used in the past on various plastic molded products. A living hinge may be bent multiple times without breakage or fracture of the hinge material. Living hinges have been formed from soft, flexible thermoplastic elastomers that exhibit high endurance to flexural fatigue. Living hinges can take various shapes and have been used on various plastic molded parts to provide pivotal movement between adjacent rigid parts.

Scoring is a technique that has been used to provide memory to sheet materials, such as paper-based materials, so that they bend in the same place along the scoring line. These materials are bent toward the score. Scoring of a paper-based material damages the fibers at the score, making the material weaker in the area of the score, which provides for the bending of the material along the score. Scoring has been used on various products such as on cardboard boxes to provide bendable flaps to close the box, foldable game boards, file folders, etc.

Scoring an inorganically filled material to produce a hinge for bending of the material has not been heretofore possible since such a material was previously too thick or too brittle to provide an effective bending point without breaking.

Therefore, there is a need for a hinge for inorganically filled materials that is at least as good as hinges used on prior paper or plastic products in order to produce various containers having easily bendable portions. Such a hinge is disclosed and claimed herein.

SUMMARY OF THE INVENTION

The present invention is an apparatus comprising a hinge formed of a highly inorganically filled composite matrix. The inorganically filled composite matrix comprises a water-dispersable organic polymer binder, an aggregate material, and a fibrous material. The inorganic components have a concentration in the range of about 40% to 98% by volume of the total solids in the matrix.

The invention also includes an apparatus comprising a first member, a second member adjacent to the first member, and means for flexibly joining the first and second members so that the first and second members can be pivotally moved about the joining means relative to one another. The joining means has an inorganically filled structural matrix comprising a water-dispersable organic polymer binder, an aggregate material, and a fibrous material. The joining means allows the first and second members to be pivotally moved between a first position wherein the first and second members are in straight alignment with one another and a plurality of other positions wherein the first and second members form an angle in relation to one another.

The inorganically filled materials used herein can generally be described as multi-component, multi-scale, fiber-reinforced, micro-composites. By carefully incorporating a variety of different materials (including inorganic aggregates, organic polymers, and fibers) capable of imparting discrete yet synergistically related properties, it is possible to create a unique class or range of micro-composites having remarkable properties of strength, toughness, environmental soundness, mass-producibility, and low cost.

In particular, such materials can be used to manufacture sheets and hinges that can be used immediately to form a variety of objects such as containers or other packaging materials. Alternatively, such sheets can be rolled on to large spools or cut into sheets and stacked on a pallet and stored until needed. Thereafter, the stacked or rolled sheets may be cut and formed into the object of choice. The sheets can be remoistened in order to introduce additional flexibility and elongation into the sheet to avoid splitting or cracking while being formed into the desired object.

Moreover, because the highly inorganically filled sheets and hinges used in the present invention comprise more environmentally friendly components, the manufacture of such sheets and hinges impacts the environment to a much lesser extent than does the manufacture of other materials.

Although the highly inorganically filled sheets may also include organic components, such as cellulose-based fibers and an organic binder, such components represent a much smaller fraction of the overall mass of the sheets compared to paper, and together will make up usually less than about 60% by volume of the total solids of the hardened inorganically filled sheet. In most cases, it will be preferable for fiber to be included in an amount from about 0.5% to about 50%. The organic polymer binder will preferably be included in amount in the range from about 1% to about 50% by volume of the total solids of the hardened sheet.

The binding forces imparted by the water-dispersable organic polymer binder provide the majority of the tensile and flexural strengths within the sheets and hinges. To a lesser extent the organic polymer binder may also interact with certain inorganic aggregate particles and fibers. The result is the ability to include far less fiber within the inorganically filled matrix while maintaining the beneficial effects of tensile strength, tear and burst strength, and flexibility imparted by the fibers. Employing less fiber while maintaining good strength properties allows a more economically produced sheet or container (as compared to paper) because (1) fiber is typically far more expensive than the inorganic filler, (2) the capital investment for the processing equipment is much less, and (3) minimizing the fiber content also reduces the amount of organic compounds disposed of into the environment.

Unlike the manufacture of plastic or polystyrene, highly inorganically filled sheets and hinges utilize little or no petroleum-based products or derivatives as starting materials. Thus, although some amount of fossil fuel is necessary to generate the energy used in manufacturing the highly inorganically filled sheets, only a fraction of the petroleum used in the manufacture of polystyrene or plastic products will be consumed overall. In addition, the energy requirements of the present invention are much less than the energy requirements of paper manufacturing where extensive dewatering is necessary.

Finally, another advantage of the highly inorganically filled sheets and hinges of the present invention (as well as containers or other objects made therefrom) is that their disposal impacts the environment far less than paper, paperboard, plastic, polystyrene, glass, or metal products. The highly inorganically filled materials of the present invention are both readily recyclable and, even if not recycled, will readily degrade when exposed to moisture, pressure, and other environmental forces into a fine granular powder that has a composition complementary to the components of the earth. The disintegration process is not dependent on biodegradation forces but will occur as a result of various natural forces that may be present, such as moisture and/or pressure.

The hinge of the present invention can be made in inorganically filled sheets that can be immediately used to form a variety of objects such as food or beverage containers, or can be stacked or rolled and stored for future use. Stored sheets can be remoistened in order to introduce additional flexibility and elongation therein to avoid splitting or cracking when an object is formed.

The hinge of the invention can be advantageously formed during the sheet manufacturing process by scoring, creping or perforating a formed inorganically filled sheet, which aids in forming a bend or hinge at a predetermined location within the sheet. The score can be cut or pressed into the surface of the sheet anytime after the sheet is formed in order to create a line within the structural matrix upon which the sheet can later be bent. Thus, the score can be molded between two parts of a mold, pressed into the sheet while wet or in a semi-hardened state, or the score can be cut into the sheet after the sheet has become fully dried. For example, a flat sheet can be scored and formed into the shape of a container and then hardened, or can be allowed to harden and then scored and formed into the shape of a container. The time and location of the placement of a score, score cut, or perforation will depend upon the desired purpose of the score and the properties of the inorganically filled material in question.

The scored sheet preferably bends away from the score, which is different from paper-based materials that bend toward the score. Furthermore, the hinge area of the sheet at the score actually becomes stronger as a result of the densification of the inorganically filled material at the score.

In addition, coatings can be applied to the surface of the sheet to permanently soften and enhance the flexibility or elastic modulus of the sheet or a hinge area within the sheet. Elastomer, plastic, or paper coatings can aid in preserving the integrity of the hinge whether or not the underlying hardened structural matrix fractures upon bending at the hinge.

During the subsequent process of forming the sheet into the shape of the desired object, it will usually be advantageous to remoisten the hardened sheet in order to temporarily increase the flexibility and workability of the sheet. This is particularly true in the case where the sheet will be rolled or has been scored and is expected to make a particularly sharp bend during the container forming stage.

The hinge of the invention may be used in a variety of containers such as boxes, clamshell containers, etc. The hinge of the invention formed by scoring can have a cross section with a variety of shapes such as a square, parabolic, sinusoidal, wedge, triangular shape, etc. Multiple scores may be used in order to provide increased bendability of the sheet without breaking or fracturing thereof.

Scoring allows the inorganically filled sheet to fold or bend along a single line up to about 180° from horizontal without fracturing the structural material. When multiple scores are made in a sheet on both sides thereof, the sheet can be bent up to 360° by being bendable in half in both directions. Before the present invention, it was not possible to fold or bend inorganic sheet materials along a single line greater than about 10°.

A preferred method of making a hinge having an inorganically filled structural matrix within the scope of the present invention includes the steps of (1) mixing together water, an aggregate material, a water-dispersable organic polymer binder, and a fibrous material in order to form a moldable mixture; (2) forming the moldable mixture into a form stable sheet having an inorganically filled structural matrix of a predetermined thickness; and (3) scoring the sheet to form a hinge in the inorganically filled structural matrix.

In general, the particular qualities of any embodiment of the present invention can be designed beforehand using a materials science and microstructural engineering approach in order to give the microstructure of the inorganically filled structural matrix the desired properties, while at the same time remaining cognizant of the costs and other complications involved in large scale manufacturing systems. This materials science and microstructural engineering approach, instead of the traditional trial-and-error, mix-and-test approach, allows for the design of inorganically filled materials with the desired properties of high tensile and flexural strength, low weight, low cost, and low environmental impact.

The inorganically filled materials utilized herein do not require the use of environmentally damaging methods or resources in order to supply the necessary raw materials. Furthermore, these materials are more environmentally neutral, do not use environmentally harmful chemicals in their manufacture, and do not create unsightly garbage which does not or very slowly degrades.

One aspect of the present invention is the novel hinge apparatus made of an inorganically filled structural matrix that is bendable. Another aspect of the invention is a method of making the above hinge. A further aspect of the invention are products containing the above hinge.

From the foregoing, it will be appreciated that an object of the present invention is the development of inorganically filled sheets and containers having hinges formed therein, which do not require the use of environmentally damaging methods or resources in order to supply the necessary raw materials.

Another object of the present invention is the development of hinges for use in inorganically filled materials formed into sheets and containers that allow such materials to have flexibility and to be bent at a predetermined location.

A further object and feature of the present invention is the development of hinges in inorganically filled sheets and containers that have essentially the same chemical composition as the earth into which they eventually will be disposed.

Another feature and object is to provide compositions and methods that allow for the production of highly inorganically filled materials useful in forming the hinge of the invention, which have greater flexibility, tensile strength, toughness, moldability, and mass-producibility compared to other materials having a high content of inorganic filler.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1A:
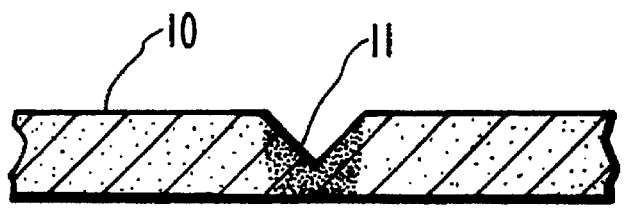
FIGS. 1A–1C include cross section side elevation views of inorganically filled sheets with different shaped single scores.

The present invention is an apparatus comprising a hinge formed of a highly inorganically filled composite matrix (referred to herein as "inorganically filled" matrix or material). The inorganically filled matrix comprises a water-dispersable organic polymer binder, an aggregate material, and a fibrous material. The hinge of the invention is utilized in sheets and containers manufactured from inorganically filled materials that are generally lightweight and have a high strength to bulk density ratio. The sheets and containers utilizing the hinge of the invention can be made to have a variety of densities and physical characteristics. Specific properties or qualities desired for any product can be engineered by proper selection of the material components and manufacturing processes as taught herein.

I. GENERAL DISCUSSION OF MATERIALS

The inorganically filled materials and hinges made therefrom can generally be described as multi-component, multi-scale, fiber-reinforced, micro-composites. By carefully incorporating a variety of different materials (including inorganics and fibers) capable of imparting discrete yet synergistically related properties, it is possible to create a unique class or range of micro-composites having remarkable properties of strength, toughness, environmental soundness, mass-producibility, and low cost.

The term "multi-component" refers to the fact that the inorganically filled materials used to make the sheets and hinges of the present invention typically include three or more chemically or physically distinct materials or phases, such as fibrous materials, inorganic aggregate materials, organic aggregate materials, organic polymer binders, rheology-modifying materials, hydraulically settable materials, water, other liquids, entrapped gases, or voids. Each of these broad categories of materials imparts one or more unique properties to the final product made therefrom (as well as the mixture used to form the sheet). Within these broad categories it is possible to further include different components (such as two or more inorganic aggregate particles or fibers) which can impart different, yet complementary properties to the sheets and hinges. This allows for the specific engineering of desired properties within the sheets and hinges in conjunction with the manufacturing process.

The term "multi-scale" refers to fact that the compositions and materials of the present invention are definable at different levels or scales. Specifically, within the inorganically filled materials of the present invention there is typically a macro-component composition in the range from about 10 nanometers to as high as about 10 mm, a micro-component composition in the range of about 1 micron to about 100 microns, and a submicron component. Although these levels may not be fractal, they are usually very similar to each other, and homogeneous and uniform within each level.

The term "fiber-reinforced" is self-explanatory, although the key term is "reinforced", which clearly distinguishes the highly inorganically filled materials of the present invention from conventional paper or paper products. Conventional paper relies on "web" physics, or intertwining of fibers, to provide the structural matrix and mass, as well as the binding, of the paper. However, the matrix of the inorganically filled materials used in the present invention relies on the bond or interaction between the organic polymer binder, fibers and/or other aggregates. The fibers act primarily as a reinforcing component to specifically add tensile strength and flexibility.

Besides the inclusion of much higher concentrations of inorganic aggregate fillers, the present invention differs from conventional paper manufacturing processes in a number of ways. First, far less water is used in the moldable mixtures (less than about 50% by volume) of the present invention compared to conventional paper slurries, which typically contain water in an amount of at least 97% by volume, and even as much as 99.9% water. More importantly, the inorganically filled sheets are formed from a highly cohesive, yet moldable mixture rather than an aqueous slurry such that once placed into a shape the inorganically filled material will generally maintain its shape unless further acted upon. Moreover, the moldable mixtures will not shrink more than about 10%, and not at all in some cases. Paper slurries, on the other hand, will shrink by an amount of 60% or more during the paper-making process.

Finally, the term "micro-composite" refers to the fact that the inorganically filled materials are not merely a compound or mixture but a designed matrix of specific, discrete materials on a micro-level, which are of different sizes, shapes, and chemical make-up. The materials are sufficiently well bound and interactive so that the unique properties of each are fully evidenced in the final composite (e.g., the tensile strength of the matrix has a direct correlation to the tensile strength of the fibrous component; the insulation of the matrix has a direct correlation to the total porosity and insulative character of the aggregate material, etc.).

In light of these definitions and principles, materials that include an organic polymer binder, fibers (both organic and inorganic), and inorganic aggregates can be combined and molded into a variety of products. The highly inorganically filled sheets that use the hinges of the present invention can substitute for sheets made from plastic, polystyrene, and even metal. The sheets can be cut and formed (such as by rolling or folding) into a variety of containers and other articles of manufacture. The compositions and methods (including sheets made therefrom) are particularly useful in the mass production of disposable containers and packaging, such as for the fast food industry.

Despite the differences in their composition and manufacture, the highly inorganically filled sheets and hinges of the present invention can be made to have the strength, toughness, flexibility, folding endurance, bendability, and look and feel of ordinary paper. Furthermore; the microstructural engineering approach to designing the moldable mixtures used to make the inorganically filled sheets allows for the manufacture of sheets having an extremely wide variety of properties not found in paper.

A. Microstructural Engineering Design

The highly inorganically filled sheets that use the hinges of the present invention have been developed from the perspective of microstructural engineering in order to build into the microstructure of the highly inorganically filled material certain desired, predetermined properties, while at the same time remaining cognizant of costs and other manufacturing complications. Furthermore, this microstructural engineering analysis approach, in contrast to the traditional trial-and-error, mix-and-test approach, has resulted in the ability to design highly inorganically filled materials with those properties of strength, weight, insulation, cost, and environmental neutrality that are necessary for appropriate sheets and containers that use the hinge of the invention.

The number of different raw materials available to engineer a specific product is enormous, with estimates ranging from between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have a high modulus of elasticity, while polymers have a low modulus; metals can be shaped by casting and forging, while composites require lay-up or special molding techniques; hydraulically settable materials, including those made from hydraulic cements historically have low flexural strength, while elastomers have high flexural strength and elongation before rupture.

However, compartmentalization of material properties has its dangers; it can lead to specialization (the metallurgist who knows nothing of ceramics) and to conservative thinking ("we use steel because that is what we have always used"). It is this specialization and conservative thinking that has limited the consideration of using highly inorganically filled materials for a variety of products, such as in the manufacture of paper-like sheets.

Inorganically filled materials have a wide utility and can be designed and microstructurally engineered for use in a variety of products. Inorganically filled materials have an advantage over other conventional materials in that inorganically filled materials gain their properties under relatively gentle and nondamaging conditions. (Other materials require high energy, severe heat, or harsh chemical processing that significantly affects the material components.) Moreover, certain conventional materials, or components thereof, can be incorporated into the highly inorganically filled materials used in the present invention with surprising synergistic properties or results.

The design of the compositions used in the present invention has been developed and narrowed, first by primary constraints dictated by the design, and then by seeking the subset of materials that maximizes the performance of the components. At all times during the process, however, it is important to realize the necessity of designing products that can be manufactured in a cost-competitive process.

Primary constraints in materials selection are imposed by characteristics of the design of a component which are critical to a successful product. With respect to a sheet used to make, for example, a food and beverage container, those primary constraints include minimal weight, strength (both compressive and tensile), and toughness requirements, while simultaneously keeping the cost comparable to that of paper, plastic, and metal counterparts.

As discussed above, one of the problems with materials having high concentrations of inorganic materials in the past has been that they are typically poured into a form, worked, and then allowed to set, harden, and cure over a long period of time—even days or weeks. Such time periods are certainly impractical for the economic mass production of disposable containers and similar products.

As a result, an important feature of the present invention is that when the highly inorganically filled mixture is molded into a sheet, it will maintain its shape (i.e., support its own weight subject to minor forces, such as gravity and movement through the processing equipment) in the green state without external support. Further, from a manufacturing perspective, in order for production to be economical, it is important that the molded sheet rapidly (in a matter of minutes, or even seconds) achieve sufficient strength so that it can be handled using ordinary manufacturing procedures, even though the highly inorganically filled mixture may still be in a green state and not fully hardened.

Another advantage of the microstructural engineering and materials science approach used in the present invention is the ability to develop compositions in which cross-sections of the structural matrix are more homogeneous than have been typically achieved in the prior art. Ideally, when any two given samples of about 1–2 mm$^3$ of the inorganically filled structural matrix are taken, they will have substantially similar amounts of voids, aggregate particles, fibers, any other additives, and properties of the matrix.

In its simplest form, the process of using materials science in microstructurally engineering and designing an inorganically filled material comprises characterizing, analyzing, and modifying (if necessary): (a) the aggregates, (b) the predicted particle packing, (c) the system rheology, (d) the average fiber length and packing density, and (e) the processing and energy of the manufacturing system.

In characterizing the aggregates, the average particle size is determined, the natural packing density of the particles (which is a function of the shape of the particles) is determined, and the strength of the particles is ascertained. With this information, the particle packing can be predicted according to mathematical models. It has been established that the particle packing is a primary factor for designing desired requirements of the ultimate product, such as workability, form stability, shrinkage, bulk density, insulative capabilities, tensile, compressive, and flexural strengths, elasticity, durability, and cost optimization. The particle packing is affected not only by the particle and aggregate characterization, but also by the amount of water and its relationship to the interstitial void volume of the packed aggregates.

System rheology is a function of both macro-rheology and micro-rheology. The macro-rheology is the relationship of the solid particles with respect to each other as defined by the particle packing. The micro-rheology is a function of the lubricant fraction of the system. By modification of the lubricants (which may be water, the water-dispersable binder, plasticizers, dispersants, or other materials), the viscosity and yield stress can be chemically modified. The micro-rheology can also be modified physically by changing the shape and size of the particles: e.g., chopped fibers, plate-like mica, round-shaped silica fume, or hydraulically settable binder particles will interact with the lubricants differently.

Finally, the manufacturing process can be modified to manipulate the balance between workability and form stability. As applied to the present invention, this becomes important in significantly increasing the yield stress during formation of the sheet by either chemical additives (such as by adding a particular water-dispersable binder) or by adding energy to the system (such as by heating the molds). Indeed, it is this discovery of how to manipulate the inorganically filled compositions in order to quickly increase the form stability of the compositions during the formation process that make the present invention such a significant advancement in the art.

From the following discussion, it will be appreciated how each of the component materials within the inorganically filled mixture, as well as the processing parameters, contributes to the primary design constraints of the particular sheet and hinge to be manufactured so that they can be economically mass produced. Specific compositions are set forth in the examples given later in order to demonstrate how the maximization of the performance of each component accomplishes the combination of desired properties.

B. Moldable Mixtures

The terms "inorganically filled mixture" or "moldable mixture" have interchangeable meanings and shall refer to a mixture that can be molded into the sheets and hinges that are disclosed and claimed herein. Such mixtures are characterized by having a high concentration of inorganic filler or aggregate (at least about 40% by volume of the total solids content of the dried sheet), water, a water-dispersable binder, and a fibrous material. The mixtures may also include other admixtures such as plasticizers, lubricants, dispersants, hydraulically settable binders, and air void forming agents, which will be discussed in further detail below.

Moldable mixtures are characterized as having a relatively high yield stress, which makes them highly workable and cohesive, yet form stable immediately or shortly after being molded into the desired shape. The terms "inorganically filled mixture", "inorganically filled moldable mixture", or "moldable mixture" shall refer to the mixture regardless of the extent of drying or curing that has taken place. Such mixtures shall include mixtures that are highly workable, which are partially dried, and which have been completely dried (although a certain amount of water will usually remain within the sheets as bound water within the water-dispersable binder).

After the moldable mixture has been formed into the desired shape, the resulting sheet or object made therefrom will have a "highly filled inorganic/organic polymer matrix", "inorganically filled matrix", or "inorganically filled, organic polymer matrix". These terms shall refer to such matrices regardless of the extent of drying or curing that has taken place, the only limitation being that the sheet or object made therefrom is form stable. Nevertheless, a highly filled inorganic matrix can refer to a fresh sheet or object made therefrom as well as a sheet or object that has been partially or totally dried.

Both the moldable mixture and the inorganically filled matrix formed therefrom each constitute "highly inorganically filled materials" or "highly inorganically filled composites." As before, these terms shall refer to materials or composites without regard to the extent of wetting, setting, drying, or hardening that has taken place. They shall include materials and composites in a green (i.e., unhardened) state, as well as semi-dry or hardened materials after they have been molded into sheets, hinges, containers, or other objects.

C. Water-Dispersable Organic Binders

The moldable mixtures used to manufacture the highly inorganically filled sheets and hinges of the present invention develop strength properties through the drying out of a substantially solvated water dispersable organic binder. The moldable mixtures first develop workability and flow properties by adding an amount of water to the mixture sufficient to lubricate the solid inorganic aggregate particles and fibers, and to solvate, or at least disperse, the water-dispersable organic binder. Thereafter, the removal of water, such as by evaporation, allows the water-dispersable binder to develop its maximum strength properties.

For example, certain starch-based materials can be purchased as tiny granules which are in a powder-like form. The starch based binder is "activated" by dissolving and gelating the starch binder in water by heating the dispersion above the gelation temperature. After the water has been removed, such starch based materials can, by themselves, have tensile strengths of up to about 40–50 Mpa. Through careful microstructural engineering, the highly inorganically filled sheets (and containers or other objects made therefrom) can have varying tensile strengths, even approaching 40 Mpa in some cases.

The water-dispersable organic binder not only binds the individual aggregate particles and fibers together within the mixture upon drying or hardening (thereby forming a structural or highly inorganically filled matrix), but also has the general tendency of affecting the rheology of the moldable mixture. In fact, the water-dispersable binders disclosed herein have been used in cementitious and other hydraulically settable mixtures as rheology-modifying agents, although it has been understood that they also impart a degree of binding to the final hardened material if included in large enough amounts.

The various water-dispersable organic binders contemplated by the present invention can be roughly organized into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch-based materials and derivatives thereof, and (c) other polysaccharides. The various organic binders can be used separately or in a variety of mixtures.

Suitable cellulose-based polymer binders include, for example, methylhydroxyethylcellulose, hydroxymethylethylcellulose, carboxymethylcellulose, methylcellulose, ethylcellulose, hydroxyethylcellulose, hydroxyethylpropylcellulose, etc. The entire range of possible permutations is enormous and shall not be listed here, but other cellulose materials that have the same or similar properties as these would also work well. Some cellulose-based binders can also be cross-polymerized in solution; an example of this is Cellosize®, a hydroxyethylcellulose product available from Union Carbide. Cellosize® can be cross-linked in water with dialdehydes, methylol ureas, or melamine-formaldehyde resins, thereby forming a less water-soluble binder.

Suitable starch-based polymer binders include, for example, amylopectin, amylose, seagel, starch acetates, starch hydroxyethyl ethers, ionic starches, long-chain alkylstarches, dextrins, amine starches, phosphate starches, dialdehyde starches, etc.

Other natural polysaccharide-based binders include, for example, alginic acid, phycocolloids, agar, gum arabic, guar gum, locust bean gum, gum karaya, and gum tragacanth.

Suitable protein-based binders include, for example, Zein® (a prolamine derived from corn), collagen (derivatives extracted from animal connective tissue such as gelatin and glue), and casein (the principle protein in cow's milk).

Finally, suitable synthetic organic polymer binders that are water dispersable include, for example, polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, ethylene oxide polymers, polylactic acid, synthetic clay, and latex (which is a broad category that includes a variety of polymerizable substances formed in a water emulsion; an example is styrene-butadiene copolymer).

The water-dispersable organic binders within the moldable mixtures used in the present invention are preferably included in an amount such that an inorganically filled structural matrix made therefrom will contain from about 1% to about 50% organic binder by volume of the total solids within the structural matrix, more preferably from about 2% to about 30% by volume, and most preferably from about 5% to about 20% by volume.

D. Aggregates

Inorganic materials commonly used in the paper industry, as well as more finely ground aggregate materials used in the concrete industry, may be used in the moldable mixtures of the present invention. Nevertheless, the size of the aggregate or inorganic filler materials will often be many times larger than inorganic filler materials used in the paper industry. While the average diameter of the particles within the inorganic fillers used in the paper industry will usually be less than 2 microns, the average particle diameter of the aggregate materials used in the present invention can, in some cases, be up to 100 microns or larger depending on the wall thickness of the resulting sheet and, hence, can be less expensive.

The inorganic filler materials used in the paper industry are required to be much smaller and are generally more uniformly sized than the aggregate particles used in the moldable mixtures of the present invention. In fact, it is often preferable to use a wide range of particle sizes in the present invention in order to increase the particle-packing density of the moldable mixture. Uniformly sized particles typically have a packing density of about 0.624. The result is that the inorganic materials used in the present invention will generally cost far less than the inorganic filler materials used in the paper industry.

It is far more expensive to maintain the extremely small particle size tolerances required in the paper industry, as well as maintaining a general uniformity of particle size. The greatly increased range of particle sizes also allows for a much larger variety of inorganic aggregate materials to be used in the present invention compared to the manufacture of paper.

The aggregates used in the present invention do have size limitations imposed by the generally thin-walled structures that utilize the hinge of the invention. The diameter of the aggregates used will most often be less than about 25% of the smallest cross-section of the structural matrix forming the hinge.

Because of the much larger variety of aggregate materials that may be added to the moldable mixtures in the present invention compared to the inorganic fillers used to manufacture paper, the aggregate materials of the present invention may be selected to impart a much larger variety of properties to the final sheet. Whereas in paper, the inorganic filler is added mainly to affect the color and the surface quality of the resulting sheet of paper, the aggregate materials employed in the present invention can be added to increase the strength (tensile and, especially, compressive strength), increase the modulus of elasticity and elongation, decrease the cost by acting as an inexpensive filler, decrease the weight, and/or increase the insulation ability of the resultant highly inorganically filled material.

Examples of useful aggregates, which can be used singly or in a variety of mixtures, include perlite, vermiculite, sand, gravel, rock, limestone, sandstone, glass beads, aerogels, xerogels, seagel, mica, clay, synthetic clay, alumina, silica, fly ash, fumed silica, fused silica, tabular alumina, kaolin, microspheres, hollow glass spheres, porous ceramic spheres, gypsum such as gypsum dihydrate, calcium carbonate, calcium aluminate, xonotlite (a crystalline calcium silicate gel), lightweight expanded geologic materials such as lightweight expanded clays, hydrated or unhydrated hydraulic cement particles and other hydraulically settable materials, pumice, exfoliated rock, and other geologic materials. Partially hydrated and hydrated cement, as well as silica fume, have a high surface area and give excellent benefits such as high initial cohesiveness of the freshly formed sheet.

Plate-like aggregates, such as mica and kaolin, can be used in order to create a smooth surface finish in the inorganically filled material. Typically, larger aggregates, such as calcium carbonate, give a matte surface, while smaller particles give a glass surface. The advantage of the present invention over the manufacture of conventional paper is that any of these aggregate materials may be added directly into the matrix.

Even discarded inorganically filled materials, such as discarded sheets, containers, or other objects can be employed as aggregate fillers and strengtheners. It will also be appreciated that the sheets, hinges and other objects of the present invention can be easily and effectively recycled by simply adding them to fresh moldable mixtures as an aggregate filler.

Clay and gypsum are particularly important aggregate materials because of their ready availability, extreme low cost, workability, ease of formation, and because they can also provide a degree of binding and strength if added in high enough amounts. "Clay" is a term that refers to materials found in the earth that have certain chemical compositions and properties. The predominant clays include silica and alumina (used for making pottery, tiles, brick, and pipes) and kaolinite. The kaolinitic clays are anauxite, which has the chemical formula $Al_2O.3SiO_2.2H_2O$, and montmorilonite, which has the chemical formula $Al_2O_3.4SiO_2.H_2O$. Clays may also contain a wide variety of other substances, such as iron oxide, titanium oxide, calcium oxide, zirconium oxide, and pyrite.

Although clays can obtain hardness even without being fired, such unfired clays are vulnerable to water degradation and exposure, are extremely brittle, and have low strength. Nevertheless, clay makes a good, inexpensive aggregate within the inorganically filled composites of the present invention.

The aggregate material used in the present invention can include a hydraulically settable material such as calcium oxide, gypsum hemihydrate, hydraulic cements, or various mixtures thereof.

Gypsum hemihydrate is hydratable and forms the dihydrate of calcium sulfate in the presence of water. Thus, gypsum may exhibit the characteristics of both an aggregate and a binder depending on whether the hemihydrate or dihydrate form is added to a moldable mixture, and the concentration thereof.

Various hydraulic cements can be added as an inorganic filler material within the moldable mixtures of the present invention. Not only are hydraulic cements relatively inexpensive and plentiful, but they also can impart a degree of binding to the inorganically filled matrix if included in high enough amounts. In addition, hydraulic cement chemically reacts with water, thereby causing an internal drying effect within the moldable mixture which effectively removes at least some of the water within the mixture without the need for evaporation. The same is true for gypsum hemihydrate and calcium oxide. Prehydrated cement particles may also be added as an aggregate filler. One difference between unhydrated and prehydrated cement is that the latter has a distinctly different morphology, including microgel and platelets.

The terms "hydraulic cement" or "cement" as used herein are intended to include clinker and crushed, ground, milled, and processed clinker in various stages of pulverization and in various particle sizes. Examples of typical hydraulic cements that can be utilized singly or in various mixtures include: the broad family of portland cements such as portland grey cement and portland white cement (including ordinary portland cement without gypsum), MDF cement, DSP cement, Densit-type cements, Pyrament-type cements, calcium aluminate cements (including calcium aluminate cements without set regulators), plasters, silicate cements (including $\beta$-dicalcium silicates, tricalcium silicates, and mixtures thereof), gypsum cements, phosphate cements, high alumina cements, microfine cements, slag cements, magnesium oxychloride cements, and aggregates coated with microfine cement particles.

In addition, the hydraulic cement can effect the rheology of the moldable mixture, at least in part by chemically reacting with the water, thereby diminishing the amount of water available to lubricate the aggregate particles and fibers. In addition, it has been found that portland grey cement increases the internal cohesion of the moldable mixture, perhaps because of the increase in amount of aluminates within this type of cement. Finally, although the mechanism is not clear, it appears that hydraulic cement may interact to some degree with the large number of hydroxyl groups present on many organic polymer binders. The hydroxyl groups of such binders will, at a minimum, have hydrogen bonding-like interactions with the highly polar hydraulic cement gel products, being known to adsorb onto the surface of cement particles.

Because of the nature of the moldable mixtures and sheets made therefrom, it is possible to include lightweight aggregates having a high amount of interstitial space in order to impart an insulation effect with the molded sheets. Examples of aggregates which can add a lightweight characteristic to the moldable mixture include perlite, vermiculite, glass beads, hollow glass spheres, synthetic materials (e.g., porous ceramic spheres, tabular alumina, etc.), cork, lightweight expanded clays, lightweight polymers, sand, gravel, rock, limestone, sandstone, pumice, and other geological materials.

In addition to conventional aggregates used in the paper and cement industries, a wide variety of other aggregates, including fillers, strengtheners, including metals and metal alloys (such as stainless steel, calcium aluminate, iron, copper, silver, and gold), balls or hollow spherical materials (such as glass, polymeric, and metals), filings, pellets, powders (such as microsilica), and fiber aggregates (such as graphite, silica, alumina, fiberglass, polymeric, organic fibers, and other such fibers typically used to prepare various types of composites), may be added to the moldable mixtures within the scope of the present invention. The fiber aggregates are to be distinguished from the fibrous material discussed in detail below. Even materials such as cork, seeds, starches, gelatins, and agar-type materials can be incorporated as aggregates. Although these latter aggregates are organic (and readily biodegradable), they are included here because they act primarily as a filler not a binder. Any of the above aggregates can be added singly or in a variety of mixtures.

Another class of aggregates that may be added to the inorganically filled mixture includes inorganic gels and microgels such as silica gel, calcium silicate gel, aluminum silicate gel, and the like, which may be added singly or in a variety of mixtures. These can be added in solid form as any ordinary aggregate material might, or they may be precipitated in situ. Because they tend to absorb water, they can be added to reduce the water content (which will increase the yield stress) of the moldable mixture.

In addition, the highly hygroscopic nature of silica-based gels and microgels allows them to be used as moisture regulation agents within the final hardened sheet. By absorbing moisture from the air, the gels and microgels will cause the inorganically filled sheets to retain a predetermined amount of moisture under normal ambient conditions. (Of course, the rate of moisture absorption from the air will correlate with the relative humidity of the air). Controlling the moisture content of the sheets allows for more careful control of the elongation, modulus of elasticity, bendability, foldability, flexibility, and ductility of the sheets.

It is also within the scope of the present invention to include polymerizable inorganic aggregate materials, such as polymerizable silicates, within the moldable mixture. These may be added to the mixture as ordinary silica or silicates, which are then treated to cause a polymerization reaction in situ in order to create the polymerized silicate aggregate. Polymerized inorganic aggregates are often advantageous in certain applications because of their increased flexibility compared to most other inorganic aggregate materials.

It is often preferable, according to the present invention, to include a plurality of differently sized and graded aggregates capable of more completely filling the interstices between the aggregate particles and fibers within the moldable mixture. Optimizing the particle packing density reduces the amount of water that is required to obtain the desired level of workability by eliminating spaces that would otherwise be filled with interstitial water, often referred to as "capillary water."

In order to optimize the packing density, differently sized aggregates with particle sizes ranging from as small as about 0.05 microns to as large as about 2 mm may be used. (Of course, the desired purpose and thickness of the resulting product will dictate the appropriate particle sizes of the various aggregates to be used.) It is within the skill of one in the art to know generally the identity and sizes of the aggregates to be used in order to achieve the desired rheological properties of the green moldable mixtures, as well as the final strength and weight properties of the final hardened inorganically filled composite.

In certain preferred embodiments of the present invention, it may be desirable to maximize the amount of the aggregates within the moldable mixture in order to maximize the properties and characteristics of the aggregates (such as qualities of strength, low density, or high insulation). The use of particle packing techniques may be employed within the highly inorganically filled material in order to maximize the amount of such aggregates. The particle packing density of the aggregate material used in the inorganically filled matrix is at least about 0.65, preferably at least about 0.75, and most preferably at least about 0.85.

A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Anderson, P. J., "Control and Monitoring of Concrete Production—A Study of Particle Packing and Rheology," The Danish Academy of Technical Sciences. For purposes of disclosure, the foregoing article and doctoral dissertation are incorporated herein by specific reference.

In embodiments in which it is desirable to obtain a sheet (or object made therefrom) having a reduced density and a high insulation capability, it may be preferable to incorporate into the highly inorganically filled matrix a lightweight aggregate that has a low thermal conductivity, or "k-factor" (defined as W/m.K). The k-factor is roughly the reciprocal of the expression commonly used in the United States to describe the overall thermal resistance of a given material, or "R-factor," which is generally defined as having units of hr.ft$^2$°F./BTU. The term R-factor is most commonly used in the United States to describe the overall thermal resistance of a given material without regard to the thickness of the material. However, for purposes of comparison, it is common to normalize the R-factor to describe thermal resistance per inch of thickness of the material in question or hr.ft$^2$°F./BTU.in.

For purposes of this specification, the insulation ability of a given material will hereinafter be expressed only in terms of the IUPAC method of describing thermal conductivity, i.e., "k-factor." (The conversion of thermal resistance expressed in British units (hr.ft$^2$°F./BTU.in) to IUPAC units can be performed by multiplying the normalized number by 6.9335 and then taking the reciprocal of the product.) Generally, aggregates having a very low k-factor also contain large amounts of trapped interstitial space, air, mixtures of gases, or a partial vacuum which also tends to greatly reduce the strength of such aggregates. Therefore, concerns for insulation and strength tend to compete and should be carefully balanced when designing a particular mixed design.

The preferred insulating, lightweight aggregates include expanded or exfoliated vermiculite, perlite, calcined diatomaceous earth, and hollow glass spheres—all of which tend to contain large amounts of incorporated interstitial space. However, this list is in no way intended to be exhaustive, these aggregates being chosen because of their low cost and ready availability. Nevertheless, any aggregate with a low k-factor, which is able to impart sufficient insulation properties to the sheet or other article made therefrom, is within the scope of the present invention.

In light of the foregoing, the amount of aggregate that will be added to the moldable mixture used in forming an inorganically filled structural matrix will depend on a variety of factors, including the quantity and identity of the other added components, as well as the particle packing density of the aggregates themselves. The inorganic aggregate components used in the present invention will preferably be included in an amount from as low as about 40% by volume of the total solids content of the inorganically filled structural matrix to as high as about 98% by volume, more preferably in the range from about 50% to about 95% by volume, and most preferably in the range from about 60% to about 80% by volume of the total solids.

As set forth above, differently sized aggregate materials may be added in varying amounts in order to affect the particle-packing density of the moldable mixture. Depending upon the natural packing density of each aggregate material, as well as the relative sizes of the particles, it is possible that the resulting volume of the combined aggregates will be less than the sum of the volumes of the aggregates before they were mixed.

E. Fibers

As used in the specification and the appended claims, the terms "fibers" or "fibrous materials" include both inorganic fibers and organic fibers. Fibers may be added to the moldable mixture to increase the cohesion, elongation ability, deflection ability, toughness, fracture energy, and flexural, tensile, and on occasion compressive strengths of the resulting inorganically filled material. Fibrous materials reduce the likelihood that the highly inorganically filled sheets, or articles made therefrom, will shatter when cross-sectional forces are applied.

In evaluating potential fibers for use in the inorganically filled material used in forming the hinge of the present invention, important characteristics to consider are: the physical properties of the fibers (e.g., length and diameter, tensile strength, and wettability/dispersability), cost, reliability of supply (quantity and consistency), the relative level of contaminants in the fiber (e.g.,lignin, pectin, fats/waxes, etc.) and the acceptability of the fiber to food contact applications. The use of fibers dramatically increases the fracture energy of the material, which makes the containers and hinges formed therefrom particularly useful for packaging, storing, and shipping goods.

Examples of fibers that may be utilized singly or in a variety of mixtures include glass fibers, silica fibers, ceramic fibers (such as alumina, silica nitride, silica carbide, graphite), rock wool, metal fibers, carbon fibers, and synthetic polymer fibers such as polypropylene, polyethylene, nylon, or rayon fibers. Fibers extracted from plant leaves and stems may be used, as well as any naturally occurring fiber comprised of cellulose. Such fibers are available from wood and paper pulp (e.g., wood flour or saw dust), wood fibers (both hard wood or soft wood, examples of which include southern hardwood and southern pine, respectively), recycled paper, cotton, cotton linters, abaca (extracted from a Philippine hemp plant related to the banana), sisal, jute, sunn hemp, flax, and bagasse. Recycled paper fibers are somewhat less desirable because of the fiber degradation that occurs during the original paper manufacturing process, as well as in the recycling process.

The above fibers are used in the present invention due to their low cost, high strength, and ready availability. Nevertheless, any equivalent fiber that imparts compressive and tensile strength, as well as toughness and flexibility (to the extent needed), is within the scope of the present invention. The only limiting criteria is that the fibers impart the desired properties without adversely reacting with the other constituents of the inorganically filled material and without contaminating the materials (such as food) stored or dispensed in objects made from sheets containing such fibers.

Fibers that may be incorporated into the inorganically filled matrix preferably include naturally occurring organic fibers, such as cotton fibers, wood fibers, abaca fibers, and inorganic fibers made from glass, graphite, silica, ceramic, or metal materials. For purposes of illustration, abaca fibers are available from Isarog Inc. in the Philippines, while glass fibers, such as Cemfill®, are available from Pilkington Corp. in England.

It should be understood that the fibers used within the scope of the present invention differ from fibers typically employed in making paper or cardboard sheets, primarily in the way in which the fibers are processed. In the manufacture of paper, either a Kraft or a sulphite process is typically used to form the pulp sheet. In the Kraft process, the pulp fibers are "cooked" in a NaOH process to break up the fibers. In a sulphite process, acid is used in the fiber disintegration process.

In both of these processes, the fibers are first processed in order to release lignins locked within the fiber walls. However, in order to release the lignins from the fiber, some of the strength of the fiber is lost. Because the sulfite process is even more severe, the strength of the paper made by a sulphite process will generally have only about 70% of the strength of paper made by the Kraft process. (Hence, to the extent wood fibers are included, those processes using a Kraft process are preferred.)

The fibers used in making the sheets and hinges of the present invention preferably have a high length to width ratio (or "aspect ratio") because longer, narrower fibers can impart more strength to the inorganically filled structural matrix without significantly adding bulk and mass to the composite materials. The fibers should have an average aspect ratio of at least about 10:1, preferably at least about 100:1, and most preferably at least about 1000:1. Nevertheless, fibers having a smaller aspect ratio are generally more easily placed within the sheet and yield a sheet with more uniformity and fewer defects.

The amount of fibers added to the moldable mixture used in forming an inorganically filled structural matrix will vary depending upon the desired properties of the final product, with tensile strength, toughness, flexibility, and cost being the principle criteria for determining the amount of fiber to be added in any mix design. The concentration of fibers within the structural matrix will preferably be in the range from about 0.5% to about 50% by volume of the total solids content, more preferably from about 2% to about 30% by volume, and most preferably from about 5% to about 20% by volume. In light of these ranges and those given with respect to the organic polymer binder, the total amount of organics within the structural matrix will preferably be less than about 60% by volume of the total solids content, more preferably less than about 40% by volume, and most preferably less than about 30% by volume.

It has been found that slight increases of fiber concentration below about 20% fiber by volume tend to dramatically increase the strength, toughness, and bending endurance of a finished sheet. Adding fibers above about 20% by volume will produce a less dramatic increase in the strength and flexibility of the sheet, although such increases may be economically justified in some circumstances.

It will be appreciated, however, that the strength of the fiber is a very important feature in determining the amount of the fiber to be used. The stronger the tensile strength of the fiber, the less the amount of fiber that must be used to obtain a given tensile strength in the resulting product. Of course, while some fibers have a high tensile and tear and burst strength, other types of fibers with a lower tensile strength may be more elastic. Fibers with a smaller aspect ratio are more easily placed and yield a sheet with fewer defects, while a larger aspect ratio increases the strength-imparting effect of the fiber. A combination of two or more fibers may be desirable in order to obtain a resulting product that maximizes multiple characteristics, such as higher tensile strength, higher elasticity, or better fiber placement.

It should also be understood that some fibers, such as southern pine and abaca, have high tear and burst strengths, while others, such as cotton, have lower strength but greater flexibility. In the case where better placement, higher flexibility, and higher tear and burst strength are desired, a combination of fibers having varying aspect ratios and strength properties can be added to the mixture. For example, a mixture of southern hardwood and southern pine allows for better dispersion of the fibers throughout the moldable mixture, yielding a sheet with good fiber dispersion and excellent folding endurance. In any event, as set forth more fully above, the fibers used in the present invention preferably do not undergo the intense processing of fibers used to make paper. Because of this, they maintain far more of their original strength.

Finally, it is known that certain fibers and inorganic fillers are able to chemically interact and bind with certain starch-based organic polymer binders, thereby adding another dimension to the materials of the present invention. For example, it is known that many fibers and inorganic fillers are anionic in nature and have a negative charge. Therefore, in order to maximize the interaction between the organic binder and the anionic fibers and inorganic materials, it may be advantageous to add a positively charged organic binder, such as a cationic starch.

Better water resistance can be obtained by treating the fibers with rosin and alum ($Al_2(SO_4)_3$) or $NaAl(SO_4)_2$, the latter of which precipitate out the rosin onto the fiber surface making it highly hydrophobic. The aluminum floc that is formed by the alum creates an anionic adsorption site on the fiber surface for a positively charged organic binder, such as a cationic starch.

Fibers are particularly important where a sheet has been scored and is expected to bend over a large angle (discussed in further detail below). Not only can fibers have a random orientation, but in addition, the properties imparted to the hardened sheets by the fibers can be increased by unidirectionally or bidirectionally orienting the fibers within the sheet. Depending on the shape of the extruder die head, the extrusion process itself will tend to orient the fibers in the "Y" (or longitudinal) direction. The sheet thickness reduction process, during which the sheet is also elongated, further orients the fibers in the "Y" direction.

In addition, by using a pair of rollers having different orientations in the "Z" direction (or normal to the surface of the sheet), such as by using a flat roller paired with a conical roller, a percentage of the fibers can be oriented in the "X" (or width-wise) direction. This is thought to occur because the conical roller can widen the sheet in the "X" direction. In this way a sheet having bidirectionally oriented fibers can be manufactured. As a result, the desired strength characteristics can be engineered into the resultant sheet.

The fibrous material can also be disposed in an inorganically filled matrix so that the individual fibers have a substantially higher level of directional orientation at or near the surface of the inorganically filled matrix compared to fibers within the interior of the inorganically filled matrix.

F. Water

Water is added to the moldable mixture in order to solvate, or at least disperse, the water- dispersable organic binder within the mixture. In many cases, some of the water actually reacts with and becomes chemically bound within the organic binder. In other cases it may be more loosely bound to the organic binder, often by means of hydrogen bonding. Certain amounts of water may also react with other admixtures within the mixture, such as hydraulically settable binders or other materials which chemically react with water.

The water also serves the function of creating a moldable mixture having the desired rheological properties, including viscosity and yield stress. These properties are general ways of approximating the "workability" or flow properties of the moldable mixture.

In order for the moldable mixture to have adequate workability, water must generally be included in quantities sufficient to wet each of the inorganic aggregate particles, fibers, or other solid particles, to solvate or at least disperse the organic binder, and to at least partially fill the interstices or voids between the particles. In some cases, such as where a dispersant or a lubricant is added, adequate workability can be maintained while using less water initially.

The amount of water that is added to the moldable mixture must be carefully balanced so that the mixture is sufficiently workable, while at the same time recognizing that lowering the initial water content increases both the green strength and the final strength of the hardened product. Less water results in a stronger final product because the total porosity is reduced during the molding processes. Moreover, if less water is initially included in the moldable mixture, less water must be removed in order to cause the molded product or sheet to harden.

The appropriate rheology to meet these needs can be defined in terms of yield stress. The yield stress of the moldable mixture is in the range from about 2 kPa to about 5 MPa, preferably in the range from about 100 kPa to about 1 MPa, and more preferably in the range from about 200 kPa to about 700 kPa. The desired level of yield stress can be adjusted and optimized to the particular molding process being used to form the sheet and hinges made therein.

In some cases it may be desirable to initially include a relatively high amount of water in light of the fact that excess water can later be removed by heating the molded sheet during or shortly after the molding process. Nonetheless, one of the important features of the present invention as compared to the manufacture of conventional paper is that the amount of water initially within the moldable mixture is far less than the amount normally found in fiber slurries used to make conventional paper. This results in a mixture having far greater yield stress and form stability compared to paper-making slurries. The result is that the total amount of water that must be removed from the moldable mixture to obtain a self-supporting material (i.e., a form stable material) is much less in the case of the mixtures of the present invention compared to the slurries used to manufacture conventional paper. In fact, conventional paper-making slurries have virtually no form stability until they have been dewatered to a significant degree.

The sizes of the individual aggregate particles and fibers can be selected in order to increase the particle packing density of the resulting moldable mixture. The amount of water that must be added in order to obtain a moldable mixture having a particular rheology or yield stress will, to a large extent, depend on the particle-packing density. For example, if the particle-packing density of the moldable mixture is 0.65, water will be included in an amount of roughly 35% by volume in order to substantially fill the interstitial voids between the particles. On the other hand, a moldable mixture having a particle-packing density of 0.95 will only require water in an amount of about 5% by volume in order to substantially fill the interstitial voids. This is a seven-fold decrease in the amount of water that must be added in order to substantially fill the interstitial voids, which influences the rheology and workability of the moldable mixture. The actual particle packing density will generally range between these two extremes.

In light of the foregoing, the amount of water that should be added to the mixture will depend to a large extent on the level of particle packing density within the mixture, the amount of water-dispersable binder that is added, as well as the desired rheology of the resultant moldable mixture. Hence, the amount of water that will be added to form the moldable mixture will range from as little as 5% to as high as 50% by volume of the moldable mixture. The exact amount of water will greatly vary depending on the volume and identity of other components and admixtures within the mixture. One skilled in the art will be able to adjust the level of water to obtain adequate workability for any given manufacturing process.

It is preferable in most cases to include the minimum amount of water that is required to give the moldable mixture the desired level of workability, and thereby reduce the amount of water that must be removed from the processed sheet. Decreasing the amount of water that must be removed generally reduces the cost of manufacture since removing water requires energy. Nevertheless, the compositions used in the present invention include far less water, even at the upper ranges of water inclusion, compared to slurries used to make paper, which generally contain more than 95% water by volume.

G. Dispersants

The term "dispersant" is used herein to refer to the class of materials that can be added to reduce the viscosity and yield stress of the moldable mixture. A more detailed description of the use of dispersants may be found in the Master's Thesis of Andersen, P. J., "Effects of Organic Superplasticizing Admixtures and their Components on Zeta Potential and Related Properties of Cement Materials" (The Pennsylvania State University Materials Research Laboratory, 1987). For purposes of disclosure, the foregoing Master's Thesis is incorporated herein by specific reference.

Dispersants generally work by being adsorbed onto the surface of the aggregate particles and/or into the near colloid double layer of the particles, particularly if hydraulic cement particles are added. This creates a negative charge on or around the surfaces of the particles causing them to repel each other. This repulsion of the particles adds "lubrication" by reducing the friction or attractive forces that would otherwise cause the particles to have greater interaction. Hence, the packing density is increased somewhat and less water may be added initially while maintaining the workability of the moldable mixture.

Greatly reducing the viscosity and yield stress may be desirable where plastic-like properties, cohesiveness, and/or form stability are less important. Adding a dispersant aids in keeping the moldable mixture workable even when very little water is added.

Nevertheless, due to the nature of the coating mechanism of the dispersant, the order in which the dispersant is added to the mixture can often be critical. If certain water-dispersable organic binders (such as Tylose®) are used, the dispersant should be added to a mixture containing water and at least part of the inorganic aggregates first and then the binder should be added second. Otherwise, the dispersant will be less able to become adsorbed onto the surface of the aggregate particles because the Tylose® will first be irreversibly adsorbed, thereby forming a protective colloid on the surface and thereby preventing the dispersant from being adsorbed.

A preferred dispersant is sulfonated naphthalene-formaldehyde condensate, an example of which is marketed under the trademark WRDA 19, which is available from W. R. Grace, Inc. Other dispersants which can also work well include sulfonated melamine-formaldehyde condensate, lignosulfonate, and polyacrylic acid.

The dispersants contemplated within the present invention have sometimes been referred to in the concrete industry as "superplasticizers." In order to better distinguish dispersants from other rheology-modifying agents, which often act as plasticizers, the term "superplasticizer" will not be used in this specification.

The amount of added dispersant will generally range up to about 5% by weight of the water in the moldable mixture, more preferably in the range from about 0.5% to about 4% by weight, and most preferably within the range from about 1% to about 2% by weight. The amount of added dispersant will generally range up to about 3% by volume of the total solids content in the inorganically filled structural matrix, more preferably within the range of between about 0.1% to about 2% by volume, and most preferably within the range of between about 0.2% to about 1% by volume.

H. Air Voids

Where insulation, not strength, is the overriding factor (i.e., whether it is desired to insulate hot or cold materials), it may be desirable to incorporate tiny air voids within the structural matrix of the sheets in addition to lightweight aggregates in order to increase the insulating properties of the sheet or article made therefrom. The incorporation of air voids into the moldable mixture is carefully calculated to impart the requisite insulation characteristics without degrading the strength of the sheet to the point of nonutility. Generally, however, if insulation is not an important feature of a particular product, it is desirable to minimize any air voids in order to maximize strength and minimize volume.

In certain embodiments, nonagglomerated air voids may be introduced by high shear, high speed mixing of the moldable mixture, with a foaming or stabilizing agent added to the mixture to aid in the incorporation of air voids. High shear, high energy mixers are particularly useful in achieving this desired goal. Suitable foaming and air entraining agents include commonly used surfactants. One preferred surfactant is a polypeptide alkylene polyol, such as Mearlcrete® Foam Liquid.

In conjunction with the surfactant, it will be necessary to stabilize the entrained air within the material using a stabilizing agent like Mearlcel 3532®, a synthetic liquid anionic biodegradable solution. Both Mearlcrete® and Mearlcel® are available from the Mearl Corporation in New Jersey. Another foaming and air-entraining agent is vinsol resin. In addition, the organic polymeric binder can act to stabilize the entrained air. Different air-entraining agents and stabilizing agents impart different degrees of foam stability to the inorganically filled mixture, and they should be chosen in order to impart the properties that are best suited for a particular manufacturing process.

Foam stability helps maintain the dispersion, and prevents the agglomeration, of the air voids within the unhardened moldable mixture. Failure to prevent the coalescence of the air voids actually decreases the insulation effect, and it also greatly decreases the strength of the hardened moldable mixture. Raising the pH, increasing the concentration of soluble alkali metals such as sodium or potassium, adding a stabilizing agent such as a polysaccharide rheology-modifying agent, and carefully adjusting the concentrations of surfactant and water within the moldable mixture all help to increase the foam stability of the mixture.

During the process of molding and/or hardening the moldable mixture, it is often desirable to heat the moldable mixture in order to increase the volume of the air void system. Heating also aids in rapidly removing significant amounts of the water from the moldable mixture, thereby increasing the green strength of the molded product.

If a gas has been incorporated into the moldable mixture, heating the mixture to 250° C., for example, will result (according to the ideal gas equation) in the gas increasing its volume by about 85%. When heating is appropriate, it has been found desirable for the heating to be within a range from about 100° C. to about 250° C. The upper limit is set by any adverse reactions within the moldable mixture that might occur, such as the burning of the fibers or organic binder. More importantly, if properly controlled, heating will not result in the cracking of the structural matrix of the sheet, or yield imperfections in the surface texture of the sheet.

Another foaming agent is a mixture of citric acid and bicarbonate, or bicarbonate that has been processed into small granules or particles and coated with wax, starch, or water soluble coatings. This can be used in void formation two ways: (1) to react with water and form $CO_2$ gas in order to create a cellular foam structure within the inorganically filled matrix; or (2) to pack the particles as part of the matrix and after hardening the matrix remove the foam particles by heating the product above 180° C., which causes an endothermic decomposition of the particles, leaving behind a well controlled cellular lightweight structure.

In other applications, where the viscosity of the moldable mixture is high, such as is required in certain molding processes, it is much more difficult to obtain adequate numbers of air voids through high shear mixing. In this case, air voids may alternatively be introduced into the moldable mixture by adding an easily oxidized metal, such as aluminum, magnesium, zinc, or tin to a mixture that is either naturally alkaline (such as a mixture containing hydraulic cement or calcium oxide) or one that has been made alkaline by the addition of a strong base, such as sodium hydroxide. This reaction results in the evolution of tiny hydrogen bubbles throughout the moldable mixture.

It may further be desirable to heat the mixture in order to initiate the chemical reaction and increase the rate of formation of hydrogen bubbles. It has been found that heating the molded product to temperatures in the range of from about 50° C. to about 100° C., and preferably about 75° C. to about 85° C., effectively controls the reaction and also drives off a significant amount of the water. Again, this heating process can be controlled so that it does not result in the introduction of cracks into the matrix of the molded product. This second method of introducing air voids into the structural matrix can also be used in conjunction with, or in place of, the introduction of air through high speed, high shear mixing in the case of lower viscosity moldable mixtures used in some molding processes.

Finally, air voids may be introduced into the moldable mixture during the molding process by adding a blowing agent to the mixture, which will expand when heat is added to the mixture. Blowing agents typically consist of a low boiling point liquid and finely divided calcium carbonate (chalk). The chalk and blowing agent are uniformly mixed into the moldable mixture and kept under pressure while heated. The liquid blowing agent penetrates into the pores of the individual chalk particles, which act as points from which the blowing agent can then be vaporized upon thermal expansion of the blowing agent as the pressure is suddenly reduced.

During the molding or extrusion process, the mixture is heated while at the same time it is compressed. While the heat would normally cause the blowing agent to vaporize, the increase in pressure prevents the agent from vaporizing, thereby temporarily creating an equilibrium. When the pressure is released after the molding or extrusion of the material, the blowing agent vaporizes, thereby expanding or "blowing" the moldable material. The moldable material eventually hardens with very finely dispersed voids throughout the inorganically filled structural matrix. Water can also act as a blowing agent as long as the mixture is heated above the boiling point of water and kept under pressure of up to 50 bars.

Air voids increase the insulative properties of the sheets and other articles made therefrom and also greatly decrease the bulk density and, hence, the weight of the final product. This reduces the overall mass of the resultant product, which reduces the amount of material that is required for the manufacture of the sheets and which reduces the amount of material that will ultimately be discarded in the case of disposable sheets or containers made therefrom.

I. Coatings

The sheets and containers that employ the hinges of the present invention may also have sealing materials or other protective coatings applied to their surfaces. Most coatings are applied with a solvent so that upon evaporation of the solvent the coating material remains on the surface of the sheet or container.

Appropriate organic coating materials include melamine, polyvinyl chloride, polyvinyl alcohol, polyvinyl acetate, polyacrylates, hydroxypropylmethylcellulose, polyethylene glycol, acrylics, polyurethane, polyethylene, polylactic acid, polyethylene, Biopol® (a polyhydroxybutyrate-hydroxyvalerate copolymer manufactured by ICI in the United Kingdom), waxes (such as beeswax or petroleum based wax), elastomers, polyacrylates, latex, synthetic polymers including biodegradable polymers, or mixtures thereof.

Appropriate inorganic coating materials include calcium carbonate, sodium silicate, kaolin clay, silicon oxide, aluminum oxide, ceramics, mica, and mixtures thereof. These may also be mixed with one or more of the organic coatings set forth above.

Another type of coating that may be placed on the surface of the materials used in the present invention is a reflective coating such as metal flake coatings for reflecting heat into or out of a container. Such reflective coatings are readily available, but their applicability to inorganically filled materials is novel.

In some cases, it may be preferable for the coating to be elastomeric, deformable, or waterproof. Some coatings may also be used to strengthen places where the inorganically filled sheets are more severely bent, such as where the sheet has been scored. In such cases, a pliable, possibly elastomeric, coating may be preferred. Besides these coatings, any appropriate coating material would work depending on the application involved.

For example, a coating comprised of sodium silicate, which is acid resistant, is a particularly useful coating. Resistance to acidity is important, for example, where the container is exposed to foods or drinks having a high acid content, such as soft drinks or juices. Where it is desirable to protect the container from basic substances, the containers can be coated with an appropriate polymer or wax, such as are used to coat paper containers. If the sheets are used to manufacture containers or other products intended to come into contact with foodstuffs the coating material will preferably comprise an FDA-approved coating.

The coatings may be applied to the sheets using any coating means known in the art of paper or cardboard making. Coatings may be applied by spraying the sheet, container, or other object with any of the above coating materials, or it may be advantageous to apply the coating by dipping the sheet, container, or other object into a vat containing an appropriate coating material. In the case where a coating material is sprayed onto the surface of a sheet, the coating material may be spread or smoothed by means of a doctor blade which is held a particular distance above the sheet, or which rides directly on the sheet surface.

In addition, coatings may be coextruded along with the sheet in order to integrate the coating process with the extrusion process. In other cases, the coating can be applied to the surface of the sheet by means of a gravure roller, often in conjunction with a doctor blade in order to smooth or adjust the thickness of the coating.

II. HINGES

As discussed in more detail below, a score, perforation, or preformed bend is made in an inorganically filled sheet to produce a hinge integrally formed into the sheet. The purpose of the score or perforation is to create a location on the sheet where the sheet can be bent or folded. This creates a "hinge" within the sheet with far greater bendability and resilience than possible with an unscored or unperforated sheet. The hinge of the invention may be bent up to an angle of about 90°, 180°, or 360° without substantially fracturing the inorganically filled matrix, depending on the type of score used in forming the hinge.

A certain amount of tensile elongation is needed in order to give the inorganically filled material bendability. Elongation is defined as the increase in length of a bar or section of material under test expressed as a percentage difference between the original length and the length at the moment of rupture. Expressed in a formula, percent elongation equals $100 (L_f - L_o)/L_o$, wherein $L_f$ is the final length at fracture and $L_o$ is the initial length at rest. Typically, a material cannot exceed its percentage elongation without breaking.

In the present invention, the percent elongation of the inorganically filled material increases as the thickness of the material decreases. Conversely, as the thickness of the material increases, the elongation decreases. The fibers utilized in the material contribute to the bending of the structural matrix by increasing the elongation of the matrix before fracture. As more fibers are utilized, the percent elongation of the material is increased.

Another way to express the bending properties of the inorganically filled material is through the bending radius of the material. The minimum bending radius ($r_{min}$) equals the elasticity modulus ($E_o$) times the thickness of the material (t) divided by two times the tensile strength ($\Gamma_t$) of the material. This can be expressed in the following equation: $r_{min} = E_o(t)/2\Gamma_t$. This means that if more fibers are put into the material, the tensile strength goes up and the elasticity goes down, so the material can bend in a very small radius. When the material has a higher elasticity, then a higher tensile strength is needed to bend the material in a desired manner or the thickness of the material must be decreased.

The hinge of the present invention may be a "living" hinge or a "nonliving" hinge. A living hinge has a flexible matrix and may be bent multiple times without breakage or fracture of the material forming the hinge. A nonliving hinge is less flexible and causes a hinged material to stay in place when bent. The matrix of a nonliving hinge will weaken when repeatedly bent and can eventually break apart. Preferably, a nonliving hinge of the present invention would have a low fiber content with a coating over the surface of the hinge. The coating may be sprayed onto the surface of the nonliving hinge after the hinge has been formed. When such a nonliving hinge is bent, the material of the hinge is deformed underneath the coating and the coating holds the material together after bending.

Coatings can be applied to the surface of the sheet to make it more flexible and can be applied to permanently soften the sheet or a hinge formed within the sheet. Elastomer, plastic, or paper coatings can aid in preserving the integrity of the hinge whether or not the underlying hardened structural matrix fractures upon bending at the hinge. When the hinge is bent back, the material underneath the coating will bend or break. The only thing intact would be the coating on the surface.

The present hinge may also be designed so that it bends any number of different times before breaking, preferably 1 to 15 times. The hinge may also be perforated so that the material may be easily torn apart at the hinge location.

The materials utilized in the hinge may be varied in amounts and components in order to provide preselected properties for the hinge. For example, the fiber content utilized may be varied so that the hinge is not as flexible if a limited number of bends is desired in the product utilizing the hinge. Also, a variety of different fibers can be utilized and the fibers can be aligned, concentrated or consistently spread out. The fibers can also be co-extruded with the inorganically filled material. Further, the thickness of the hinge may be altered or perforations may be put in the hinge matrix. All of the above may be altered in various combinations to provide specific characteristics in the hinge.

One way of making the hinge of the invention is by scoring the inorganically filled material along a line after the material has been formed into a sheet. Scoring is a process that displaces a given amount of material over a certain area by cutting or indenting the material with a steel plate or other device along a line, which aids in forming a bend or hinge at a predetermined location within the sheet. The score forming the hinge of the invention allows the sheet to be bent along the score up to about 180° from horizontal without fracture. The sheet preferably bends away from the score, which is different from paper-based materials that bend toward the score.

Furthermore, the hinge area of the inorganically filled sheet below the score actually becomes stronger as a result of the densification of the material at the score. This densification of the material below the score line is depicted in FIGS. 1–3, which show cross sections of inorganically filled sheets having various scores that are discussed in further detail below.

The hinge of the present invention can be advantageously formed during the sheet manufacturing process by scoring or perforating the sheet as it is being formed or soon thereafter. A score can also be cut into the surface of the sheet anytime after it is formed in order to create a line within the structural matrix upon which the sheet can later be bent.

Thus, the score can be made in the sheet while it is in the green state before the sheet is dry (e.g., while almost wet), in a semi-hardened state, or after it has become fully dried in order to form the hinge of the present invention. For example, a flat sheet can be scored and formed into the shape of a container and then hardened, or can be allowed to harden and then scored and formed into the shape of a container. The time and location of the placement of a score or perforation will depend upon the desired purpose thereof and the properties of the inorganically filled material used.

The inorganically filled sheet will preferably be in a substantially form stable state during the scoring or perforation process. This is desirable to prevent the score or perforation from closing up through the migration of moist material thereinto. Since scoring generally (and perforation always) involves cutting through a portion of the structural matrix, the sheet can even be totally dry without the scoring or perforation process harming the sheet. In cases where a score is pressed rather than cut into the sheet surface, the sheet should be moist enough to prevent fracture due to the dislocation of the structural matrix.

Where the inorganically filled sheet has a relatively low fiber content (less than 15% by volume of the total solids), it is preferable to score cut rather than score press the sheet. Conversely, where the sheet has a relatively high fiber content (greater than 15% by volume of the total solids), it is preferable to score press rather than score cut the sheet. Finally, perforations generally work well in sheets of any fiber content.

The purpose of the score or perforation is to create a location on the inorganically filled sheet where the sheet can be bent or folded. This creates a "hinge" within the sheet with far greater bendability and resilience than possible with an unscored or unperforated sheet. In some cases multiple score cuts or perforations may be desirable.

The depth of the score cut will generally depend on the type of score, the thickness of the sheet, and the degree of bending along the score line. The scoring mechanism should be adjusted to provide for a score of the desired depth. Of course, the die tap should not be so large as to actually cut through the sheet or render the sheet too thin to withstand the anticipated forces (unless an easily tearable hinge is desired). Preferably, the score cut should be just deep enough to adequately serve its purpose. A combination of score cuts on alternate sides of the sheet may be preferred in some cases to increase the range of bending motion.

In most cases where a thinner sheet (<1 mm) is being score cut or pressed, the score will have a depth relative to the thickness of the sheet that is within the range from between about 10% to about 50%, more preferably within the range from between about 20% to about 35%. In the case of thicker sheets, the score cut will usually be deeper due to the decrease in bendability of the thicker sheet. Thicker sheet materials can be scored to a depth up to about 90% of the total thickness of the material. In other words, the thickness of the hinge material after scoring can be as small as 10% of the original thickness of the sheet.

Scoring makes the remaining cross section very thin, with a preferred thickness of the material forming the hinge being in the range of about 0.01 to 1 mm, and a most preferred thickness in the range of about 0.05 to 0.5 mm. The material surrounding the hinge may be any thickness but the scored portion forming the hinge is very thin so that it may bend without breaking.

The hinge of the invention formed by scoring can have a variety of shapes in that the score line side view profile can be square, rectangular, rounded, parabolic, sinusoidal, wedge, triangular, etc. The various shapes of the hinge design provide specific bending properties. Examples of the hinge design of the invention are depicted in FIGS. 1–3, showing that the hinge can be made from a single score, a double score, or a multiple score.

Figure 1B:
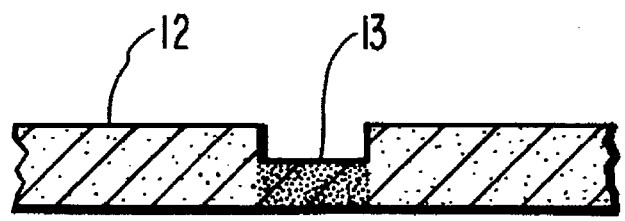
Figure 1C:
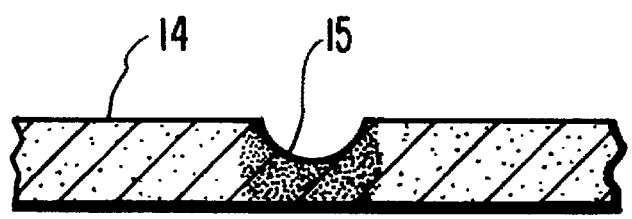
Figure 2A:
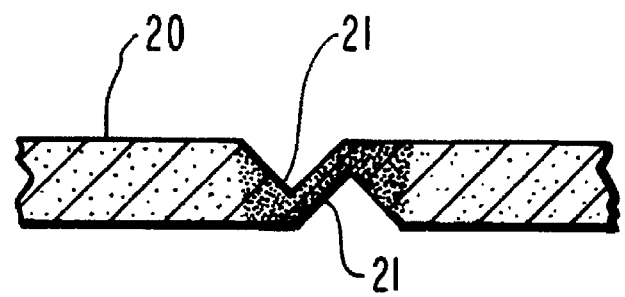
FIGS. 2A–2C include cross section side elevation views of inorganically filled sheets with different shaped double scores.
Figure 2B:
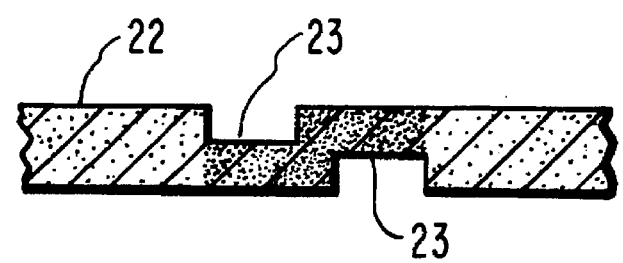
Figure 2C:
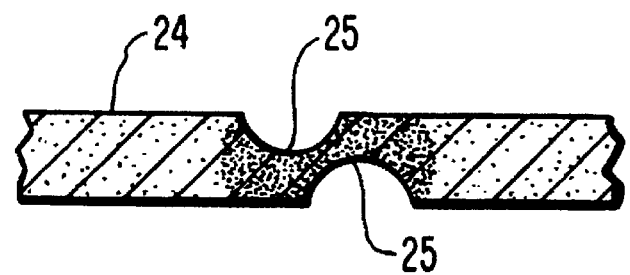

FIGS. 1A, 1B, and 1C show three inorganically filled sheets 10, 12, and 14 in cross section side views having single scores 11, 13, and 15, respectively, of different shapes. Score 11 has a triangular profile, score 13 has a rectangular profile, and score 15 has a rounded profile. FIGS. 2A, 2B, and 2C depict three sheets 20, 22, and 24 in cross section side views having double scores 21, 23, and 25, respectively, of different shapes. Score 21 has a triangular profile, score 23 has a rectangular profile, and score 25 has a rounded profile.

FIGS. 3A–3F show six inorganically filled sheets 30, 32, 34, 40, 42, and 44 in cross section side views having multiple scores 31, 33, 35, 41, 43, and 45, respectively, of different shapes. Scores 31 and 41 have a triangular profile, score 33 has a rectangular profile, scores 35 and 43 have a rounded profile, and score 45 has a sinusoidal profile.

Scoring allows the inorganically filled sheet to fold or bend along a single line up to about 90°, preferably up to about 180° from horizontal without fracturing the structural material. When multiple scores are made in a sheet on both sides thereof, the sheet can be bent up to 360° by being bendable in half in both directions. Before the present invention, it was not possible to fold or bend inorganic sheet materials along a single line greater than about 10°.

Figure 3A:
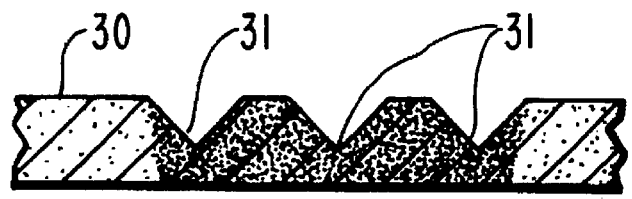
FIGS. 3A–3G include cross section side elevation views of inorganically filled sheets with different shaped multiple scores.
Figure 3B:
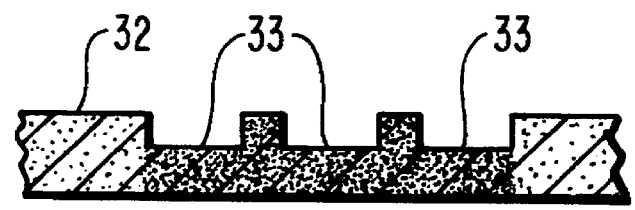
Figure 3C:
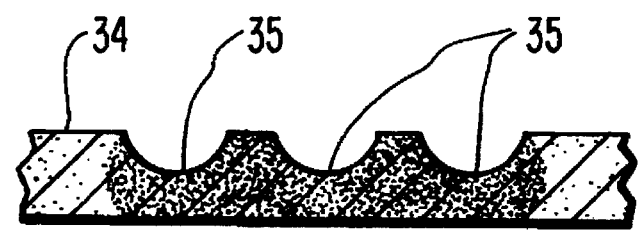
Figure 3D:
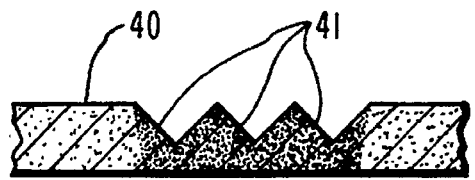
Figure 3E:
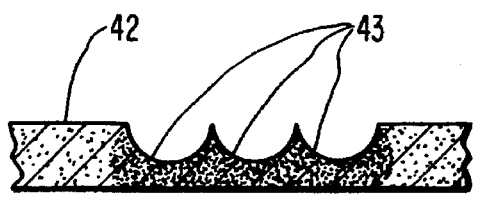
Figure 3F:
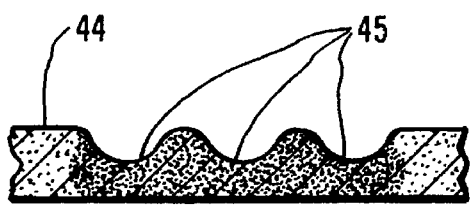
Figure 3G:
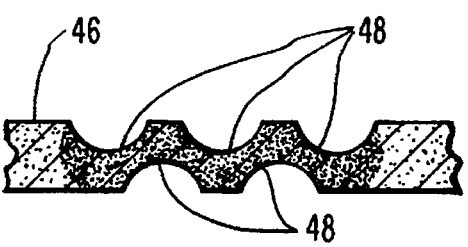

FIG. 3G depicts an inorganically filled sheet 46 in a cross section side view having multiple scores 48 with rounded profiles on both sides of the sheet. This multiple scoring on both sides of sheet 46 enables sheet 46 to be bent along the score up to about 360° without fracture. Thus, multiple scoring on both sides of a hydraulically settable sheet allows the sheet to be bent in half in either direction.

Figure 9:
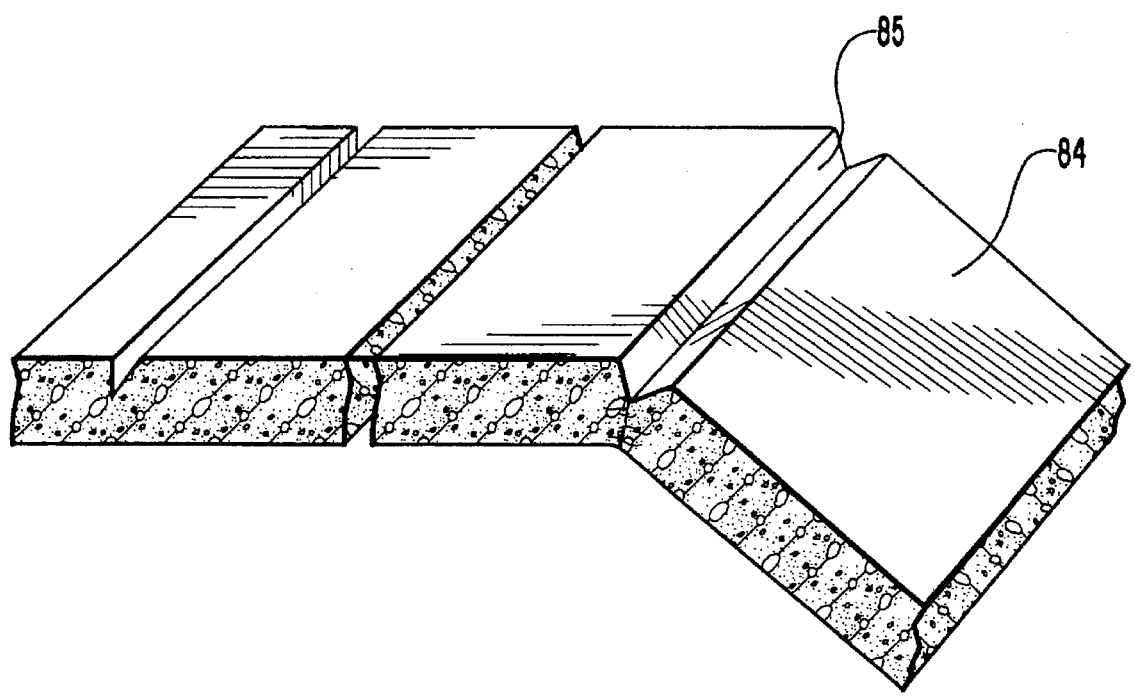
FIG. 9 is a perspective view showing how a sheet with a score cut more easily bends at the score cut.

When the sheet is scored on one side, such as shown in FIG. 1, the sheet is preferably bent away from the score. For example, if the score is made in the top of the material, then the material is bent downwards. The bend is opposite the score such as shown in FIGS. 4 and 9. Double scoring of the sheet such as shown in FIG. 2 provides a mechanism whereby the sheet can be bent in either direction without breaking. In double scoring, the scores are preferably made on both sides of the sheet as shown in FIG. 2 to provide bending both ways if desired.

Figure 7:
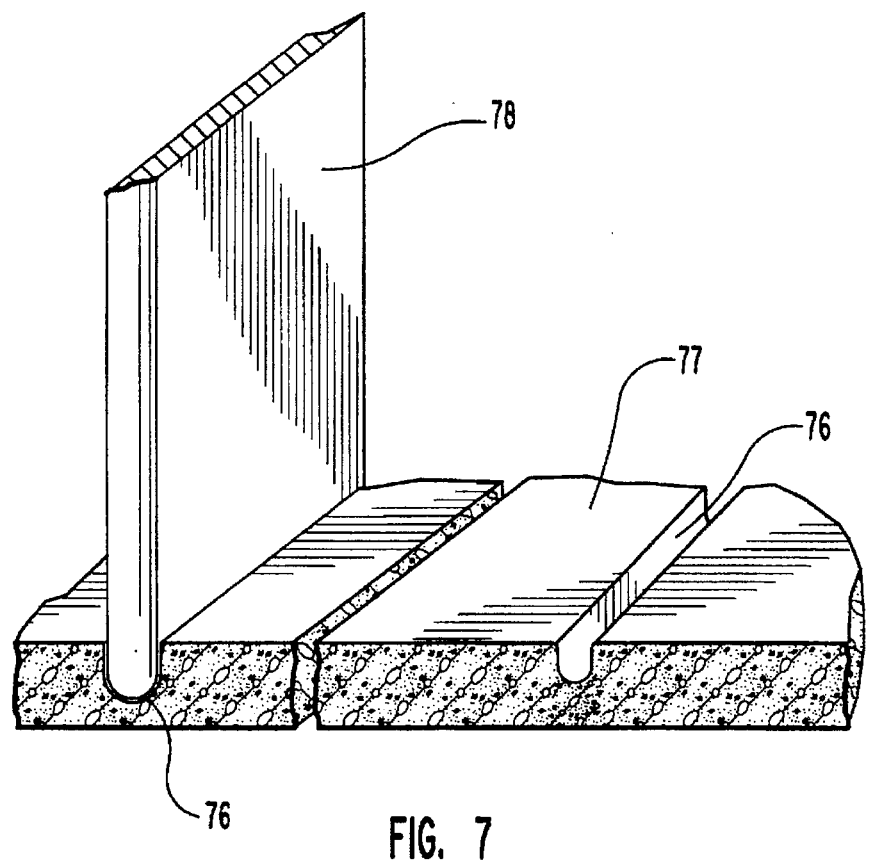
FIG. 7 is a perspective view of a score being pressed into a sheet by a scoring die.

It should be understood that while the inorganically filled sheets will bend away from a score cut or perforation, the sheets will bend toward a score that is pressed into the surface of the sheet. Thus, the sides of the sheet defined by a score cut or perforation will close together on the side opposite the score cut or perforation, as shown in FIGS. 4 and 9. Conversely, like paper or cardboard products, the sides of the inorganically filled sheet defined by a score pressed into the sheet surface, as shown in FIG. 7, will close together on the side of the score.

Figure 4A:
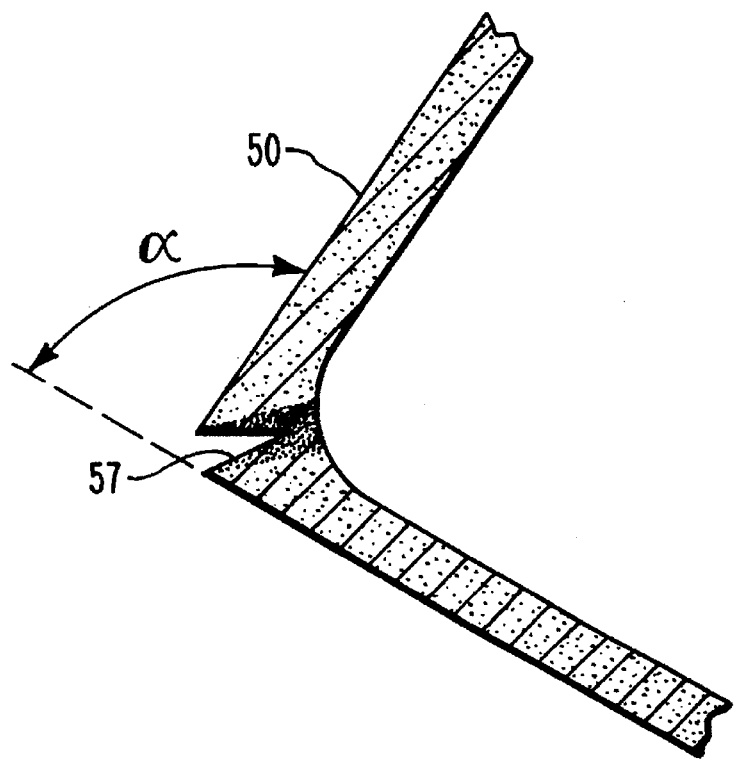
FIGS. 4A and 4B include cross section side views of inorganically filled sheets that have been bent along single and multiple score lines.
Figure 4B:
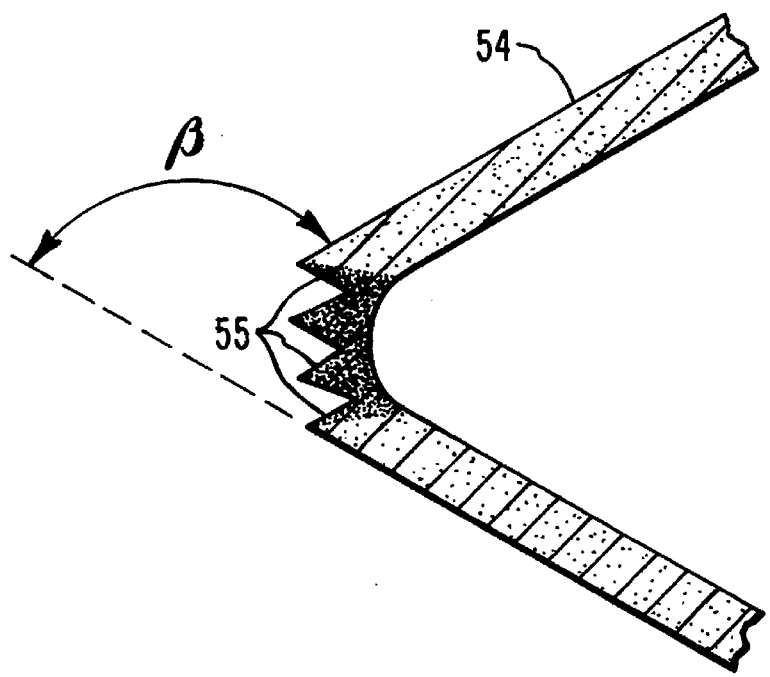

Multiple scoring of the sheet such as shown in FIG. 3 provides increased bendability (compared to single scoring) without breakage or fracturing of the sheet. This is shown in FIG. 4A which depicts sheet 50 having single score 57, and in FIG. 4B which depicts sheet 54 having multiple scores 55. Sheet 50 is shown bent at a maximum angle $\propto$ (e.g., 90°) which is less than the maximum angle $\beta$ (e.g., 130°) of sheet 54 having multiple scores. Multiple scores also allow sheets of a greater thickness to bend a greater amount, since each scored area of the sheet only has to bend a limited distance to provide the overall bending of the sheet. Multiple scores also provide for less stress on each scored area as the sheet is bent.

The scores are preferably integrally formed in the inorganically filled sheet with a die that stamps or cuts the score into the sheet. The die used in forming the score has the same profile shape as the specific score made such as square, rectangular, rounded, parabolic, sinusoidal, wedge, triangular, etc.

It may sometimes be preferable to concentrate more fibers in the area where the score cut or perforation will be made to give greater strength and flexibility in the scored area than will be subject to bending. This can be accomplished by co-extruding a second layer of inorganically filled material containing a higher fiber content at predetermined timed intervals to correspond with the location of the score cut or perforation. In addition, fibers can be placed on top of, or injected within, the sheet during the calendering or extrusion processes in order to achieve a higher fiber concentration at the desired location.

The hinge of the invention can be formed at a 0° angle or parallel with the direction of the fibers in the sheet, or can be formed at various angles up to 90° or perpendicular to the direction of the fibers. When the hinge is formed parallel to the fibers the hinge is weak. Such a hinge has minimum strength and maximum flexibility. When the hinge is formed perpendicular to the direction of the fibers, the hinge is strong. This hinge has maximum strength and minimum flexibility. Thus, the desired strength and flexibility of the material at the hinge location can be optimized when a hinge is formed at varying angles between 0° and 90° to the direction of the fibers. For example, scoring of the sheet to form a hinge is preferably done at a predetermined angle to the direction of the fibers within the sheet in order to optimize strength and flexibility of the hinge.

The act of forming or densifying the inorganically filled matrix correspondingly increases the density of the fibers in the area, preferably without damaging the fibers. In conventional tree paper, the act of scoring weakens the fibers therein to cause them to bend. In contrast, scoring of an inorganically filled material causes the fibers beneath the score line to densify in the material and thus strengthens the bend area of the material. For example, if the material has about 20% by volume of fibers, the area below a score line can increase up to about 40% by volume if the score depth is about 50% of the material thickness because of the densification of the material below the score line.

Figure 5:
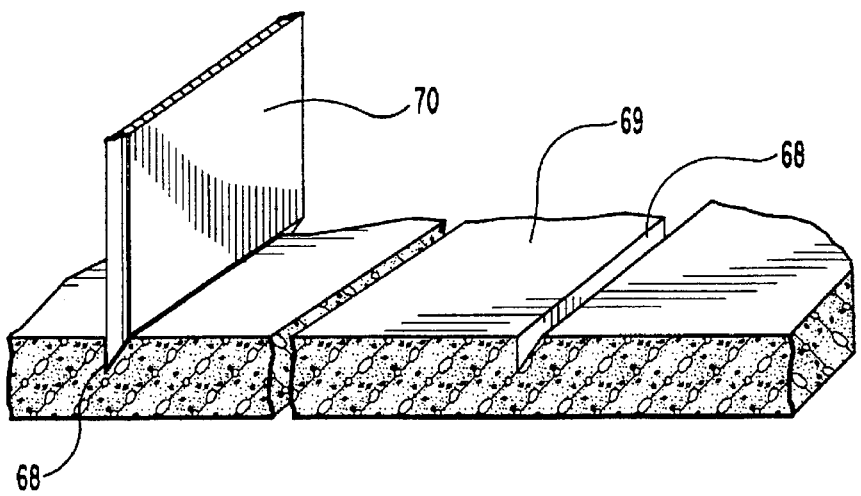
FIG. 5 is a perspective view of a sheet being score cut by a knife blade cutter.
Figure 6:
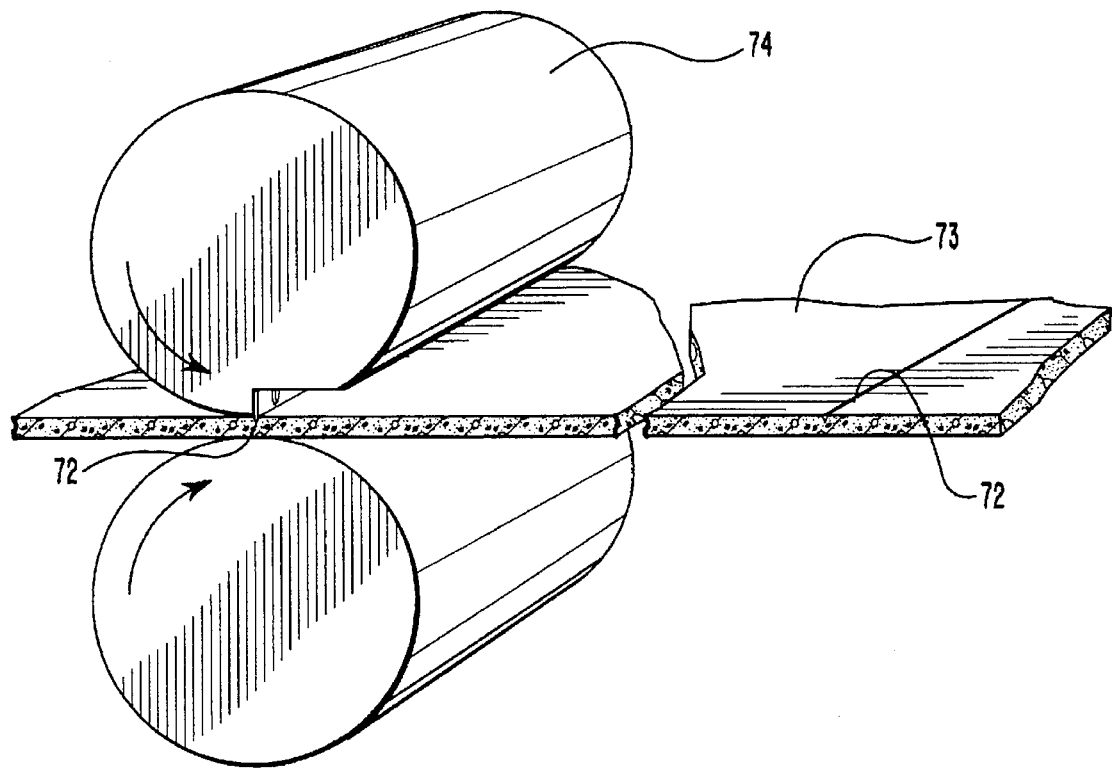
FIG. 6 is a perspective view of a sheet being score cut by a continuous die cut roller.
Figure 8:
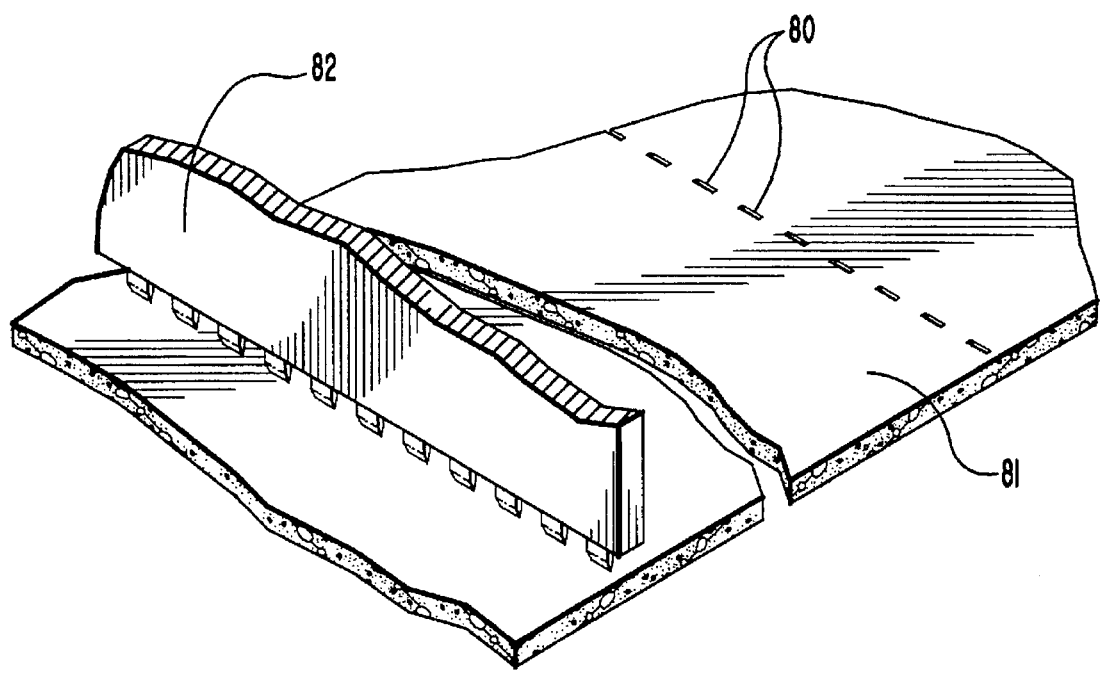
FIG. 8 is a perspective view of a sheet being perforated by a perforation cutter.

A score or perforation can be made on the inorganically filled sheet through the processes shown in FIGS. 5–8 in order to define a line upon which the sheet may fold or bend. As shown in FIG. 5, a score cut 68 can be made on sheet 69 by using a knife blade cutter 70 mounted on a score press (not shown). As shown in FIG. 6, a score cut 72 can be made on sheet 73 by using a continuous die cut roller 74. A score 76 may be pressed into sheet 77 by using a scoring die 78 as shown in FIG. 7. The pressed score is made at a controlled rate, depth, and pressure when the sheet is in a wet or semi-dry condition. If the sheet is flexed at the score while wet a living hinge is formed. Perforations 80 can be made in sheet 81 using a perforation cutter 82 as depicted in FIG. 8.

A score or perforation within the sheet creates a better fold line or hinge for a number of reasons. First, a score provides a place where the sheet might more naturally bend or fold. Second, a score makes the sheet at the score thinner than the rest of the sheet, which reduces the amount of lengthwise elongation of the surface while bending the sheet. The reduction of surface elongation reduces the tendency of the structural matrix to fracture upon being folded or bent. This is shown in FIG. 9, which depicts sheet 84 bent along score cut 85. Third, the score cut or perforation allows for a controlled crack formation or failure within the matrix in the event that fracture of the structural matrix occurs.

Figure 10:
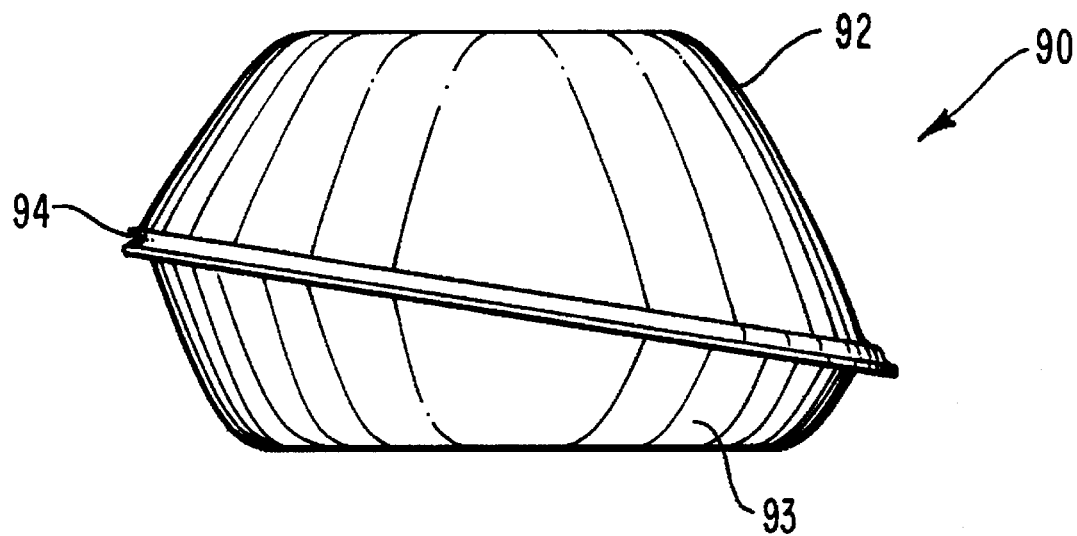
FIG. 10 is a side view of a clamshell container showing the hinge of the invention.
Figure 11:
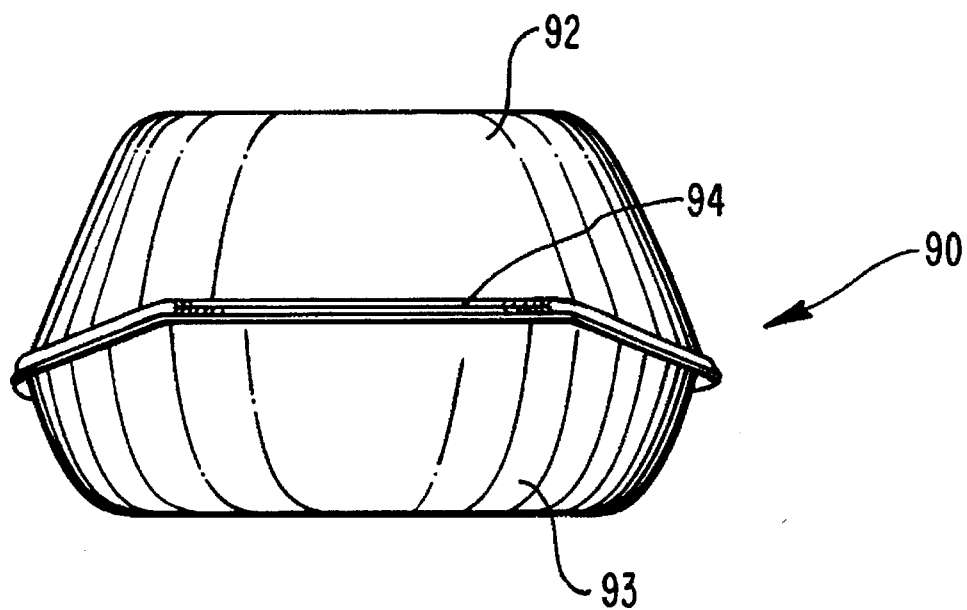
FIG. 11 is a rear view of the container shown in FIG. 10.

The hinge of the present invention can be used on a variety of different containers made from inorganically filled materials that require a pivoting mechanism to open and close the container a number of times. An example of such a container is the "clamshell" container 90 depicted in FIGS. 10–12. Container 90 has upper shell member 92 which is pivotally attached to a lower shell member 93 by a hinge 94. Hinge 94 can be formed during the manufacture of container 90 by scoring the material forming container 90. Container 90 is used to store fast food items such as hamburgers or other sandwiches after they have been made and are delivered to the customer.

The hinge of the invention may include a pulp containing material such as a pulp sheet or paper which has been applied to the desired hinge area. The pulp sheet reinforces the hinge area by adding more fiber thereto and provides easier bending of the hinge area. This permits less fiber to be used in the rest of the matrix, if desired. The pulp sheet also acts as a protective covering over the hinge area, eliminating dust from breakage of the material in the hinge area if this occurs.

Figure 12:
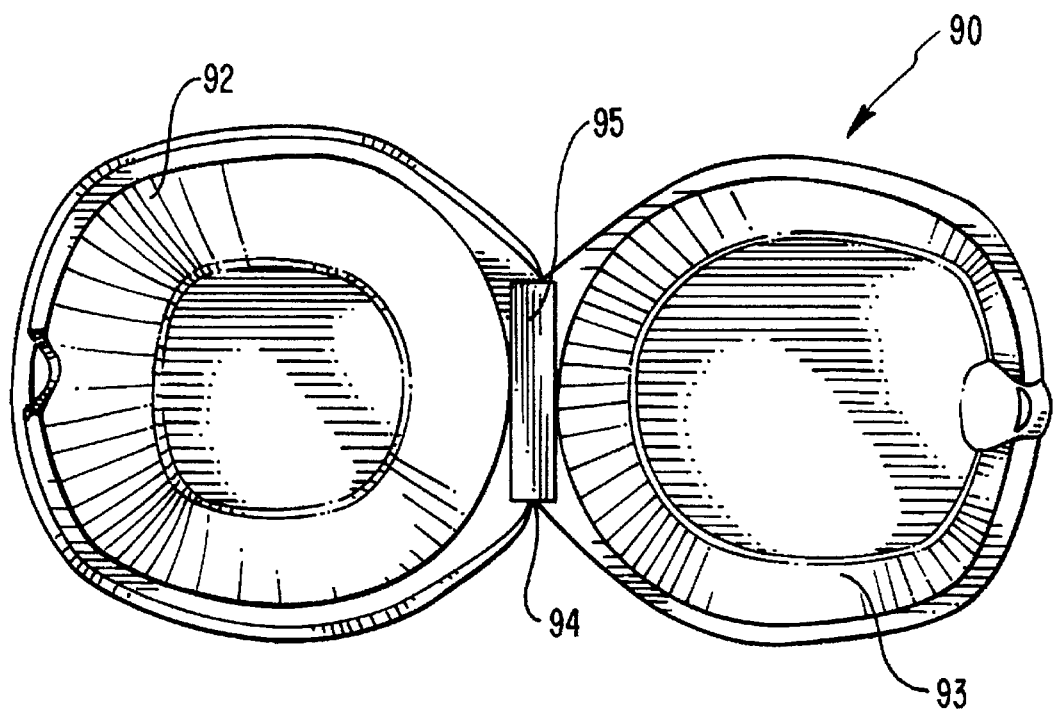
FIG. 12 is a top plan view of the container shown in FIG. 10 in an open position.

Preferably, a paper strip is applied to the material forming the hinge area during the molding operation that forms the container. The paper strip can have a thickness as low as 0.01 mm. The paper strip is preferably fed into the molding machine perpendicular to the flow of inorganically filled material. The molding force adheres the paper strip to the matrix of the hinge area. In a preferred embodiment, the paper is applied to the inner side of the hinge area and a score is made on the outer side of the hinge area. This is shown in FIG. 12, which depicts clamshell container 90 in an open position, with paper strip 95 disposed on the inner side of hinge 94, which pivotally connects shell members 92 and 93.

In an alternate embodiment, a paper laminate may be applied to the entire inner surface of the container, providing fiber reinforcement to the inside of the container. This provides flexibility and toughness to the container, as well as reinforcing the hinge area. The paper laminate itself can serve as the hinge, providing flexibility and a very high fiber content in the hinge area, and reinforcement of the remaining part of the container. This allows less fiber to be used in the inorganically filled material used to form the container.

It is also possible to make the hinge of the invention by prebending or flexing an inorganically filled matrix in a semi-dry condition where the hinge is to be formed. In this way, memory is being introduced into the material and a living hinge is formed. When the material is bent in a semi-dry condition, there is not total adhesion of the binder onto the fibers, so that by bending it in the predried condition the actual hinge mechanism is being shaped into the material. Fibers in the material are pulled out of the matrix slightly to weaken the bond which gives better toughness and flexibility so as to allow pivotal movement at the bend point of the material. When the material hardens, the bend point or hinge is remembered by the material so that it bends in the same place every time.

The hinge of the present invention can also be made by localized "creping" of the inorganically filled sheet material, which provides for improved bending or folding of the material. The sheets are creped much like ordinary tree paper in order to provide a highly extensible sheet that is capable of absorbing energy at sudden rates of strain, and to provide improved bending of the sheet. Conventional creping can be performed either at the wet press section of a paper machine (wet crepe) or on a Yankee dryer (dry crepe). Although the exact parameters of either a wet or dry creping process will differ between the inorganically filled sheets and tree paper, one of ordinary skill in the art will recognize how to adjust the creping process in order to obtain creped inorganically filled sheets. The creping process would be expected to work better as the fiber content of the sheets is increased, since increased fiber content facilitates the sealing of the pores in the material and increased hydrogen bonding of the fibers.

A preferred hinge of the invention has an inorganically filled structural matrix comprising an organic polymer binder having a concentration in the range from about 1% to 50% by volume of the total solids in the inorganically filled structural matrix; an inorganic aggregate material having a concentration in the range from about 40% to 98% by volume of the total solids in the inorganically filled structural matrix; and a fibrous material having a concentration in the range from about 0.5% to about 50% by volume of the total solids in the inorganically filled structural matrix. The inorganically filled structural matrix of the hinge has a thickness of about 0.01 to 1 millimeter, preferably about 0.05 to 0.5 millimeter.

III. SHEETS, CONTAINERS, AND OTHER PRODUCTS

The term "sheet" as used in this specification and the appended claims is intended to include any substantially flat, corrugated, curved, bent, or textured sheet made using the methods described herein. The only essential compositional limitation is that the structural matrix of at least part of the sheet comprises a highly inorganically filled composite having a water-dispersable organic binder. The sheet may include other materials such as paper, organic coatings, ink, or other organic materials in addition to the highly inorganically filled/organic binder matrix portion.

The sheets used in the present invention can have greatly varying thicknesses depending on the particular application for which the sheet is intended. The sheets can be as thin as about 0.01 mm and as thick as 1 cm or greater where strength, durability, and or bulk are important considerations. In addition, the sheets may range in density from as low as about 0.6 g/cm$^3$ to as high as about 2 g/cm$^3$. Generally, higher density sheets are stronger while lower density sheets are more insulative. The exact thickness or density of a particular sheet can be designed beforehand in order to yield a sheet having the desired properties at a cost which allows the sheets to be produced in an economically feasible manner.

The term "container" as used in this specification and the appended claims is intended to include any article, receptacle, or vessel utilized for storing, dispensing, packaging, portioning, or shipping various types of products or objects (including, but not limited to, food and beverage products). Examples of such containers include disposable and nondisposable food or beverage containers, boxes, jars, bottles, plates, trays, cartons, cases, crates, dishes, egg cartons, straws, envelopes, "clamshell" containers (including but not limited to hinged containers used with fast-food sandwiches such as hamburgers), cracker boxes, rice boxes, cereal boxes, corrugated boxes, sandwich containers, frozen food boxes, milk cartons, fruit juice containers, beverage carriers (including but not limited to wraparound basket-style carriers, and "six pack" ring-style carriers), ice cream cartons, cups (including but not limited to disposable drinking cups, two piece cups, one piece pleated cups, and cone cups), french fry containers used by fast-food outlets, fast food carryout boxes, bags (including but not limited to bags with an open end such as grocery bags, bags within cartons such as a dry cereal box, and multiwall bags) sacks, wraparound casing, cigar boxes, confectionery boxes, boxes for cosmetics, or other types of holders.

The hinge of the invention may also be utilized in making storage boxes with interlocking flaps. Single sheets can be scored to form the hinge as well as multiple sheets used for liners in a box.

In addition to integrally formed containers, containment products used in conjunction with containers are also intended to be included within the term "container". Such products include, for example, lids, liners, partitions, wrappers, cushioning materials, utensils, and any other product used in packaging, storing, shipping, portioning, serving, or dispensing an object within a container, or wrapping an object held within a container.

In addition to sheets and containers, any object that can be formed using the highly inorganically filled sheets and hinges described herein are also within the scope of the present invention. These include such disparate objects as, for example, model airplanes, toys, venetian blinds, rain gutters, shirt packaging forms, temporary car window shades, gameboards, book covers, folders, and an endless variety of other objects.

An inorganically filled material apparatus of the invention comprises a first member, a second member adjacent to the first member, and means for flexibly joining the first and second members so that the first and second members can be pivotally moved about the joining means relative to one another. The joining means such as a hinge allows the first and second members to be pivotally moved between a first position wherein the first and second members are in straight alignment with one another and a plurality of other positions wherein the first and second members form an angle in relation to one another. The first and second members preferably have a mechanical resistance to bending and elongation within a first range, and the joining means has an area of reduced mechanical resistance to bending and elongation within a second range that is less than the first range. The first and second members also have a thickness within a first range and the joining means has an area of reduced thickness within a second range that is less than the first range of thickness.

The containers that use the hinge of the present invention may or may not be classified as being disposable. In some cases, where a stronger, more durable construction is required, the container might be capable of repeated use. On the other hand, the container might be manufactured in such a way that it is economical to use once and then be discarded. Such disposable containers can be readily discarded or thrown away in conventional waste landfill areas as an environmentally neutral material.

The structural matrix within the molded containers will preferably have a thickness less than about 20 mm, more preferably less than about 5 mm, and most preferably less than about 1 mm. In certain embodiments the thickness could even be less than 0.1 mm, especially where a more paper-like material is preferred.

Products that utilize an accordion type hinge can be made with the hinge of the invention. This falls within the definition of a hinge as used herein since an accordion hinge can be bent. An accordion hinge goes up and down in a wave-type motion. In making an accordion hinge, an inorganically filled material is embossed so that corrugations or waves are put into the material where desired. An accordion hinge may also be made by scoring the material so that waves are thin and thick in an alternating fashion. Preferably, there are 1 to 6 waves in the accordion hinge. One product using an accordion hinge is an accordion file, which can be made using the hinge of the invention. An accordion file uses a type of hinge that can be expanded or contracted depending on how many papers are filed inside. Flexible straws can also be made with the present hinge in an accordion shape, and flexible ducts can be made using the hinge of the invention.

The phrases "mass producible" or manufactured in a "commercial" or "economic" manner are intended to refer to a capability of the sheets and containers described herein to be rapidly produced at a rate that make their manufacture economically comparable to sheets and containers made from other materials, such as paper, cardboard, polystyrene, or metal. The sheets and containers used in the invention are formed from innovative compositions that solve the prior art problems of incorporating a high percentage of inorganic aggregates into the matrices of products which can be rapidly manufactured by machine, rather than individual hand manufacture of one product at a time (such as "throwing pots").

The sheets, containers, and other objects made therefrom are intended to be competitive in the marketplace with such articles currently made of various materials such as paper, plastic, polystyrene, or metals. Hence, the sheets (and objects made therefrom) used in the present invention must be economical to manufacture (i.e., the cost will usually not exceed a few cents per item). Such cost restraints thus require automated production of thousands of the articles in a very short period of time. Hence, requiring the products of the present invention to be economically mass produced is a significant limitation on the qualities of the materials and products.

A significant advantage of the containers and hinges of the present invention is that they do not require or result in the emission of environmentally harmful or ozone depleting chemicals. In addition, when disposed of into the earth, such containers do not persist in the environment as do foreign materials which must biodegrade (often over a number of years) before they become environmentally innocuous. Instead, the waste containers are essentially composed of the same materials already found in the earth. Under the weight and pressure of typical landfills, such containers will crumble and break down into an environmentally neutral powder that is the same as, or at least compatible with, the dirt and rock already found within the landfill.

Thus, if highly inorganically filled sheets (or products made therefrom) are discarded into a landfill, they will break down into a fine, mainly inorganic, powder under the weight of the other garbage present. If discarded onto the ground, the forces of water and wind, and even fortuitous compressive forces such as from cars running over them or people stepping on them, will cause the inorganically filled waste materials to degrade and be reduced to a largely inorganic, harmless granular powder in a short period of time relative to the time it usually takes for the typical disposable paper or polystyrene sheet or container to decompose under the same circumstances. Whatever organic substances remain after the degradation of the sheet are minimal and will preferably be biodegradable.

Furthermore, the containers are fully recyclable with a minimum amount of energy and effort. Unlike paper and plastic products, which require a substantial amount of processing in order to restore them to a suitable state as raw starting materials, inorganically filled material products can be ground up and recycled by merely reincorporating the grindings into new containers as an aggregate component.

IV. PROCESSING METHODS AND TECHNIQUES

The process for forming the containers and hinges of the invention with inorganically filled materials can use a variety of methods which have been applied to plastic materials. The term "molding" as used herein includes the variety of molding, casting, and extrusion processes discussed herein or that are known in the art. These methods include roller casting, high pressure extrusion, ram pressing, hot isostatic pressing, injection molding, thermoforming, and other casting and forming methods.

The hinge of the present invention can be made in inorganically filled sheets or containers having properties similar to those of paper, plastic, or thin-walled metals. The sheets can be immediately used to form a variety of objects such as food or beverage containers, or can be stacked or rolled and stored for future use. During the subsequent process of forming the sheet into the shape of the desired object, it will usually be advantageous to remoisten the hardened sheet in order to temporarily increase the flexibility and workability of the sheet to avoid splitting or cracking when the object is formed. This is particularly true in the case where the sheet will be rolled or has been scored and is expected to make a particularly sharp bend during the container forming stage.

The underlying theory behind the present invention is the rapid, continuous, and economical formation of lightweight, inexpensive sheets and hinges from a moldable inorganically filled mixture, which can be easily handled and rapidly manipulated in a commercial manufacturing setting. The result is the ability to mass-produce in a very cost competitive manner lightweight, thin-walled, form stable sheets, as well as containers or other objects made therefrom, having a structural matrix that includes an inorganically filled material, rather than a paper, plastic, or polystyrene structural matrix. The inorganically filled material can be formed into relatively thin sheets or walls having roughly the same thickness as conventional containers made from paper or styrofoam.

A method of making a hinge having an inorganically filled structural matrix comprises the steps of mixing a water-dispersable organic polymer binder, fibers, aggregate, and water in order to form a moldable mixture; forming the mixture into a form stable sheet of a predetermined thickness; and scoring the sheet to form a hinge in the inorganically filled matrix.

Figure 13:
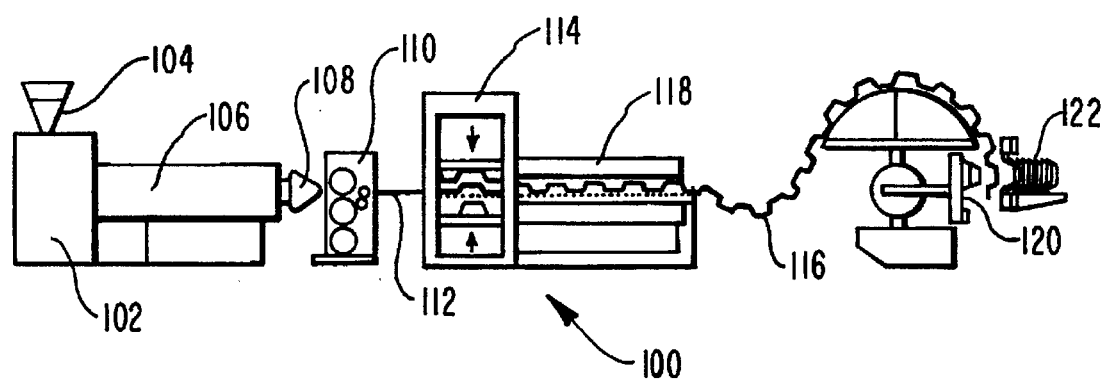
FIG. 13 is a schematic diagram of a method of making inorganically filled products that can use the hinge of the invention.

FIG. 13 shows a schematic diagram of a process for molding containers made of inorganically filled materials that can utilize the hinge of the invention. The desired components such as organic binder, water, fiber, aggregate, etc. are placed in a mixer 102 through an inlet 104 and are blended to form a moldable mixture. This mixture is then directed to an extruder 106 and pumped through a die 108 into a roll-stack 110 that flattens the material into a sheet 112. The sheet 112 is then fed into a molding apparatus 114 to form the desired product such as a clamshell container. The formed sheet 116 is then directed through an oven 118 to dry the material. The formed sheet 116 is then sent to a cutter machine 120 where the formed containers 122 are trimmed from formed sheet 116 and unloaded. The formed sheet 116 can be scored to form the hinge of the invention at anytime during the process of making the containers. For example, the hinge can be molded into the sheet between the parts of the molding apparatus when the container is formed therein.

In a preferred method of the above manufacturing process, the raw materials for making the moldable mixture can be combined in a sigma-blade, kneading mixer system that will blend batches of material that are then deposited into the extrusion and calender system. Once the premixed material is deposited into the extruder, the material is auger fed into a chamber and extruded out through a rectangular slit about 42 inches wide and about ½ inch in height. The extruded material then passes through a series of heated rollers to produce a calendered sheet material, which reduces the web thickness to a height of about 2 mm. The rollers are heated to provide a mold release and will also partially dry the sheet material as water vapor is driven off. The sheet is preferably formed by pressing it between male and female molds using a vacuum forming apparatus. A 64-cavity press can be used which operates at about 25 cycles/minute. Once the formed sheet is dried, it can be die cut in a punch press.

In order for the inorganically filled material to exhibit higher flexural strength and/or cushioning, the fibers can be aligned or stacked instead of being randomly dispersed. It is preferable for the fibers to be laid out in a plane that is parallel to either of the two surfaces of the sheet or container wall. In some containers, it is preferable for the fibers within the container body to be circumferentially or unidirectionally aligned. Similarly, the fibers within the bottom wall of the container can be horizontally aligned. Such alignment of fibers is achieved either by roller casting, ram-pressing, extrusion, or differential pressure roller extrusion.

In order for the inorganically filled material to be effectively molded, it is important that the material be form stable in the green state. The molded product should rapidly (preferably in three seconds or less) be able to support its own weight. Further, the material must harden sufficiently so that it can be quickly ejected from the mold. Otherwise, the cost of molding may make the process uneconomical. In addition, the surface of the molded article should not be too sticky, as that would make the demolding process difficult and cause problems in handling and stacking of the molded articles.

There are several modifications to conventional molding processes that can be employed in order to ease the manufacturing process of molding inorganically filled materials. For example, it is frequently desirable to treat the mold with a releasing agent in order to prevent sticking. Suitable releasing agents include silicon oil, Teflon®, Deleron®, and UHW®. Preferably, the mold itself will be made of steel or of a material with a very "slick" finish, such as Teflon® or Deleron®. If the mold is made from steel, it will preferably be plated with either polished nickel or chromium. Regardless, it is important that the mold be kept hot (>50° C.) to create a thin layer of steam between the mixture and the mold to aid in demolding the product. The same effect can be achieved from the use of frictional forces. By spinning the head of the molding apparatus against the interior and/or exterior surfaces of the inorganically filled material, any chemical and mechanical adherence (i.e., stickiness) to the mold can be overcome.

During the process of molding the inorganically filled mixture, it is often desirable to heat up the mixture in order to control the air void system and the porosity of the molded container. This heating process also aids in making the mixture form stable in the green state immediately after molding) by allowing the surface to gain strength quickly. Heating also aids in rapidly removing significant amounts of water from the mixture. The mixture can be heated to a temperature from about 50° C. to 250° C. during molding.

Although it is often preferable to coat rollers with any of the nonstick materials discussed above, it is more important to heat the rollers to prevent sticking of the material to the rollers. Typically the roller temperatures will be within the range from about 50° C. to about 150° C. Not only do the heated rollers prevent the inorganically filled material passed therethrough from sticking, but they also help the material to more quickly reach form stability.

The mixture that is molded to form the containers and hinges of the invention is self-supporting during the green state and will maintain its formed state throughout the curing process. In addition, the mixture rapidly reaches a sufficiently high strength so that the molded containers can be handled and manipulated using conventional means.

After the inorganically filled mixture has been molded, it may be necessary to bend, fold, or otherwise shape the cured or uncured material into the desired shape of a container. For example, a flat sheet may be folded into the shape of a box. For some embodiments, a box is most easily formed from a flat sheet that is scored and folded after the sheet has been cured.

A method of manufacturing a bendable sheet having an inorganically filled structural matrix comprises the steps of mixing a water-dispersable organic polymer binder, fibers, aggregate, and water in order to form an inorganically filled moldable mixture; extruding the mixture through a die; forming the extruded mixture into a form stable sheet of a predetermined thickness; and hardening the sheet to a significant degree in an accelerated manner in order to quickly increase the yield stress of the inorganically filled matrix. The sheet can be made bendable by cutting a score or perforation into a surface of the sheet that is substantially hardened, or by pressing a score into a surface of the sheet prior to drying and hardening while the sheet is wet.

V. MANUFACTURING SHEETS FROM MOLDABLE MIXTURES

Figure 14:
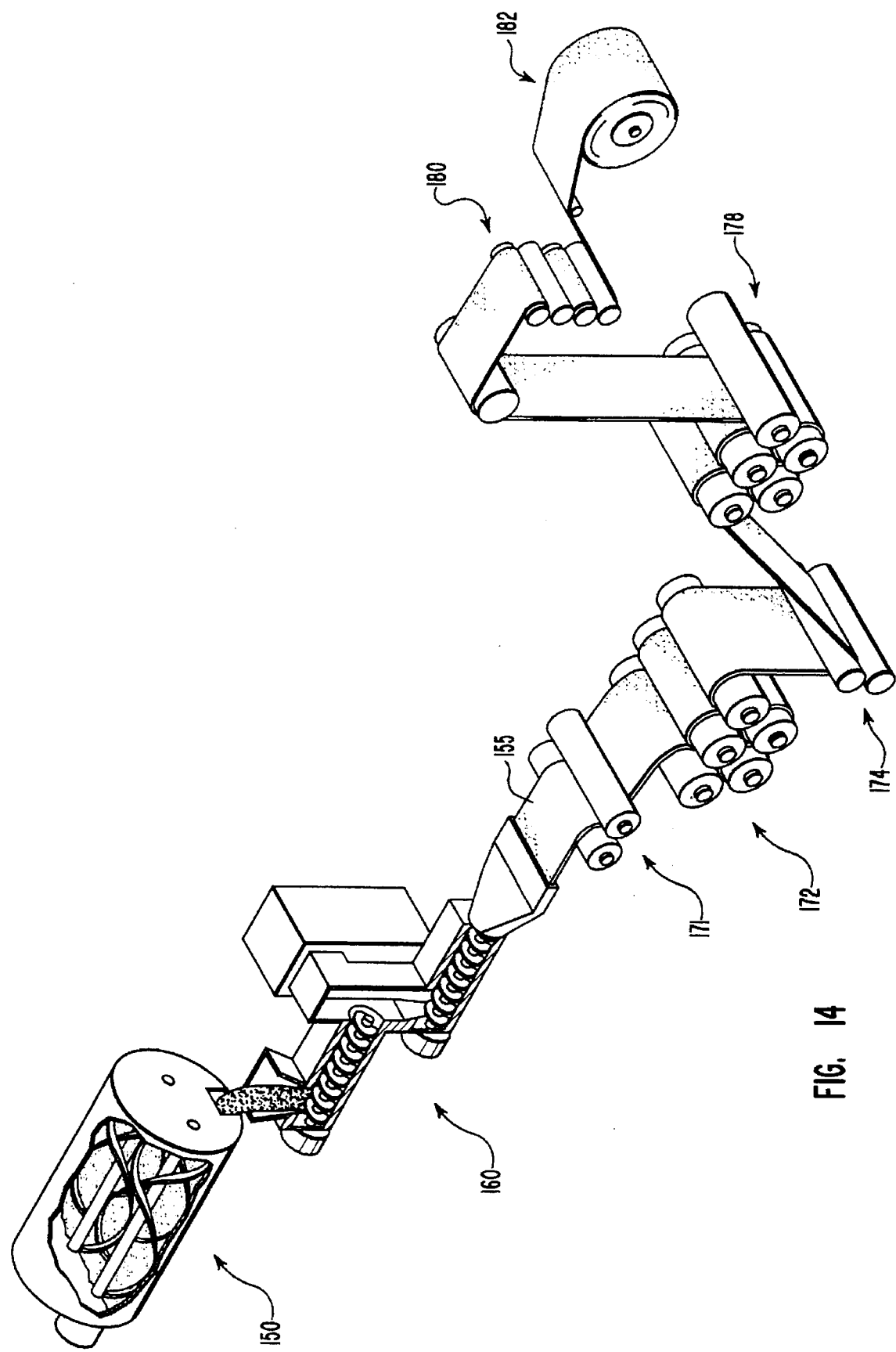
FIG. 14 is a comprehensive perspective view of a system used to manufacture an inorganically filled sheet.

A comprehensive production sequence for manufacturing sheets that can use the hinge of the present invention is set forth in FIG. 14, including the apparatus for carrying out the following manufacturing steps: (1) mixing the moldable mixture; (2) extruding the mixture into a sheet, pipe, or other object through an appropriate extruder die; (3) passing the extruded sheet through a series of paired rollers in order to reduce the thickness and/or improve the surface qualities of the sheet; (4) at least partially drying the sheet by rolling it onto one or more drying rollers; (5) optionally compacting the sheet while in a slightly moist condition in order to eliminate unwanted spaces within the inorganically filled matrix of the sheet and to increase the density and resulting strength of the sheet; (6) optionally drying the sheet after it has been compacted; (7) optionally finishing the sheet by passing it between one or more pairs of rollers, including one hard and one soft roller; and (8) optionally rolling the substantially hardened and dried sheet onto a spool to form a roll which can be stored and used when needed. The above manufacturing steps are discussed more fully below.

A more detailed discussion of similar processes used to manufacture sheets having a hydraulically settable structural matrix is set forth in the Andersen-Hodson Technology. For purposes of disclosure, this reference is incorporated herein by specific reference.

In the case where the moldable mixture is extruded into any object other than a sheet, it may be necessary to "open up" the object into a sheet, such as continuously cutting a pipe to form a sheet. If another shape is extruded, other procedures (such as the use of additional rolling processes) may need to be employed. However, the same principles described herein would apply to other extruded shapes.

The semi-hardened or hardened sheets can be used much like paper or cardboard to manufacture a variety of containers, printed materials, or other objects, or they can be rolled onto a spool or cut and stacked onto a pallet and stored until needed. The sheets can be scored or perforated in order to create a fold line, then folded and/or rolled into the desired shape of the container or other object. When folding or rolling the sheet, it will often be advantageous to remoisten the sheet in order to introduce temporary increased flexibility.

The rolled and/or folded sheet in the shape of a container or other object can be held together using any connection means known in the art. In some cases, the ends can be folded together or inserted into specially designed slots. In other cases, it may be necessary to glue the corresponding ends together using adhesion means known in the art. These include glue, adhesive strips, thermoplastic materials, or a combination thereof. The inorganically filled material sheets, containers, or other objects can be coated with a desired coating or printed on using means known in the art of paper, plastic, or polystyrene use. This can be done at any appropriate stage of the manufacturing process.

A. Preparing The Moldable Mixture

The first step in the manufacture of sheets involves the formation of a suitable moldable inorganically filled mixture having the desired properties of workability and green strength, as well as strength, flexibility, toughness, and degradability of the final hardened product. Using a microstructural engineering approach, one skilled in the art can select the components, as well as their relative concentrations, in order to obtain a moldable mixture having the desired properties.

Some of the properties considered to be generally desirable with regard to the moldable mixture are adequate workability, plastic-like qualities, and green strength for a given extrusion, rolling, and/or molding process. As set forth above, the level of water, water-dispersable organic polymer binder, and (optionally) dispersant will determine the level of workability and extrudability of the mixture, as will the other components within the mixture, such as aggregates, fibers, air entraining agents, etc. However, no one component will completely determine the rheology and other properties of the moldable mixture. Rather, each of the components work together in an interrelated fashion.

1. Effect of Components on Mixture Rheology

The amount of water that should be added to obtain a mixture having adequate workability and flowability will depend on the concentration and particle packing density of the inorganic filler, the amount of fibers, the identity and quantity of the organic binder, and the identity and quantity of other admixtures (such as dispersants, plasticizers, or lubricants). In general, however, the addition of more water will decrease the viscosity and yield stress of the mixture, thereby increasing the flowability of the mixture and decreasing the form stability of an object molded therefrom.

The water-dispersable organic polymer binder can greatly affect the rheology of the mixture depending on the identity, concentration, and extent of gelation of the organic binder. As set forth above, preferred organic polymer binders can roughly be divided into the following categories: polysaccharide-based, protein-based and synthetic organic. Within each of these broader categories are numerous subcategories and divisions. A unifying feature of each of these materials is that they will generally dissolve in or at least be fairly thoroughly dispersed by water. Hence, they require adequate levels of water for their dispersion and activation (including gelation) within the moldable mixture.

Nevertheless, the organic polymer binders have greatly varying levels of water solubility or dispersability, as well as varying levels of viscosity and yield stress. Organic polymers within the same class may have greatly varying viscosities depending on the molecular weight. For example, a 2% solution of Tylose® FL 15002 at 20° C. has a viscosity of about 15000 cps, while a similar solution of Tylose® 4000 has a viscosity of about 4000 cps. The former greatly increases the yield stress and plastic-like properties of a moldable mixture, while the latter may act more as a lubricant or plasticizer.

Other organic polymers react at different rates and different temperatures within the water. Although many organic polymer binders such as Tylose® neither polymerize or depolymerize when added to the moldable mixture, but rather gelate and then dry out to form a bonding matrix, it is within the scope of the present invention to add water soluble or water-dispersable polymerizable units to the moldable mixture which will thereafter polymerize in situ over time. The rate of the polymerization reaction can be regulated by adjusting the temperature of the mixture and/or adding a catalyst or inhibitor. Examples of polymerizable units which may be added to a moldable mixture include Cellosize and latex forming monomers.

With regard to gelation, most cellulose-based polymers (such as Tylose®) will readily gelate in water at room temperature. Others such as many starches will only gelate in water at higher temperatures. Certain modified starches can, however, gelate at room temperature. Hence, cellulose-based and modified starch-based polymer binders are advantageous in that a moldable mixture can be formed therefrom at room temperature. Nevertheless, they are generally significantly more expensive than typical starch-based polymers which must be heated to gelate. A preferred starch-based polymer is National 51-6912, which may be purchased from National Starch.

Depending on the desired rheology of the moldable mixture, including where it is desired to affect the viscosity or yield stress as a function of time or temperature, it may be preferable to add a number of different organic polymer binders to the moldable mixture. Cellulose-based organic polymer binders will generally impart their maximum rheological affect almost immediately, while polymerizable binders will stiffen over time and starch-based binders will stiffen as the temperature of the mixture is increased.

Other admixtures that may be added to directly influence the rheology of the moldable mixture include dispersants, plasticizers, and lubricants. Dispersants such as sulfonyl-based materials greatly decrease the viscosity and increase the workability of the moldable mixture while keeping the amount of water constant. A corollary is that using a dispersant allows for the inclusion of less water while maintaining the same level of workability. A preferred plasticizer and lubricant is polyethylene glycol.

The amount, identity, and particle packing density of the inorganic aggregate filler can greatly affect the rheology and workability of the moldable mixture. Inorganic aggregates that are porous or have a high specific surface area will tend to absorb more water than nonporous aggregates, thereby reducing the amount of water available to lubricate the particles. This results in a stiffer, more viscous mixture. Particle packing density can also have a tremendous impact on the rheology of the mixture by determining the amount of interstitial space which generally must be filled by water, lubricants, organic polymers, or other liquids in order for the mixture to flow.

The actual particle packing density should be calculated when determining how much water to add to the moldable mixture. The size and morphology of the aggregate particles can also affect the rheology and flow properties of the moldable mixture to some degree.

In situations where the moldable mixture will be subjected to high pressures, such as extrusion or other high pressure molding processes, it may be possible to take advantage of the interplay between the principles of particle packing and water deficiency in order to temporarily increase the workability and flowability while compressing the mixture. For purposes of this specification and the appended claims, the terms "water deficiency" or "deficiency of water" shall refer to a moldable mixture in which there is insufficient water (and other liquids) to fully occupy the interstitial space between the particles. Because of this, there is insufficient water to adequately lubricate the particles.

Nevertheless, upon applying a pressure that is great enough to temporarily increase the particle packing density, the amount of interstitial space between the particles will decrease. Because water is incompressible and maintains the same volume under pressure, the increased pressure increases the apparent amount of water that is available to lubricate the particles, thereby increasing the workability and flowability of the mixture. After the pressure is removed, usually after the molding process had ended, the aggregate particles will tend to return to their pre-compression density, thereby increasing the amount of interstitial space and creating an internal pressure. This results in an almost immediate increase in form stability and green strength.

Hydraulically settable inorganic aggregates such as hydraulic cement, gypsum hemihydrate, and calcium oxide can be utilized as a water absorption mechanism. These chemically react with the water, thereby reducing the effective level of water within the moldable mixture without resorting to heating or drying techniques. Such materials can greatly affect the rheology of the moldable mixtures as a function of the extent of hydration, which is a function of time. In addition, it has been found that hydraulic cement increases the cohesive strength of the green moldable mixture and a fresh sheet made therefrom. It is the cohesion that holds the inorganically filled material together so that the sheet can be pulled through the rollers and yet maintain its form until dried sufficiently to obtain sufficient strength.

Finally, other solid components within the mixture such as fibers will affect the rheology of the mixture in similar fashion to the inorganic aggregates. Certain fibers may absorb water depending on their porosity and swelling capability. In addition, certain fibers can be treated to become ionically charged, which will allow them to chemically interact with ionically charged organic plasticizers, such as ionic starches. In this way the fibers may affect the rheology of the mixture to some degree.

2. Effect of Components on Final Properties

With regard to the final dried or hardened product, some of the properties considered generally desirable to design into the structural matrix of the sheet include high tensile strength (in general or along particular vectors), flexural strength, flexibility, and ability to elongate, deflect or bend. In some cases, it may be desirable to obtain sheets which substantially incorporate the properties of conventional paper or paperboard products. However, in other cases it may be desirable to obtain a structural matrix having properties not obtainable using ordinary wood pulp or other conventional paper-making starting materials. These may include increased toughness, higher modulus, water resistance, or lower bulk density.

In contrast to conventional paper or paperboard, in which the properties of the sheets are extremely dependent on the properties of the pulps used, the properties of the inorganically filled sheets used in the present invention are substantially independent of the properties of the fibers used in making the sheets. To be sure, using longer, more flexible fibers will impart more flexibility to the sheet than shorter, stiffer fibers.

However, properties that are largely pulp-dependent in conventional papers can be designed into the inorganically filled sheet by adjusting the concentrations of the nonfibrous components of the moldable mixture as well as the processing technique used. Such properties as stiffness, rigidity, surface finish, porosity, and the like are generally not dependent on the type of fibers used in the inorganically filled sheets.

The flexibility, tensile strength, flexural strength, or modulus can be tailored to the particular performance criteria of the sheet, container, or other object made therefrom by altering the components and relative concentrations of the components within the moldable mixture. In some cases, higher tensile strength may be an important feature. In others, it may be less significant. Some sheets should preferably be more flexible, while others will be stiff. Some will be relatively dense, others will be thicker, lighter, and more insulative. The important thing is to achieve a material that has properties appropriate for a particular use, while remaining cognizant of cost and other practical production line parameters. While having "too much" or "too little" of a particular property may be inconsequential from the standpoint of performance, from a cost standpoint it may be wasteful or inefficient to provide for the particular property.

In general, increasing the amount of organic polymer binder will increase the tensile and flexural strength of the final hardened sheet, while also greatly increasing the flexibility and resilience of the sheet. Adding more organic polymer also decreases the stiffness of the sheet. Similarly, increasing the concentration of fibers within the mixture also increases the tensile strength of the final sheet, particularly higher tensile strength fibers, such as ceramic fibers, although such fibers are stiff and will yield a relatively stiff hardened sheet. Conversely, adding flexible fibers, such as natural cellulosic fibers, will greatly increase the flexibility, as well as the tensile, tear, and burst strengths of the sheet.

Different fibers have greatly varying degrees of tear and burst strength, flexibility, tensile strength, ability to elongate without breaking, and stiffness. In order to obtain the advantageous properties of different types of fibers it may be preferable in some cases to combine two or more different kinds of fibers within the moldable mixture.

It should also be understood that certain sheet forming processes, such as extrusion and rolling will tend to orient the fibers in the direction of elongation of the mixture or sheet. This may be advantageous in order to maximize the tensile strength of the sheet in a certain direction. For example, where the sheet will be required to bend along a hinge, it is preferable for the fibers to be oriented in a way so as to more effectively bridge the two sides of the hinge or bend by being oriented perpendicular to the fold line. It may be desirable to concentrate more of the fibers in the area of a hinge or where the sheet requires increased toughness and strength.

The type of aggregate can also affect the properties of the final hardened sheet. Aggregates comprising generally hard, inflexible, small particles such as clay, kaolin, or chalk, will generally result in a smoother sheet having an increased brittleness. Lightweight aggregates such as perlite or hollow glass spheres result in a sheet having lower density, lower brittleness, and greater insulating ability. Aggregates such as crushed sand, silica, gypsum, or clay are extremely inexpensive and can greatly reduce the cost of manufacturing a sheet therefrom. Any material with a high specific surface area gives increased drying shrinkage and shrinkage defects. Materials with lower specific surface areas are advantageous because they are less sticky, which allows the sheet to be processed by lower temperature rollers without sticking.

Hydraulically settable aggregates such as hydraulic cement, gypsum hemihydrate, and calcium oxide may provide small to significant degrees of binding within the hardened sheet depending on the amount in which such hydraulically settable aggregates are added. These may increase the stiffness and compressive strength of the final sheet and, to some degree, the tensile strength. Hydraulic cement can also decrease the solubility of the sheet in water, thereby increasing the resistance of the sheet to water degradation.

Finally, other admixtures within the moldable mixtures can add a waterproofing property to the final product, such as by adding rosin and alum to the mixture. These interact to form a very water resistant component within the inorganically filled matrix. In the absence of significant quantities of such waterproofing agents, water can be used to remoisten the sheet and temporarily increase the flexibility, bendability, and elongation before rupture of the sheet, particularly where the sheet will be formed into another article of manufacture, such as a container. Of course, water can also facilitate the degradation of the sheet after it has been discarded. Water resistance can be introduced by treating the sheet surface with a 5–10% w/w starch solution in order to seal the surface porosity.

As a general rule, inorganically filled sheets that have lower concentrations of organic polymer binder and fiber will be more rigid, have a higher insulation ability, have lower cohesiveness, resist heat damage, have lower tensile strength, and resist water degradation (particularly as they contain more hydraulic cement, the inclusion of which can also increase the compressive strength of the final product).

Sheets that have lower concentrations of organic binder but higher fiber content will have higher tensile strength, have higher toughness, have lower compressive and flexural strengths, have lower stiffness and higher flexibility, and be fairly resistant to water degradation (particularly as the amount of hydraulic cement is increased).

Inorganically filled sheets that have higher concentrations of organic polymer binder and lower concentrations of fiber will be more water soluble and degradable, easier to mold (allowing for the manufacture of thinner sheets), have moderately high compressive and tensile strengths, higher toughness, moderate flexibility, and lower stiffness.

Finally, inorganically filled sheets that have higher concentrations of organic polymer binder and fiber will have properties that are most similar to conventional paper, will have higher tensile strength, toughness, and folding endurance, have moderately high compressive strength, have very low resistance to water degradation, will have lower resistance to heat (particularly when approaching the ignition point of fibers or decomposition temperature of the binder), and have higher flexibility and lower stiffness.

The highly inorganically filled sheets formed using the compositions described herein will preferably have a tensile strength in the range from about 0.05 MPa to about 70 MPa, and more preferably in the range from about 5 MPa to about 40 MPa. In addition, the sheets will preferably have a bulk density in the range from about 0.4 g/cm$^3$ and more to about 2 g/cm$^3$, preferably about 0.4 g/cm$^3$ to about 1.5 g/cm$^3$. Whether a sheet will have a density at the lower, intermediate, or higher end of this range will generally depend on the desired performance criteria for a given usage. In light of the foregoing, the highly inorganically filled sheets of the present invention will preferably have a tensile strength to bulk density ratio in the range from about 2 MPa-cm$^3$/g to about 200 MPa-cm$^3$/g, and more preferably in the range from about 3 MPa-cm$^3$/g to about 50 MPa-cm$^3$/g.

The direction-specific strength properties of the highly inorganically filled sheets used in the present invention should be contrasted with those of paper, which is known to have a strong and weak direction with regard to tensile and tearing strength. The strong direction in conventional paper is the machine direction, while the weak direction is the cross-machine direction. While the ratio of the strengths in the strong and weak direction is about 3:1 in conventional paper, in the present invention it is about 2:1, and can approach about 1:1 depending on the particular forming process used. In general, decreasing the differential forming speed tends to allow the fibers to remain in a more random orientation.

The term "elongate" as used in the specification and appended claims with regard to the highly inorganically filled sheet means that the structural matrix of the sheet is capable of being stretched without rupturing and still have a finished surface. In other words, the inorganically filled structural matrix of the sheet is capable of moving or changing shape without rupture by application of a force such as pulling or stretching. The ability of the structural matrix of the sheet to elongate before rupture is measured by an Instron tensile test and a stress strain test.

By optimizing the mix design, it is possible to manufacture a sheet that has a structural matrix capable of elongating up to about 20% when moist before tearing or fracturing occurs, and from about 0.5% to 8% in the dry sheet. This is usually accomplished by optimizing the amounts of fiber and organic binder within the moldable mixture and resulting matrix. Producing a sheet that has a structural matrix capable of elongating within the specified range can be accomplished by including fibers within the moldable mixture such that the final hardened sheet will contain fibers in an amount of up to about 50% by volume. The greater the amount of fibers or organic binder added, or the better the matrix to fiber interface, the more elongation that can generally be achieved without rupture of the sheet. In addition, the elongation of a dry sheet can be increased by adding steam or moisture to the sheet in the order of up to 10% by weight of the dry weight of the sheet. However, this remoistening temporarily reduces the strength of the sheet until it has been dried out again.

It should be understood that higher tensile strength, as well as greater elongation, will generally be obtained by increasing the amount of fibers within the inorganically filled matrix. This can be accomplished by adding more fibers to the moldable mixture or, alternatively, by attaching a layer of fibers (such as a sheet of paper) on the surface or within the interior of a highly inorganically filled sheet, or by combining fibers having varying properties of strength and flexibility.

The term "deflect" as used in the specification and appended claims with regard to the inorganically filled sheet means that the sheet has a structural matrix capable of bending and rolling without rupture and change in the finished surface. The ability of the sheet to deflect is measured by measuring the elasticity modulus and the fracture energy of the sheet using means known in the art. As with any material, the bending ability of a sheet manufactured according to the present invention is largely dependent upon the thickness of the sheet.

One way to measure deflection without regard to sheet thickness is to define deflection as the relative elongation of one side of the sheet compared to the other side of the sheet. As a sheet is rolled or bent around an axis, the length of the outer side of the sheet will elongate, while the inner side of the sheet generally will not. A thinner sheet can be bent a far greater degree even though the relative elongation of the outer side compared to the elongation of the inner side is about the same as in a thicker sheet which cannot bend nearly as far.

This ability of the sheet to deflect is related to the sheet's ability to be elastic, which is measured by Young's modulus; consequently, the optimal mix designs for achieving the desired deflection range can be optimized independently of elongation. Nevertheless, during the process of forming the sheet into an appropriate container or other object the bendability of the sheet can be temporarily increased by remoistening the sheet. The water is believed to be absorbed by the fibers, water-dispersable organic binder, and the interstices between the aggregate particles. Upon drying the formed sheet, the level of bendability will generally decrease while the toughness and hardness of the sheet will generally increase.

In order to obtain a sheet having the desired properties of strength, bendability, insulation, toughness, weight, or other performance criteria, the thickness of the sheet can be altered by adjusting the space between the rollers, as set forth more fully below. Depending on the thickness and desired performance criteria, the components and their relative concentrations can be adjusted in order to accommodate a particular sheet thickness. The sheets of the present invention may be designed to have greatly varying thicknesses; however, most products requiring a thin-walled material will generally use sheets having a thickness in the range from about 0.01 mm to about 3 mm. Nevertheless, in applications where insulation ability or higher strength or stiffness is more important, the sheet thickness may range up to about 1 cm.

The preferred thickness of the sheets of the present invention will vary depending on the intended use of the inorganically filled sheet, container, or object made therefrom. As a matter of example only, where high deflectability is desired, a thinner sheet will generally be preferred. Conversely, where strength, durability, and/or insulation and not deflectability are the overriding concerns, a thicker sheet will generally be preferred.

Nevertheless, where it is desired to bend the sheets along a score, or at least roll them into containers, the inorganically filled sheets will preferably have a thickness in the range from about 0.05 mm to about 2 mm or more, and more preferably in the range from about 0.15 mm to about 1 mm.

Another aspect of the present invention is the ability of the extruded and rolled material to have high green strength. This is achieved by adjusting the quantity and/or identity of the water-dispersable organic binder that is added to the moldable mixture, as well as the amount of the water. Although adding a relatively low amount of water initially will greatly increase the green strength of the molded material, it is possible and often desirable to include a higher amount of water initially because it will increase the workability and the ability of certain molding processes described herein to quickly remove excess water through the application of heat.

As discussed more fully below, the moldable mixture is usually passed through a series of heated rollers which drive off a significant amount of water and aid in molding a sheet with high green strength. Nevertheless, one skilled in the art may adjust the water content so that the moldable mixture has an appropriate theology so that it will be easily and effectively extruded through a particular die, and yet have sufficient form stability such that the integrity of the sheet is maintained as it is passed through a series of rollers during other processes.

As previously discussed, the moldable mixture is microstructurally engineered to have certain desired properties, both as to the mixture itself, as well as the final hardened product. Consequently, it is important to accurately meter the amount of material that is added during any batch or continuous admixing of the components.

The currently preferred embodiment for preparing an appropriate moldable mixture in an industrial setting is equipment in which the materials incorporated into the moldable mixture are automatically and continuously metered, mixed (or kneaded), de-aired, and extruded by an auger extruder apparatus. It is also possible to premix some of the components in a vessel, as needed, and pump the premixed components into a kneading/mixing apparatus.

A double shaft sigma blade kneading mixer with an auger for extrusion is the preferred type of mixer. The mixer may be adjusted to have different RPMs and, therefore, different shear for different components. Typically, the moldable mixtures will be mixed for a maximum of about 10 minutes, and thereafter emptied from the mixer by extrusion for a maximum of about 3 minutes.

The various component materials that are combined within the moldable mixtures used in the present invention are readily available and may be purchased inexpensively in bulk quantities. They may be shipped and stored in bags, bins, or train cars, and later moved or unloaded using conventional means known in the art. In addition, the materials can be stored in large storage silos and then withdrawn and transported by means of conveyors to the mixing site.

In certain circumstances it may be desirable to mix some of the components together in a high shear mixer in order to form a more well dispersed, homogeneous mixture. For example, certain fibers may require such mixing in order to fully disagglomerate or break apart from each other. High shear mixing results in a more uniformly blended mixture, which improves the consistency of the unhardened moldable mixture as well as increasing the strength of the final hardened sheet. This is because high shear mixing more uniformly disperses the fiber, aggregate particles, and binder throughout the mixture, thereby creating a more homogeneous structural matrix within the hardened sheets.

Different mixers are capable of imparting differing shear to the moldable mixer. For example, a kneader imparts higher shear compared to a normal cement mixer, but is low compared to an Eirich Intensive Mixer or a twin auger food extruder.

It should be understood however, that high shear, high speed mixing should not be used with materials that have a tendency to break down or disintegrate under such conditions. Certain lightweight aggregates, such as perlite or hollow glass spheres, will have a tendency to shatter or crush under high shear conditions. In addition, high shear mixing by propeller is generally efficacious only where the mixture has relatively low viscosity. In those cases where it is desirable to obtain a more cohesive, plastic-like mixture, it may be desirable to blend some of the ingredients, including water, in the high shear mixer and thereafter increase the concentration of solids, such as fibers or aggregates, using a lower shear kneading mixer.

High shear mixing is especially useful where it is desired to incorporate small, nonagglomerated air voids by adding an air entraining agent within the moldable mixture. In those cases where a hydraulically settable material, such as hydraulic cement or calcium oxide has been added to the mixture, it may be advantageous to flood the atmosphere above the high shear mixer with carbon dioxide in order to cause the carbon dioxide to react with the mixture. It has been found that carbon dioxide can increase the foam stability of a cementitious mixture and cause an early false setting of hydraulic cement. Carbon dioxide also reacts with calcium oxide in order to create calcium carbonate as an insoluble binding precipitate.

High shear mixers useful in creating the more homogeneous mixtures as described herein are disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Material"; and U.S. Pat. No. 5,061,319 entitled "Process for Producing Cement Building Material." For purposes of disclosure, the foregoing patents are incorporated herein by specific reference. High shear mixers within the scope of these patents are available from E. Khashoggi Industries of Santa Barbara, Calif., the Assignee of the present invention.

B. Forming Sheets from the Moldable Mixture

Once the moldable mixture has been properly blended, it is then transported to the sheet forming apparatus, which will typically comprise an extruder and/or a set or series of rollers. In some cases an apparatus capable of both mixing and extruding the moldable mixture may be used in order to streamline the operation and minimize the coordination of the various components within the system.

Reference is now made to FIG. 14, which illustrates a currently preferred system for manufacturing sheets from a moldable mixture. The system includes a mixing apparatus 150, an auger extruder 160, reduction rollers 171, drying rollers 172, optional compaction rollers 174, optional second drying rollers 178, optional calender finishing rollers 180, and optional spooler 182.

In the first currently preferred sheet forming step, the moldable mixture can be formed into sheets of precise thickness by first extruding the material through an appropriate extruder die and then passing the extruded material through one or more pairs of reduction rollers as shown in FIG. 14.

Figure 15:
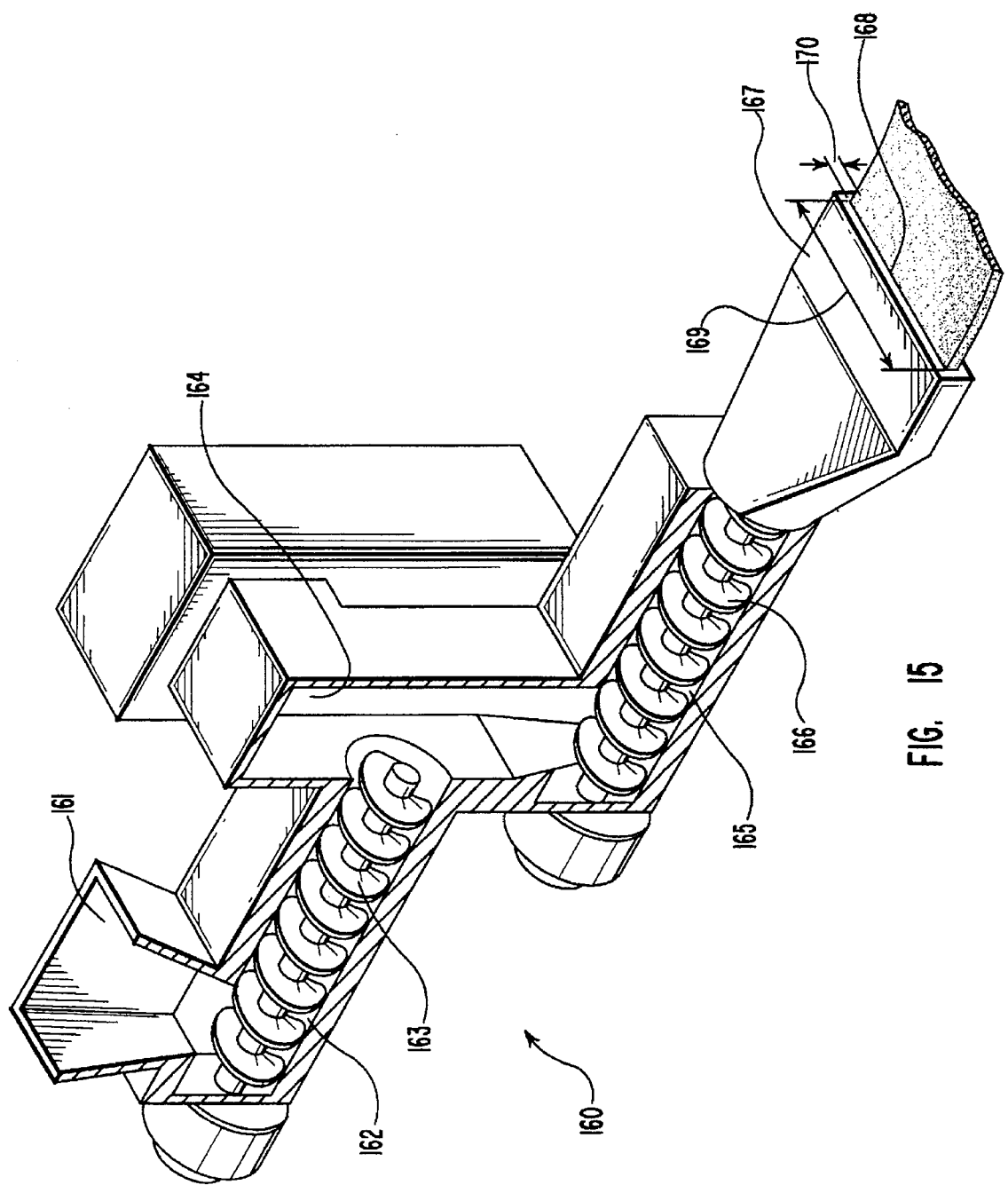
FIG. 15 is an enlarged perspective view with cutaway of an auger extruder used in the system shown in FIG. 14.

FIG. 15 is an enlarged view of auger extruder 160 shown in the system of FIG. 14. Auger extruder 160 includes a feeder 161 that feeds the moldable mixture into a first interior chamber 162 within extruder 160. Within the first interior chamber 162 is a first auger screw 163 that exerts forward pressure on and advances the moldable mixture through the first interior chamber 162 toward an evacuation chamber 164. Typically, a negative pressure or vacuum will be applied to evacuation chamber 164 in order to remove unwanted air voids within the moldable mixture.

Thereafter, the moldable mixture will be fed into a second interior chamber 165. A second auger screw 166 will advance the mixture toward a die head 167 having a transverse slit 168 with a die width 169 and a die thickness 170. The cross-sectional shape of transverse slit 168 is configured to create a sheet of a desired width and thickness that will generally correspond to die width 169 and die thickness 170.

An important advantage of using an auger extruder is that it allows for a continuous extrusion process. In addition, an auger extruder has the ability to remove unwanted macroscopic air voids within the moldable mixture. Failure to remove unwanted air voids can result in the sheet having a defective or nonhomogeneous structural matrix. During subsequent drying steps, particularly where relatively high heat is used, unwanted air pockets can greatly expand and cause air bubble defects. However, such defects will generally not occur in the case where finely divided air voids are incorporated within the hydraulically settable mixture.

Removal of the air voids may be accomplished using conventional venting means known in the extrusion art as shown in FIG. 15, wherein the mixture is first passed into an evacuation chamber 164 by first auger screw 163, and then extruded through the extruder die head 167 by means of second auger screw 166. Alternatively, the unwanted air voids may be removed from the mixture by a process known as "venting" wherein the excess air collects under pressure within the interior chamber and escapes from the extruder by passing through the space defined by the walls of the interior chamber and the outer edges of the auger screw.

Although the preferred width and thickness of the die will depend upon the width and thickness of the particular sheet to be manufactured, the thickness of the extruded sheet will usually be at least twice, and sometime many times, the thickness of the final calendered sheet. The amount of reduction (and, correspondingly, the thickness multiplier) will depend upon the properties of the sheet in question. Because the reduction process helps control fiber orientation, the amount of reduction will often correspond to the degree of desired orientation. In addition, the greater the thickness reduction, the greater the elongation of the sheet. In a typical manufacturing process an extruded sheet with a thickness of about 6 mm may be calendered to a sheet with a thickness between about 0.2 mm and about 0.5 mm. Because this is a 12 to 30 fold decrease in thickness, the sheet should correspondingly elongate 12 to 30 times its original length after extrusion.

Although the die slit is generally rectangularly shaped, it may contain areas of increased thickness along its width in order to form an extruded sheet having varying thickness along its width. In this case, if rollers are used in conjunction with the extrusion process they will preferably have recesses or gap variations that correspond to the areas of increased thickness within the extruded sheet. In this way a sheet having reinforced areas of increased strength and stiffness can be produced.

It will be appreciated that where the differential between the roller nip and the sheet thickness before the sheet passes between the reduction rollers is small, the fiber orienting flow of material will tend to be localized at or near the sheet surface, with the interior not being subjected to fiber orienting flow. This allows for the production of sheets that have significant unidirectional or bidirectional orientation of fibers at or near the surface of the sheet and more random orientation of fibers within the interior of the sheet. However, by decreasing the nip relative to the initial sheet thickness it is possible to increase the orientation of the fibers within the interior of the sheet by increasing the fiber orienting flow of material within the sheet interior.

In an alternative embodiment, the width of the die slit can be selectively varied as a function of time as the mixture is extruded through the slit. This permits the extrusion of a sheet having varying thickness along the length of the sheet. In this scenario, it will generally be necessary to provide rollers that also have varying gap distances as a function of time. However, because of the greater difficulty of perfectly synchronizing the rollers to accommodate the rate of extrusion of sheets of varying thickness along the length thereof, this option is less preferable than creating a sheet with varying thickness along the width as described above.

In addition to narrow die slits to form flat sheets, other dies may be used to form other objects or shapes. The only criterion being that the extruded shape be capable of being thereafter formed into a sheet. For example, in some cases it may not be desirable to extrude an extremely wide sheet. Instead, a pipe may be extruded and continuously cut and unfolded using a knife located just outside the die head.

The amount of pressure that is applied in order to extrude the moldable mixture will generally depend on the pressure needed to force the mixture through the die head, as well as the desired rate of extrusion. It should be understood that the rate of extrusion must be carefully controlled in order for the rate of sheet formation to correspond to the speed at which the sheet is subsequently passed through the rollers during the calendering step. If the rate of extrusion is too high, excess inorganically filled material will tend to build up behind the rollers, which will eventually cause a clogging of the system. Conversely, if the rate of extrusion is too low, the rollers will tend to stretch the extruded sheet, which can result in a fractured or uneven structural matrix, or worse, breakage or tearing of the sheet. The latter can also result in a complete breakdown of the continuous sheet forming process.

It will be understood that an important factor which determines the optimum speed or rate of extrusion is the final thickness of the sheet. A thicker sheet contains more material and will require a higher rate of extrusion to provide the necessary material. Conversely, a thinner sheet contains less material and will require a lower rate of extrusion in order to provide the necessary material.

The ability of the moldable mixture to be extruded through a die head, as well as the rate at which it is extruded, is generally a function of the rheology of the mixture, as well as the operating parameters and properties of the machinery. Factors such as the amount of water, water-dispersable organic binder, dispersant, the particle packing density, or the level of water absorption by the mixture components all affect the rheological properties of the mixture.

Because it will sometimes not be possible to control all of the variables that can affect the rate of extrusion, it may be preferable to have an integrated system of transducers which measure the rate of extrusion, or which can detect any buildup of excess material behind the rollers. This information can then be fed into a computer processor which can then send signals to the extruder in order to adjust the pressure and rate of extrusion in order to fine tune the overall system. A properly integrated system will also be capable of monitoring and adjusting the roller speed as well.

As set forth above, adequate pressure is necessary in order to temporarily increase the workability of the moldable mixture in the case where the mixture has a deficiency of water and has a degree of particle packing optimization. In a mixture that is water deficient, the spaces (or interstices) between the particles contain insufficient water to lubricate the particles in order to create adequate workability under ordinary conditions.

As the mixture is compressed within the extruder, the compressive forces push the particles together, thereby reducing the interstitial space between the particles and increasing the apparent amount of water that is available to lubricate the particles. In this way, workability is increased until the mixture has been extruded through the die head, at which point the reduced pressure causes the mixture to exhibit an almost immediate increase in stiffness and green strength, which is generally desirable.

It should be understood that the pressure exerted on the moldable mixture during the extrusion process should not be so great so as to crush or fracture the lightweight, lower strength aggregates (such as perlite, hollow glass spheres, pumice, or exfoliated rock). Crushing or otherwise destroying the structural integrity of these or similar lightweight aggregates containing a large amount of voids will decrease their insulating effect by eliminating the voids. Nevertheless, because perlite, exfoliated rock, or other such materials are relatively inexpensive, some level of crushing or fracturing of the aggregate particles is acceptable. At some point, however, excess pressure will eliminate the lightweight and/or insulative effect of the lightweight aggregate, at which point it would be more economical to simply include a less expensive aggregate such as sand.

In light of each of the factors listed above, the amount of pressure that will be applied by the extruder in order to extrude the moldable mixture will preferably be in the range from about 50 kPa to about 70 MPa, more preferably in the range from about 150 kPa to about 30 MPa, and most preferably in the range from about 350 kPa to about 3.5 MPa.

In some cases, particularly where a lower density, higher insulating sheet is desired, it may be advantageous to employ a blowing agent within the moldable mixture, which is added to the mixture prior to the extrusion process.

It will be understood that the extrusion of the moldable mixture through the die head will tend to unidirectionally orient the individual fibers within the moldable mixture along the "Y" axis, or in the lengthwise direction of the extruded sheet. As will be seen herein below, the calendering process will further orient the fibers in the "Y" direction as the sheet is further elongated during the reduction process. In addition, by employing rollers having varying gap distances in the "Z" direction (such as conical rollers) some of the fibers can also be oriented in the "X" direction, i.e., along the width of the sheet. Thus, it is possible to create a sheet by extrusion, coupled with calendering, which will have bidirectionally oriented fibers.

C. The Calendering Process

In most embodiments of the present invention, it will be preferable to "calender" the extruded sheet by passing the sheet between at least one pair of rollers, the purpose of which is to improve the uniformity and surface quality of the sheet. In some embodiments, the calendering step will only reduce the thickness of the sheet by a small amount, if at all. In cases where it is desirable to greatly reduce the thickness of the highly inorganically filled sheet, it will often be necessary to reduce the thickness of the sheet in steps, wherein the sheet is passed through several pairs of rollers, with each pair having progressively narrower gap distances therebetween.

As the thickness of the sheet is reduced upon passing through a pair of rollers, it will also elongate in the forward moving (or "Y") direction. One consequence of sheet elongation is that the fibers will further be oriented or lined up in the "Y" direction. In this way, the reduction process in combination with the initial extrusion process will create a sheet having substantially unidirectionally oriented fibers in the "Y", or lengthwise, direction. However, increasing the speed of the calendering process has been found to create a better randomization of fibers throughout the sheet.

Another way to maintain the random orientation of fibers within the sheet is to decrease the differential forming speed of the rollers. That is, where the moldable mixture is fed between the extruding rollers under lower pressures, the sudden increase in machine-direction velocity and accompanying shear as the mixture passes between the rollers will tend to orient the fibers in the machine direction. However, by increasing the pressure of the mixture it is possible to decrease the level of machine-direction shear, thereby resulting in a sheet with a more randomized fiber orientation.

Another consequence of sheet elongation is that the sheet will "speed up" as it passes between a pair of reduction rollers. The consequence of this is that the roller speed will be "faster" relative to the speed of the sheet as it enters into the rollers. By way of example, if the sheet thickness is reduced by 50% and assuming there is no widening of the sheet during the reduction process the sheet will elongate to twice its original length. This corresponds to a doubling of the sheet's velocity before it enters the rollers compared to when it exits the rollers.

The sheet "speeds up" while passing between a pair of rollers by being squeezed or pressed into a thinner sheet by the rotating rollers. This process of squeezing or pressing the sheet, as well as the speed differential between the entering sheet and the rollers, can create varying shearing forces on the sheet. The application of an excessively large shearing force can disrupt the integrity of the structural matrix of the sheet and create flaws within the sheet, thereby weakening the sheet. Nevertheless, it has been found that for mix designs having very low adhesion to the rollers, and which are highly plastic, it may be possible to reduce the extruded sheet to the final thickness in just one step using a pair of relatively large diameter rollers.

The diameter of each of the rollers should be optimized depending on the properties of the moldable mixture and the amount of thickness reduction of the inorganically filled sheets. When optimizing the diameter of the rollers two competing interests should be considered. The first relates to the fact that smaller diameter rollers tend to impart a greater amount of shearing force into the sheet as the sheet passes between the rollers. This is because the downward angle of compression onto the sheet is on average greater than when using a larger diameter roller.

The use of larger diameter rollers has the drawback of the inorganically filled material coming into contact with the roller for a greater period of time, thereby resulting in an increase in drying of the sheet during the calendering process in the case where the rollers are heated to prevent adhesion. Since more of the sheet comes into contact with a larger diameter roller, heating is even more important when using larger diameter rollers to prevent adhesion. While some drying is advantageous, drying the sheet too quickly during the calendering process could result in the introduction of fractures and other flaws within the structural matrix. A drier sheet is less able to conform to a new shape without a rupture in the matrix than a wetter sheet subjected to the same level of shearing forces.

Consequently, from this perspective the use of smaller diameter rollers is advantageous for reducing the drying effect of the reduction rollers. Nevertheless, some of the drawbacks of using a larger diameter roller can be minimized by using a highly polished roller, lower temperatures, and appropriate mix designs to reduce the stickiness of the moldable mixture. Also, passing the sheet through the rollers faster reduces the drying effect of the rollers and causes greater widening of the sheet.

In light of this, the diameter of the rollers should preferably be optimized and be sufficiently small to prevent overdrying of the material during the calendering process, while also being sufficiently large to reduce the amount of shearing force imparted to the sheet, thereby allowing a greater reduction of sheet thickness during each reduction step.

The optimization of the roller diameters in order to achieve the greatest amount of reduction of sheet thickness, while at the same time preventing overdrying of the molded sheet, is preferred in order to reduce the number of reduction steps in the manufacturing process. Besides reducing the number of working parts, reducing the number of reduction steps also eliminates a number of rollers whose speed must be carefully synchronized in order to prevent sheet buildup behind the rollers (in the case of rollers rotating too slow) or sheet tearing (in the case of rollers rotating too fast).

Because each of the roller pairs reduces the thickness of the sheet as it passes therebetween, the sheet will speed up each time it passes through a set of rollers. Therefore, each of the roller pairs must independently rotate at the proper speed in order to prevent interruption of the calendering process. Eliminating the number of reduction steps greatly simplifies this synchronization problem.

It is preferable to treat the roller surfaces in order to prevent sticking or adhesion of the inorganically filled sheet to the rollers. One method entails heating the rollers, which causes some of the water within the moldable mixture to evaporate, thereby creating a steam barrier between the sheet and the rollers. Evaporation of some of the water also reduces the amount of water within the moldable mixture, thereby increasing the green strength of the sheet. The temperature of the rollers, however, must not be so high as to dry or harden the surface of the sheet to the point which would create residual stresses, fractures, flaking, or other deformities or irregularities in the sheet. Accordingly, it is preferable to heat the rollers to a temperature in the range from about 40° C. to about 140° C., more preferably from about 50° C. to about 120° C., and most preferably from about 60° C. to about 85° C.

In addition, the rate of drying of the sheet can be reduced by incorporating aggregates having a low specific surface area. Aggregates that have a greater specific surface area can more readily release any water that is absorbed within the aggregate, or adsorbed onto the surface, compared to aggregates having a lower specific surface area.

Generally, the stickiness of the moldable mixture increases as the amount of water in the mixture is increased. Therefore, the rollers should generally be heated to a higher temperature in cases where the mixture contains more water in order to prevent sticking, which is advantageous because sheets containing a higher water content must generally have more of the water removed in order to obtain adequate green strength.

Because heated rollers can drive off significant amounts of water and improve the form stability, the amount of acceptable sheet thickness reduction will generally decrease in each successive reduction step as the sheet becomes drier. This is because a drier, stiffer sheet can tolerate less shear before flaws are introduced into the structural matrix.

In an alternative embodiment, adhesion between the inorganically filled sheets and rollers can be reduced by cooling the rollers to or below room temperature. Heating the mixture in the extruder to a relatively high temperature, for example, and then cooling the sheet surface causes the vaporizing water to condense, which is thought to create a thin film of water between the sheet and the roller. The rollers should be cool enough to prevent the surface of the sheet from adhering to the rollers, but not so cold to cause the sheet to freeze or become so stiff or inflexible that it will fracture or shatter during the calendering process. Accordingly, it is preferable to cool the rollers to a temperature in the range from about 0° C. to about 40° C., more preferably from about 5° C. to about 35° C., and most preferably from about 10° C. to about 15° C.

In order to obtain the beneficial nonadhesive effects of cooling the rollers, it will generally be necessary to first heat the moldable mixture before or during the extrusion process to a temperature that is significantly higher than the temperature of the cooled rollers. This allows for the beneficial condensation of water vapor from the heated mixture onto the cooled rollers, thereby creating a thin layer of lubricating water between the rollers and the moldable mixture. Accordingly, it will generally be preferable to heat the extruding mixture to a temperature in the range from about 20° C. to about 80° C. The temperature will correlate with the temperature of the rollers.

Another way to reduce the level of adhesion between the rollers and the inorganically filled sheet is to treat the roller surfaces in order to make them less amenable to adhesion. Rollers are typically made from polished stainless steel and coated with a nonstick material such as polished chrome, nickel, or teflon.

By varying the gap between the rollers, it is possible to cause the inorganically filled sheet to spread or widen in the "X" direction from the point where the gap is more narrow toward the point where the gap is wider. Spreading or widening the sheet in the "X" direction also has the beneficial effect of reorienting some of the fibers in the "X" direction, thereby creating a sheet with bidirectionally oriented fibers (in the "X" and "Y" directions). Orienting the fibers maximizes the tensile strength imparting properties of the fibers in the direction of fiber orientation.

In addition, orienting the fibers is particularly useful in order to reinforce a hinge or score within the sheet. Fibers that are greater in length than the width of the fold or bend can act as a bridge to connect the material on either side of the fold or bend even if the matrix is partially or even substantially fractured along the fold or bend. This bridging effect is enhanced if the fibers are generally aligned at an angle to the fold or bend.

Finally, it should be understood that due to the plastic nature and relatively high level of workability of the moldable mixture, the calendering process will usually not result in much compression of the sheet. In other words, the density of the sheet will remain substantially constant throughout the calendering process, although some compaction would be expected, particularly where the sheet has been significantly dried while passing between the reduction rollers. Where compaction is desired, the sheet can be passed between a pair of compaction rollers 174, as shown in FIG. 14, following a drying step as set forth more fully below.

One of ordinary skill in the art will appreciate that the extrusion step need not formally employ the use of an "extruder" as the term is used in the art. The purpose of the extrusion step is to provide a continuous, well-regulated supply of moldable inorganically filled material to the rollers. This may be achieved by other mechanisms known to those skilled in the art to effect the "extrusion" or flow of material through an appropriate opening. The force needed to cause a moldable mixture to flow may, for example, be supplied by gravity.

D. The Drying Process

Although the calendering process often results in partial or even substantial drying of the molded inorganically filled sheet, it will be preferable to further dry the sheet in order to obtain a sheet with the desired properties of tensile strength and toughness. Of course, the sheet will naturally dry out over time, although it may be unfeasible to wait for the sheet to naturally air dry. Accelerated drying may be accomplished in a number of ways, each of which involves heating the sheet in order to drive off the excess water. A preferred method of drying the sheet involves the use of large diameter, heated drying rollers sometimes known in the art as "Yankee" rollers, although a series of smaller rollers may also be employed. The main concern is that the combined surface areas of the rollers be adequate to efficiently effectuate drying of the sheet.

In contrast to the reduction rollers, which are generally aligned in pairs of rollers, the drying rollers are individually aligned so that the sheet passes over the surface of each roller individually in sequence. In this way, the two sides of the highly inorganically filled sheet are alternatively dried in steps. While the sheet passes between the reduction rollers during the calendering step in a generally linear path, the sheet follows a generally sinusoidal path when wrapping around and through the drying rollers during the drying step.

FIG. 14 shows drying rollers 172, with the side of sheet 155 adjacent to the first drying roller heated by the first drying roller while the other side is exposed to the air. The heated sheet loses water in the form of vapor, which can escape out the sides of the roller or the surface of the sheet opposite the roller. The vapor also provides a nonstick barrier between the sheet and roller. The drying rollers may have tiny holes in the surface thereof in order to allow some of the water vapor to escape through the holes during the drying step.

As sheet 155 continues on its path it is rolled onto a second drying roller where the other side of sheet 155 comes into contact with the roller surface and is dried (FIG. 14). This process may be continued for as many steps as needed in order to dry the sheet in the desired amount. The amount of drying will depend on a number of factors, including the amount of water within the sheet, the thickness of the sheet, the time that the sheet is in contact with the roller surface, the temperature of the rollers, and the desired properties of the sheet. In some cases it may be preferable to dry one side of the sheet more than the other. This may be accomplished by designing a system which maximizes the contact of one side of the sheet with the drying rollers while minimizing the contact of the other side.

The temperature of the drying rollers will depend on a number of factors, including the moisture content of the sheet as it passes over a particular roller. In any event, the temperature of the drying rollers should be less than about 300° C. Although the moldable inorganically filled material should not be heated to above 250° C. in order to prevent the destruction of the organic constituents (such as the organic polymer binder or cellulosic fibers), rollers heated to above this temperature may be used so long as there is adequate water within the mixture to cool the material as the water vaporizes. Nevertheless, as the amount of water decreases during the drying process, the temperature of the rollers should be reduced to prevent overheating of the material.

In some cases, it may be preferable to use a drying tunnel or chamber in conjunction with the drying rollers. In order to obtain the full effect of heat convection drying, it is often preferable to circulate the heated air in order to speed up the drying process. The temperature within the drying tunnel, as well as the residence or dwell time of the sheet within the tunnel, will determine the amount and rate of evaporation of the water within the inorganically filled material.

In order to achieve quick drying of the surface, it may be preferable to more quickly pass the sheet through a very hot drying tunnel. Conversely, in order to achieve a more uniform and deep drying of the sheet, it might be desirable to pass the sheet more slowly through the drying tunnel. The drying tunnel should not usually exceed 250° C. in order to prevent the destruction of cellulose fibers and the organic polymer binder. In light of the foregoing, the drying tunnel will preferably be heated to a temperature in the range from about 50° C. to about 250° C., and more preferably in the range from about 100° C. to about 200° C.

In some cases, the drying process set forth above will be the final step before the sheet is either used to form a container or other object or, alternatively, rolled onto a spool or stacked as sheets until needed. In other cases, particularly where a sheet with a smoother, more paper-like finish is desired, this drying step will be followed by one or more additional steps set forth more fully below, including a compacting step and/or a finishing step.

In the case of compaction, it is generally preferable to leave the sheets with adequate moisture so that the inorganically filled matrix remains in a moldable condition to prevent fracturing of the matrix during the optional compaction step. Otherwise, if the drying step is not followed by a compaction step, it is generally desired to substantially dry out the sheet in order to quickly maximize the tensile strength and toughness of the sheet.

E. Optional Finishing Processes

In many cases, it may be desirable to compact the inorganically filled sheet in order to achieve the final thickness, tolerance, and surface finish. In addition, the compaction process can be used to remove unwanted voids within the structural matrix. Referring to FIG. 14, sheet 155 may be optionally passed between a pair of compaction rollers 174 after being substantially dried by drying rollers 172. The compaction process generally yields a sheet with higher density and strength, fewer surface defects, a reduced thickness, and also fixes and aligns the compacted particles within the sheet surface. The amount of compressive force of the compaction rollers should be adjusted to correspond to the particular properties of the sheet.

The compaction process preferably yields a sheet of reduced thickness and increased density without causing significant elongation of the sheet and without negatively disrupting or weakening the structural matrix. In order to achieve compaction without elongating the sheet and without weakening the structural matrix, it is important to control the drying process so that the sheet contains an appropriate amount of water to maintain a moldable rheology of the sheet. If the sheet contains too much water, the compaction rollers will elongate the sheet in similar fashion as the reduction rollers. In fact, the compaction rollers are substantially the same as the reduction rollers. The only difference is that compaction rather than elongation will occur if the sheet is dry enough and the reduction in sheet thickness is less than the total porosity left by the evaporation of the water (i.e., if the evaporation of water creates an additional porosity of 25% then the roller nip should be at least 75% of the thickness of the precompacted sheet).

On the other hand, overdrying the sheet prior to the compaction step can yield a weaker sheet. At some point the inorganically filled sheet can become so dry and brittle that the inorganically filled matrix is no longer moldable and cannot be compressed without fracturing. The stressing of the structural matrix can diminish the final strength and other beneficial properties of the sheet even if the fractures are microscopic and not visible to the naked eye. The inorganically filled matrix should preferably be just moist enough to allow it to flow or mold out the voids when compacted, but dry enough so that compaction, not elongation, occurs. Nevertheless, even a completely dry sheet may be compacted in some cases without introducing significant defects by first remoistening the sheet.

It has been found preferable to compact and dry the sheets in a sequential fashion in order to progressively compact the sheet. This allows for the removal of just enough of the water to allow the sheet to compact, while retaining sufficient water to maintain the moldability of the inorganically filled matrix. Because the compaction process forces the particles into closer proximity, thereby increasing the particle packing density and reducing the porosity within the sheet, there is more water available for lubricating the particles after the compaction step, assuming a constant water content, within the sheet. This allows for the simultaneous or subsequent removal of water from the sheet without a significant reduction in moldability. This in turn makes possible the sequential compaction and removal of water without concomitant damage to the sheet structure.

Because the compaction process (including one or more compaction steps) usually involves a slightly moist sheet, it is usually preferable after the compaction step to further dry the sheet in a manner similar to the drying process outlined above using optional drying rollers 178 as shown in FIG. 14. This optional drying step may be carried out using drying rollers 178, a drying tunnel, or a combination of the two. Nevertheless, in some cases the sheet may be further processed without a second drying step, such as where the sheet is immediately used to form a container or other object, is scored, or where it is otherwise advantageous to have a slightly moist sheet.

It may also be preferable to further alter the surface of the inorganically filled sheet by passing the sheet between one or more pairs of finishing rollers 180 as shown in FIG. 14. For example, in order to create a sheet with a very smooth surface on one or both sides, the sheet may be passed between a pair of hard and soft rollers. The term "hard roller" refers to a roller having a very polished surface and which leaves the side of the sheet in contact with the hard roller very smooth. The term "soft roller" refers to a roller having a surface capable of creating enough friction between the soft roller and the sheet that it pulls the sheet through the hard and soft roller pair. This is necessary because the hard roller is usually too slick to pull the dry sheet through a pair of hard rollers. Besides, some slippage of the hard roller is advantageous in order to align the particles on the surface of the sheet. Using a driven, highly polished hard roller in order to "supercalender" the sheet results in a sheet having a very smooth surface finish. The finishing process may be optionally facilitated by spraying water on the sheet surface, and/or by coating the surface with clay, calcium carbonate, or other appropriate coating materials known to one of ordinary skill in the art.

In other embodiments, finishing rollers 180 can impart a desired texture such as a meshed or checkered surface. Instead of using a hard and a soft roller, rollers which can imprint the sheets with the desired finish may be used. If desired, the rollers can imprint the surface of the sheet with a logo or other design. Special rollers capable of imparting a water mark can be used alone or in conjunction with any of these other rollers.

Although the finishing or calendering process usually requires some compaction of a sheet that has been dried to the point where the inorganically filled matrix is no longer moldable, the compaction is not so great that it significantly weakens the sheet and is generally localized at the surface of the sheet. The tradeoff between the slight reduction in sheet strength is the vast improvement in surface quality that is brought about by the finishing process.

The inorganically filled sheets may alternatively be creped much like conventional paper in order to provide a highly extensible sheet that is capable of absorbing energy at sudden rates of strain. Creped sheets are increasingly important in the production of shipping sacks. Conventional creping is performed either at the wet press section of a paper machine (wet crepe) or on a Yankee dryer (dry crepe). Although the exact parameters of either a wet or dry creping process will differ between the inorganically filled sheets of the present invention and tree paper, one of ordinary skill in the art will recognize how to adjust the creping process in order to obtain creped inorganically filled sheets.

It has been found that the inorganically filled sheets can be treated with strong acids in order to parchment the fibrous surface portion of the sheet matrix. Treating the sheet with, for example, concentrated sulfuric acid causes the cellulosic fibers to swell tremendously and become partially dissolved. In this state, the plasticized fibers close their pores, fill in surrounding voids and achieve more intimate contact between them for more extensive hydrogen bonding. Rinsing with water causes reprecipitation and network consolidation, resulting in fibers that are stronger wet than dry, lint free, odor free, taste free, and resistant to grease and oils. By combining parchment's natural tensile toughness with extensibility imparted by wet creping, inorganically filled paper with great shock-absorbing capability can be produced.

In the present invention, it can be seen that the parchmenting process would be expected to work better as the fiber content of the sheets is increased. Increased fiber content facilitates the sealing of the pores and increased hydrogen bonding of the fibers. It should be understood, however, that certain acid sensitive aggregates, such as calcium carbonate, should probably not be used where the sheet is to be parchmented.

F. Coating Processes

It may be preferable to apply coatings or coating materials to the highly inorganically filled sheets prepared according to the processes set forth above. Coatings can be used to alter the surface characteristics of the sheet in a number of ways, including sealing and protecting the sheet or other object made therefrom. Coatings may provide protection against moisture, base, acid, grease, or organic solvents. They may also provide a smoother, glossier, or scuff-resistant surface and help to prevent fiber "fly away." Coatings can be used to reinforce the wet inorganically filled sheet during the sheet processing stage, or they may strengthen and reinforce a dry sheet, particularly at a bend or fold line. Some coatings can also be utilized as adhesives or to form laminated sheets.

Related to the concept of coating is the "sizing" of the sheets, which essentially refers to the sealing of the pores of the sheets. Sizing can be used to improve the smoothness and water resistance of the inorganically filled sheets. Sizing can either increase or decrease the strength, modulus, and elongation (or extensibility) depending on their composition and amount used. Some sizings or coatings may soften the inorganically filled matrix, thereby resulting in a more flexible sheet. Other sizings may make the sheet more stiff.

Coatings can be applied to the surface of the sheet during the sheet forming process, in which case the process is an "on-machine" process. However, it may be preferable to apply the coating after the sheet forming process, in which case the process is an "off-machine" process.

The object of the coating process is usually to achieve a uniform film with minimum defects on the surface of the sheet. The selection of a particular coating process depends on a number of substrate (i.e., sheet) variables, as well as coating formulation variables. The substrate variables include the strength, wettability, porosity, density, smoothness, and uniformity of the sheet. The coating formulation variables include total solids content, solvent base (including water solubility and volatility), surface tension, and rheology.

Coatings may be applied to the sheets using any coating method known in the art of manufacturing paper, paperboard, plastic, polystyrene, sheet metal, or other packaging materials. Coating processes known in the art that may be used to coat the inorganically filled sheets of the present invention include blade, puddle, air-knife, printing, Dahlgren, gravure, and powder coating. Coatings may also be applied by spraying the sheet or other object made therefrom with the coating material or by dipping the sheet or object into a vat containing an appropriate coating material. Finally, coatings may be coextruded along with the sheet in order to integrate the coating process with the extrusion process. A more detailed description of useful coating processes is set forth in the Andersen-Hodson Technology.

In some cases, it may be preferable for the coating to be elastomeric, deformable, or waterproof. Some coatings may also be used to strengthen places where the inorganically filled sheets are to be more severely bent, such as where the sheet has been scored. In such cases, a pliable, possibly elastomeric, coating may be preferred. Besides these coatings, any appropriate coating material would work depending on the application involved.

G. Other Processes

It may be desirable to apply print or other indicia on the surface of the inorganically filled sheet such as trademarks, product information, container specifications, or logos. This can be accomplished using printing means known in the art of printing conventional paper or paperboard products. In addition, the sheets may be embossed or provided with a watermark. Because the inorganically filled sheets have a relatively high porosity, the applied ink will tend to dry rapidly. In addition, decals, labels or other indicia can be attached or adhered to the inorganically filled sheet using methods known in the art.

Finally, the substantially hardened sheets can be immediately used to form containers, printed materials, or other objects, or they may be stored until needed such as, for example, by winding the sheets onto a spooler 182 as shown in FIG. 14, or cutting and stacking individual sheets in a pile.

The inorganically filled sheets made according to the processes set forth above can then be fashioned into an endless variety of containers or other useful objects. One particularly valuable use of these sheets is in the manufacture of disposable food or beverage containers used in the fast food industry.

VI. EXAMPLES of the Preferred Embodiments

The following examples are presented in order to more specifically teach the method of forming sheets, containers, and hinges according to the present invention. The examples include various mix designs, as well as methods for manufacturing sheets, containers, hinges, and other articles of manufacture having varying properties and dimensions.

EXAMPLES 1–6

Highly inorganically filled sheets were prepared from moldable mixtures that included the following components:

| Example | $CaCO_3$ | Fiber | Tylose ® | Water |
| --- | --- | --- | --- | --- |
| 1 | 6 kg | 0.25 kg | 0.1 kg | 1.8 kg |
| 2 | 5 kg | 0.25 kg | 0.1 kg | 1.7 kg |
| 3 | 4 kg | 0.25 kg | 0.1 kg | 1.6 kg |
| 4 | 3 kg | 0.25 kg | 0.1 kg | 1.5 kg |
| 5 | 2 kg | 0.25 kg | 0.1 kg | 1.4 kg |
| 6 | 1 kg | 0.25 kg | 0.1 kg | 1.3 kg |

The fiber that was used in each of these examples was southern pine. The water, Tylose® (FL 15002), and fibers were first mixed for 10 minutes under high shear in a Hobart kneader-mixer. Thereafter, the calcium carbonate was added to the mixture, which was mixed for an additional 4 minutes under low shear.

The particle packing density of the calcium carbonate in each of these mixtures was about 0.63, and the resulting mixtures had the following percentages by volume of the total solids of inorganic aggregate, respectively: 89.7%, 87.9%, 85.3%, 81.3%, 74.4%, and 59.2%. These correspond to the following percentages by weight of the total solids: 94.5%, 93.5%, 92.0%, 89.6%, 85.1%, and 74.1%. The sheets of Examples 1–6 contained the following amounts of fiber as a percentage by volume of the total solids, respectively: 7.2%, 8.5%, 10.3%, 13.1%, 18.0%, and 28.7%. These amounts would be considerably less if measured in weight percentage.

The moldable mixtures were extruded using a deairing auger extruder through a 30 cm×0.6 cm die to form continuous sheets having corresponding dimensions of width and thickness. The extruded sheet was then passed between a pair of reduction rollers having a gap distance therebetween corresponding to the final thickness of the sheet formed. Because calcium carbonate has a low specific surface area these mixtures have a low adhesiveness to the rollers. The sheets formed in these examples had thicknesses of 0.23 mm, 0.3 mm, 0.38 mm, and 0.5 mm.

As less calcium carbonate was used, the tensile strength, flexibility, and folding endurance of the sheet increased. However, adding more calcium carbonate yielded a sheet with a smoother surface and easier placeability through the rollers, which reduced the amount of internal defects. Increasing the amount of $CaCO_3$ had the effect of decreasing the porosity of the sheet, which ranged from 37.4% to 70.3% by volume of the final dried sheets.

The sheets of Examples 1–6 were score cut when dried using a knife blade cutter to form hinges therein. The score cut had a triangular profile and resulted in the material below the score forming the hinges having a thickness of 0.1

EXAMPLES 7–12

Highly inorganically filled sheets were prepared from moldable mixtures that included the following components:

| Example | $CaCO_3$ | Fiber | Tylose ® | Water | Glass Spheres |
|---|---|---|---|---|---|
| 7 | 1.0 kg | 0.2 kg | 0.1 kg | 2.1 kg | 0.5 kg |
| 8 | 1.0 kg | 0.3 kg | 0.1 kg | 2.1 kg | 0.5 kg |
| 9 | 1.0 kg | 0.4 kg | 0.1 kg | 2.1 kg | 0.5 kg |
| 10 | 1.0 kg | 0.5 kg | 0.1 kg | 2.1 kg | 0.5 kg |
| 11 | 1.0 kg | 0.6 kg | 0.1 kg | 2.1 kg | 0.5 kg |
| 12 | 1.0 kg | 0.7 kg | 0.1 kg | 2.1 kg | 0.5 kg |

The fiber that was used in each of these examples was southern pine. The water, Tylose® (FL 15002), and fibers were first mixed for 10 minutes in a Hobart kneader-mixer. Thereafter, the calcium carbonate and hollow glass spheres were added to the mixture, which was mixed for an additional 6 minutes under low shear. The particle packing density of the combined calcium carbonate and hollow glass spheres in each of these mixtures was 0.73, and the resulting mixtures had the following percentages by volume of the total solids of inorganic aggregate, respectively: 88.5%, 85.3%, 82.3%, 79.6%, 77.0%, and 74.5%.

The moldable mixtures were extruded using a deairing auger extruder through a 30 cm×0.6 cm die to form continuous sheets having corresponding dimensions of width and thickness. The extruded sheet was then passed between a pair of reduction rollers having a gap distance therebetween corresponding to the final thickness of the sheet formed. Because calcium carbonate and glass spheres each have a low specific surface area these mixtures have a low adhesiveness to the rollers. The sheets formed in these examples had thicknesses of 0.23 mm, 0.3 mm, 0.38 mm, and 0.5 mm.

When calcium carbonate particles having an average diameter of 35 microns were used (maximum 100 microns), the resulting sheet had a matte surface. However, when much smaller particles are used (98% of them being smaller than 2 microns), the resulting sheet had a glossy surface.

Increasing the fiber of the sheet increased the tensile strength, flexibility, and folding endurance of the final hardened sheets.

The sheets of Examples 7–12 were score cut when dried using a continuous die cut roller to form hinges therein. The score cut was made at a 45° angle to the direction of the fibers in the sheets. The score cut had a triangular profile and resulted in the material below the score forming the hinges having a thickness of 0.05 mm.

EXAMPLE 13

Examples 7–12 were repeated in every respect except that 1.0 kg mica was substituted for the calcium carbonate. In all other respects the mixtures were prepared in substantially the same manner. Mica is a clay-like, plate-shaped natural mineral having an average particle size of less than about 10 microns. The particle packing density of the combined mica and hollow glass spheres in each of these mixtures was about 0.7, and the resulting mixtures had the following percentages by volume of the total solids of inorganic aggregate, respectively: 88.5%, 85.3%, 82.3%, 79.6%, 77.0%, and 74.5%. The plate-like shape of the mica yields sheets having glossier surface finishes.

EXAMPLE 14

The mix design and methods set forth in Example 13 were repeated in every way except that 0.25 kg of southern pine was added to the moldable mixture used to form the inorganically filled sheets. The final hardened sheets had a tensile strength of 14.56 MPa, a modulus of 2523 MPa, an elongation of 1.42% before failure in the strongest (machine) direction, and a tensile strength of 6.66 MPa and an elongation before failure of 0.93% in the weak (cross-machine) direction.

EXAMPLE 15

Example 7–12 were repeated in every respect except that 1.0 kg kaolin was substituted for the calcium carbonate. In all other respects the mixtures were prepared in substantially the same manner. Kaolin is essentially a naturally occurring clay in which 98% of the particles are smaller than about 2 microns. The particle packing density of the combined kaolin and hollow glass spheres in each of these mixtures was 0.69, and the resulting mixtures had the following percentages by volume of the total solids of inorganic aggregate, respectively: 88.5%, 85.3%, 82.3%, 79.6%, 77.0%, and 74.5%. The kaolin yielded sheets having a glossy surface finish.

EXAMPLES 16–21

Highly inorganically filled sheets were prepared from moldable mixtures that included the following components:

| Example | Fused Silica | Cellulose Fiber | Tylose ® FL 15002 | Water | Glass Spheres |
|---|---|---|---|---|---|
| 16 | 1.0 kg | 0.2 kg | 0.1 kg | 2.1 kg | 0.5 kg |
| 17 | 1.0 kg | 0.3 kg | 0.1 kg | 2.1 kg | 0.5 kg |
| 18 | 1.0 kg | 0.4 kg | 0.1 kg | 2.1 kg | 0.5 kg |
| 19 | 1.0 kg | 0.5 kg | 0.1 kg | 2.1 kg | 0.5 kg |
| 20 | 1.0 kg | 0.6 kg | 0.1 kg | 2.1 kg | 0.5 kg |
| 21 | 1.0 kg | 0.7 kg | 0.1 kg | 2.1 kg | 0.5 kg |

The fiber that was used in each of these examples was southern pine. The water, Tylose® FL 15002, and fibers were first mixed for 10 minutes in a Hobart kneader-mixer. Thereafter, the fused silica and hollow glass spheres were added to the mixture, which was mixed for an additional 6 minutes under low shear. The particle packing density of the combined fused silica and hollow glass spheres in each of these mixtures was about 0.73, and the resulting mixtures had the following percentages by volume of the total solids of inorganic aggregate, respectively: 88.5%, 85.3%, 82.3%, 79.6%, 77.0%, and 74.5%.

The moldable mixtures were extruded using a deairing auger extruder through a 30 cm×0.6 cm die to form continuous sheets having corresponding dimensions of width and thickness. The extruded sheet was then passed between a pair of reduction rollers having a gap distance therebetween corresponding to the final thickness of the sheet formed. Fused silica is quartzitic and has an average particle size less than about 10 microns. Because fused silica and glass spheres each have a low specific surface area these mixtures have a low adhesiveness to the rollers. The sheets formed in these examples had thicknesses of 0.23 mm, 0.3 mm, 0.38 mm, and 0.5 mm.

Increasing the fiber of the sheet increased the tensile strength, flexibility, and folding endurance of the final hardened sheets.

The sheets of Examples 16–21 had double score cuts made therein to form hinges that allowed bending of the sheets in either direction. The score cuts had a triangular profile and were made on both sides of the sheets at adjacent locations.

While Examples 22–29 which follow are hypothetical in nature, they are based on similar mix designs and processes that have actually been carried out. They are presented in this manner in order to more fully teach the invention.

EXAMPLES 22–27

Highly inorganically filled sheets are prepared from moldable mixtures that include the following components:

| Example | Finely Ground Granite | Cellulose Fiber | Tylose ® FL 15002 | Water | Glass Spheres |
| --- | --- | --- | --- | --- | --- |
| 22 | 1.0 kg | 0.2 kg | 0.1 kg | 2.1 kg | 0.5 kg |
| 23 | 1.0 kg | 0.3 kg | 0.1 kg | 2.1 kg | 0.5 kg |
| 24 | 1.0 kg | 0.4 kg | 0.1 kg | 2.1 kg | 0.5 kg |
| 25 | 1.0 kg | 0.5 kg | 0.1 kg | 2.1 kg | 0.5 kg |
| 26 | 1.0 kg | 0.6 kg | 0.1 kg | 2.1 kg | 0.5 kg |
| 27 | 1.0 kg | 0.7 kg | 0.1 kg | 2.1 kg | 0.5 kg |

The fiber that is used in each of these examples is from southern pine. The water, Tylose® FL 15002, and fibers are first mixed for 10 minutes in a Hobart kneader-mixer. Thereafter, the finely ground granite and hollow glass spheres are added to the mixture, which is mixed for an additional 6 minutes under low shear. The particle packing density of the combined finely ground granite and hollow glass spheres in each of these mixtures is about 0.73, and the resulting mixtures have the following percentages by volume of the total solids of inorganic aggregate, respectively: 88.5%, 85.3%, 82.3%, 79.6%, 77.0%, and 74.5%.

The moldable mixtures are extruded using a deairing auger extruder through a 30 cm×0.6 cm die to form continuous sheets having corresponding dimensions of width and thickness. The extruded sheet is then passed between a pair of reduction rollers having a gap distance therebetween corresponding to the final thickness of the sheet formed. The low specific surface area of the glass spheres causes these mixtures to have lower adhesiveness to the rollers. The sheets formed in these examples have thicknesses of 0.23 mm, 0.3 mm, 0.38 mm, and 0.5 mm.

Increasing the fiber of the sheet increases the tensile strength, flexibility, and folding endurance of the final hardened sheets.

The sheets of Examples 22–27 have double score cuts made therein to form hinges that allow bending of the sheets in either direction. The score cuts have a triangular profile and are made on both sides of the sheets at adjacent locations.

EXAMPLE 28

Examples 22–27 are repeated in every respect except that 1.0 kg of finely ground quartz is substituted for the finely ground granite. In all other respects the mixtures are prepared in substantially the same manner. The particle packing density of the combined finely ground quartz and hollow glass spheres in each of these mixtures is about 0.74, and the resulting mixtures have the following percentages by volume of the total solids of inorganic aggregate, respectively: 88.5%, 85.3%, 82.3%, 79.6%, 77.0%, and 74.5%.

Decreasing the amount of aggregate increases the effective amounts of organic binder and fibers. Including more aggregate yields sheets that have greater stiffness, are more brittle, and have greater compressive strength. Increasing the amount of fiber and organic binder yields sheets that have greater flexibility, toughness, and tensile strength.

EXAMPLE 29

Examples 22–27 are repeated in every respect except that 1.0 kg finely ground basalt is substituted for the finely ground granite. In all other respects the mixtures are prepared in substantially the same manner. The particle packing density of the combined finely ground basalt and hollow glass spheres in each of these mixtures is about 0.74, and the resulting mixtures have the following percentages by volume of the total solids of inorganic aggregate, respectively: 88.5%, 85.3%, 82.3%, 79.6%, 77.0%, and 74.5%.

Decreasing the amount of aggregate increases the effective amounts of organic binder and fibers. Including more aggregate yields sheets that have greater stiffness, are more brittle, and have greater compressive strength. Increasing the amount of fiber and organic binder yields sheets that have greater flexibility, toughness, and tensile strength.

EXAMPLES 30–34

Highly inorganically filled sheets were prepared from moldable mixtures that include the following components:

| Example | CaCO$_3$ | Fiber | Tylose ® | Water | Glass Spheres |
| --- | --- | --- | --- | --- | --- |
| 30 | 1.0 kg | 0.2 kg | 0.1 kg | 2.1 kg | 0.0 kg |
| 31 | 1.0 kg | 0.2 kg | 0.1 kg | 2.1 kg | 0.5 kg |
| 32 | 1.0 kg | 0.2 kg | 0.1 kg | 2.1 kg | 1.0 kg |
| 33 | 1.0 kg | 0.2 kg | 0.1 kg | 2.1 kg | 1.5 kg |
| 34 | 1.0 kg | 0.2 kg | 0.1 kg | 2.1 kg | 2.0 kg |

The fiber that was used in each of these examples was southern pine. The water, Tylose® (FL 15002), and fibers were first mixed for 10 minutes in a Hobart kneader-mixer. Thereafter, the calcium carbonate and hollow glass spheres were added to the mixture, which was mixed for an additional minutes under low shear. The particle packing density of the combined calcium carbonate and hollow glass spheres in each of these mixtures was about 0.73, and the resulting mixtures had the following percentages by volume of the total solids of inorganic aggregate, respectively: 62.8%, 88.5%, 93.2%, 95.2%, and 96.6%. The densities (expressed as g/cm$^3$) of the resulting sheets were 2.0, 0.87, 0.66, 0.57, and 0.52, respectively.

The moldable mixtures were extruded using a deairing auger extruder through a 30 cm×0.6 cm die to form continuous sheets having corresponding dimensions of width and thickness. The extruded sheets were then passed between a pair of reduction rollers having a gap distance therebetween corresponding to the final thickness of the sheets formed. Because calcium carbonate and glass spheres each have a low specific surface area these mixtures had a low adhesiveness to the rollers. The sheets formed in these examples had thicknesses of 0.23 mm, 0.3 mm, 0.38 mm, and 0.5 mm.

The sheets of Examples 30–34 were pressed while wet with a scoring die and flexed to form living hinges therein. The pressed scores had a rounded profile and were made at a 35+ angle to the direction of the fibers in the sheets. The scores were pressed at a controlled rate, depth and pressure such that the material below the scores forming the hinges had a thickness of 0.1 mm.

EXAMPLE 35

Relatively thin inorganically filled sheets were formed by molding an inorganically filled mixture which included the following:

| | |
|---|---|
| Water | 2.0 kg |
| Tylose ® FL 15002 | 0.2 kg |
| Hollow Glass Spheres (<100 microns) | 2.0 kg |
| Abaca Fiber | 5% by volume of total solids |

The inorganically filled mixture was made by prewetting the abaca fiber (which is pretreated by the manufacturer so that greater than 85% of the cellulose is α-hydroxycellulose) and then adding the excess water and the fibers to a mixture of Tylose®. This mixture was mixed at relatively high speed for about 10 minutes, and then at a relatively slow speed for 10 minutes after the hollow glass spheres were added.

This mixture was passed between a pair of rollers and formed into sheets having a thickness of about 1 mm. Wet sheets were scored and then folded in an attempt to create a box. A fair amount of splitting resulted and a box with sufficient strength and integrity generally could not be formed.

Thereafter, sheets were first allowed to harden and then scored, folded into the shape of a box, and glued together by cementing or gluing methods well-known in the paper art. The amount of splitting at the fold was negligible, demonstrating that it is preferable to score and then fold the thin sheets after they have been allowed to harden or solidify somewhat. The thin sheets were formed into a box that had the shape, look and weight of a dry cereal box manufactured presently from paperboard stock.

In the following examples, very thin sheets are formed (0.1–0.5 mm) which have many characteristics and properties which make them suitable for use much like paper, paperboard, plastic, polystyrene, or metal sheets of similar thickness and weight. The desired properties are designed into the sheets using a microstructural engineering approach. This allows for the manufacture of sheets having a variety of desirable properties, including properties not generally possible using mass-produced sheet-like objects presently manufactured from the foregoing materials.

EXAMPLES 36–51

Inorganically filled sheets capable of being formed into a variety of objects (including food or beverage containers) are manufactured from moldable mixtures made according to Examples 1–6.

In order to obtain sheets having the desired thickness, the extruded sheets are reduced in steps by using reduction roller pairs having progressively smaller gap distances between the rollers. The sheet thicknesses are reduced as follows:

```
6 mm ==> 2 mm ==> 0.5 mm ==> final thickness
                              (0.45 mm, 0.4 mm, 0.35 mm,
                               0.3 mm, 0.25 mm, or 0.2 mm)
```

A combination of the extrusion process and the rolling process yields sheets with significantly unidirectionally oriented fibers along the length (or machine direction) of the sheet. Because of this, the sheets have higher tensile strength in the machine direction compared to the cross-machine direction. This factor can be utilized in order to maximize the performance of the container in the direction in which tensile strength is more important.

The hardened inorganically filled sheets are finished, coated, and then formed into a number of different food and beverage containers. For example, a "clamshell" container (such as those presently used in the fast food industry to package hamburgers) is made by cutting an appropriate blank from a sheet, score cutting the blank to form the desired fold lines, folding the blank into the shape of a clamshell container, and adhering the ends of the folded blank (using both adhesive and interlocking flap means) to preserve the integrity of the container. Sheets having thicknesses of 0.4 mm and 0.5 mm are used to make the clamshell containers. The sheet bends or closes together on the side of the sheet opposite the score cut. It should be noted that normal scores in conventional materials generally allow the sheet to more easily bend or close together on the side of the score. The clamshell containers exhibit comparable or superior insulating ability compared to paper clamshells.

A french fry container (such as those used to serve cooked french fries in the fast food industry) is made by cutting an appropriate blank from a sheet, score cutting the blank to form the desired fold lines, folding the blank into the shape of a french fry container, and adhering the ends of the folded blank using adhesive means to preserve the integrity of the container. Sheets having thicknesses of 0.25 mm, 0.3 mm, 0.35 mm, 0.4 mm, 0.45 mm, and 0.5 mm are used to make the french fry containers.

A frozen food box (such as those used by supermarkets to package frozen foods such as vegetables or french fries) is made by cutting an appropriate blank from a sheet, score cutting the blank to form the desired fold lines, folding the blank into the shape of a frozen food box, and adhering the ends of the folded blank using adhesive means to preserve the integrity of the box. Sheets having thicknesses of 0.25 mm, 0.3 mm, 0.35 mm, 0.4 mm, 0.45 mm, and 0.5 mm are used to make the frozen food boxes.

A cold cereal box is made by cutting an appropriate blank from a 0.3 mm thick sheet, score cutting the blank to form the desired fold lines, folding the blank into the shape of a cold cereal box, and adhering the ends of the folded blank using adhesive means to preserve the integrity of the cereal box.

A straw is made by rolling a piece of a 0.25 mm sheet into the form of a straw and adhering the ends together using adhesion means known in the art. A hinge is molded in one section of the straw to make the straw bendable. In making the straw, as in making each of the containers set forth above, it is advantageous to control the moisture content of the sheet in order to maintain the highest level of flexibility of the sheet. The higher level of flexibility minimizes splitting and tearing of the sheet.

The containers so made are set forth as follows, including the thickness of the sheet used to make each container:

| Example | Container | Sheet Thickness |
| --- | --- | --- |
| 36 | clamshell | 0.4 mm |
| 37 | clamshell | 0.5 mm |
| 38 | french fry container | 0.25 mm |
| 39 | french fry conatiner | 0.3 mm |
| 40 | french fry container | 0.35 mm |
| 41 | french fry container | 0.4 mm |
| 42 | french fry container | 0.45 mm |
| 43 | french fry container | 0.5 mm |
| 44 | frozen food box | 0.25 mm |
| 45 | frozen food box | 0.3 mm |
| 46 | frozen food box | 0.35 mm |
| 47 | frozen food box | 0.4 mm |
| 48 | frozen food box | 0.45 mm |
| 49 | frozen food box | 0.5 mm |
| 50 | cold cereal box | 0.3 mm |
| 51 | drinking straw | 0.25 mm |

EXAMPLE 52

Examples 36–51 are repeated in every respect except that a highly inorganically filled mixture having the following components is used instead:

| | |
| --- | --- |
| Perlite | 1.0 kg |
| Mica | 1.0 kg |
| Fiber (Southern pine) | 0.25 kg |
| Tylose ® FL 15002 | 0.2 kg |
| Water | 2.5 kg |

The mica, fiber, Tylose®, and water are mixed together in a high shear mixer for 5 minutes, after which the perlite is added and the resulting mixture is mixed for an additional 5 minutes in a low shear mixer. The inorganically filled mixture is then placed into an auger extruder and extruded through a die having an opening in the shape of a slit. The mixture is extruded into continuous sheets having a width of 300 mm and a thickness of 6 mm.

The sheets are thereafter passed between one or more pairs of reduction rollers in order to obtain sheets having final thicknesses of 0.2 mm, 0.25 mm, 0.3 mm, 0.35 mm, 0.4 mm, 0.45 mm, and 0.5 mm, respectively.

The sheets can be processed into each of the containers set forth above, including a clamshell, french fry container, frozen food box, cold cereal box, and drinking straw.

EXAMPLE 53

Example 51 is repeated in every respect except that the sheet used to form the drinking straw has a thickness of only 0.05 mm. The drinking straw formed in this example contains approximately ⅕ the mass of the straw that is 0.25 mm thick, making it more suitable for the mass production of disposable, single-use drinking straws.

EXAMPLE 54

Clamshell containers are made using the sheets made according to Examples 36–52. The sheets are tested to determine the optimum score cut depth which will allow for the easiest bend, while at the same time leaving a hinge with the highest strength and resilience. Score depths ranging between 20% to 50% are tested, with a score depth of 25% yielding the best results. In addition, thicker sheets (0.4–0.5 mm) give a better score and yield a stronger, more rigid clamshell container.

EXAMPLE 55

A clamshell is made using the sheets of Examples 36–52, except that a triple reverse hinge is used. That is, a series of three score cuts are cut into the outer side of the clamshell container. Because this decreases the distance that each individual score line has to bend, the resulting hinge can be opened and closed more times without breaking compared to a single score cut hinge.

EXAMPLE 56

Clamshell containers made according to Examples 36 and 37 are passed through a commercial wax coating machine, whereby a uniform layer of wax is applied to the surface. The layer of wax completely seals the surface of the container to moisture and renders it watertight.

EXAMPLE 57

Clamshell containers made according to Examples 36 and 37 are made from sheets that are pretreated with starch. This has the effect of greatly reducing the absorption of water by the containers, although over time they will be water degradable.

EXAMPLE 58

Clamshell containers made according to Examples 36 and 37 are coated with an acrylic coating using a fine spraying nozzle. As does the wax in Example 56, the layer of acrylic coating completely seals the surface of the container to moisture and renders it watertight. However, the acrylic coating has the advantage that it is not as visible as the wax coating. Because a thinner acrylic coating is possible, the container looks almost as if it were uncoated. The glossiness of the container can be controlled by using different types of acrylic coatings.

EXAMPLE 59

Clamshell containers made according to Examples 36 and 37 are coated with a commercially used melamine coating using a fine spraying nozzle. As in Examples 56 and 58, the layer of melamine coating completely seals the surface of the container to moisture and renders it watertight. However, the melamine coating is also less visible and can be applied in a thinner coat compared to the wax coating. The glossiness of the container can be controlled by using different types of melamine coatings.

EXAMPLE 60

Clamshell containers made according to Examples 36 and 37 are coated with a totally environmentally benign coating consisting of a mixture of hydroxymethylcellulose plasticized with polyethylene glycol. This coating completely seals the surface of the container to moisture and renders it watertight. However, the surface looks even more natural and less glossy than containers coated with wax, acrylic, or melamine.

EXAMPLE 61

Clamshell containers made according to Examples 36 and 37 are coated with a totally environmentally benign coating consisting of polylactic acid. This coating completely seals the surface of the container to moisture and renders it watertight.

EXAMPLE 62

Clamshell containers made according to Examples 36 and 37 are coated with a totally environmentally benign coating consisting of soy bean protein. This coating completely seals the surface of the container to moisture and renders it watertight.

EXAMPLES 63–69

French fry containers made according to Examples 38–43 are alternatively coated with the same coating materials used to coat the clamshell containers in Examples 56–62. The results are substantially identical to those achieved with the coated clamshell containers.

| Example | Coating Material |
|---|---|
| 63 | wax |
| 64 | starch |
| 65 | acrylic |
| 66 | melamine |
| 67 | plasticized hydroxymethylcellulose |
| 68 | polylactic acid |
| 69 | soy bean protein |

EXAMPLES 70–76

Frozen food boxes made according to Examples 44–49 are alternatively coated with the same coating materials used to coat the clamshell containers in Examples 56–62. The results are substantially identical to those achieved with the coated clamshell containers.

| Example | Coating Material |
|---|---|
| 70 | wax |
| 71 | starch |
| 72 | acrylic |
| 73 | melamine |
| 74 | plasticized hydroxymethylcellulose |
| 75 | polylactic acid |
| 76 | soy bean protein |

EXAMPLES 77–83

Cold cereal boxes made according to Example 50 were alternatively coated with the same coating materials used to coat the clamshell containers in Examples 56–62. The results are substantially identical to those achieved with the coated clamshell containers.

| Example | Coating Material |
|---|---|
| 77 | wax |
| 78 | starch |
| 79 | acrylic |
| 80 | melamine |
| 81 | plasticized hydroxymethylcellulose |
| 82 | polylactic acid |
| 83 | soy bean protein |

EXAMPLES 84–90

Drinking straws made according to Example 51 are alternatively coated with the same coating materials used to coat the clamshell containers in Examples 56–62. The results are substantially identical to those achieved with the coated clamshell containers with regard to the outer surface of the straws, although it is more difficult to adequately coat the inside of the straw in this manner.

| Example | Coating Material |
|---|---|
| 84 | wax |
| 85 | starch |
| 86 | acrylic |
| 87 | melamine |
| 88 | plasticized hydroxymethylcellulose |
| 89 | polylactic acid |
| 90 | soy bean protein |

EXAMPLE 91

The containers set forth above are placed in a microwave oven and tested for microwave compatibility; that is, they are tested to determine whether the containers themselves, or the food items within them, become hot when a container and food are exposed to microwave radiation. In fact, the containers themselves will remain cool. Because of the low dielectric constant of the material, all of the energy goes into the food not the container.

For the same reason, steam may condense onto the surface of the container during the initial stages of the microwaving and quickly revaporize under further microwaving. Therefore, when the food container is opened, no condensed steam is on the surface of the container after the microwave process. Any excess steam comes out when the container is opened, leaving food which looks and tastes better. This is in sharp contrast to polystyrene containers which tend to accumulate large amounts of condensed steam on the container surfaces, thereby rendering a "soggy" and, hence, less desirable, food product. In addition, polystyrene containers often melt if the food is heated too long.

The specific heats of the inorganically filled materials are relatively low, and these materials also have a low thermal constant. This allows for less thermal conduction from the food to the container during the microwave process. It is possible, therefore, to remove the container from the microwave oven without burning the hands. After the container is removed from the microwave oven it slowly warms (by absorbing some of the heat within the food) but never becomes too hot to touch.

EXAMPLE 92

Flat paper sheets suitable for manufacturing a wide variety of food and beverage containers are manufactured from an inorganically filled mixture containing the following:

| | |
|---|---|
| Perlite | 0.6 kg |
| Hollow Glass Spheres (<0.1 mm) | 1.0 kg |
| Mica | 1.0 kg |
| Fiber (Southern pine) | 0.25 kg |
| Tylose® FL 15002 | 0.2 kg |
| Water | 2.5 mg |

The mica, fiber, Tylose®, and water are mixed together in a high shear mixer for 5 minutes, after which the perlite and hollow glass spheres are added and the resulting mixture is mixed using low shear. The mixture is extruded using an auger extruder and a die into a sheet 30 cm wide and 0.6 cm thick. The sheet is passed successively between pairs of heated rollers in order to reduce the thickness of the sheet to between 0.1 mm and 2 mm.

The sheets of Example 92 are pressed while wet at a controlled rate, depth, and pressure with a scoring die on both sides thereof in order to form a double score hinge. The pressed double scores are formed at a 60° angle to the direction of the fibers and have a rectangular profile. The formed hinges allow bending of the sheets in either direction.

EXAMPLE 93

An inorganically filled mixture is made having the following components:

| | |
|---|---|
| Gypsum hemihydrate | 1.0 kg |
| Perlite | 0.5 kg |
| Tylose® | 0.075 kg |
| Fiber | 0.25 kg |
| Water | 2.6 kg |

The gypsum, Tylose®, fiber, and water are mixed together in a high shear mixer for 3 minutes, after which the perlite is added and mixed in a low shear mixer for an additional 3 minutes.

The mixture is extruded into a sheet having a thickness of 6 mm and then calendered in order to reduce the thickness of the sheet in steps to yield a sheet having a final thickness ranging between 0.25 mm to 0.5 mm. The sheet is pressed in the wet state on one side thereof with multiple scores having rounded profiles to form a hinge therein. These multiple score hinges provide increased bending of the sheets compared to sheets with a single score hinge.

The sheet is readily formed into food or beverage containers using any appropriate procedure set forth in this Specification. The strength properties are comparable to containers made using other mixtures and may be useful in the place of, e.g., paper, paperboard, or polystyrene containers.

EXAMPLE 94

Any of the inorganically filled mix designs set forth in the examples is altered to include about 25% gypsum hemihydrate by weight of the aggregate. The gypsum acts as a water absorbing component (or internal drying agent) and results in quicker form stability. The strength properties of containers formed therefrom are comparable to mixtures not including gypsum.

EXAMPLE 95

Any of the inorganically filled mix designs set forth in the examples is altered to include about 25% portland cement by weight of the aggregate. The portland cement acts as a water absorbing component (or internal drying agent) and results in quicker form stability. In addition, the portland cement improves the internal cohesiveness of the moldable mixture, which improves the workability and form stability of the mixture. The portland cement improves the strength and increases the stiffness of the final hardened product. The portland cement also reduces the flexibility of the product to some degree.

EXAMPLE 96

Highly inorganically filled sheets were prepared and then coated with an external sizing to determine the effect, if any, on the strength and other properties of the sheets. The sheets were formed by extruding, and then passing between a pair of rollers, a moldable mixture containing the following:

| | |
|---|---|
| Calcium Carbonate | 1.0 kg |
| Hollow Glass Spheres | 0.5 kg |
| Southern Pine Fibers | 0.4 kg |
| Tylose® FL 15002 | 0.4 kg |
| Water | 2.1 kg |

A hardened sheet (Sheet 1) formed therefrom and having a thickness of 1 mm had a tensile strength of 18.48 MPa, a modulus of 1863 MPa, and an elongation before failure of 2.42%. Sheet 1 was then "sized" (or coated in order to seal the pores of the sheet) using an aqueous starch solution. The resulting sized sheet had a tensile strength of 21.83 MPa, a modulus of 2198 MPa, and an elongation before failure of 2.02%. This shows that a starch sizing increases the tensile strength and stiffness of an inorganically filled sheet.

A second hardened sheet formed from the above moldable mixture (Sheet 2) was found to have a tensile strength of 21.21 MPa, a modulus of 2120 MPa, and an elongation before failure of 3.22%. Sheet 2 was then sized using an aqueous latex-kaolin sizing (70% loading). The sized sheet had a tensile strength of 18.59 MPa, a modulus of 3305 MPa, and an elongation before failure of 2.13%. This shows that a latex-kaolin sizing decreases the tensile strength while increasing the stiffness of an inorganically filled sheet. This coating reduced the water absorption of the sheet to a more significant degree than the starch coating.

Another of Sheet 2 was instead sized using a latex-kaolin-starch (70% loading) sizing. The sized sheet had a tensile strength of 15.31 MPa, a modulus of 3954 MPa, and an elongation before failure of 1.28%. This shows that a kaolin-latex-starch sizing decreases the tensile strength while increasing the stiffness of an inorganically filled sheet to a greater degree than a latex-kaolin sizing.

A third hardened sheet formed from the above moldable mixture (Sheet 3) was found to have a tensile strength of 11.11 MPa, a modulus of 1380 MPa, and an elongation before failure of 1.86%. Sheet 3 was then sized using a latex-kaolin sizing (50% loading), yielding a sized sheet having a tensile strength of 10.78 MPa, a modulus of 2164 MPa, and an elongation before failure of 1.62%. This sizing material slightly decreases the tensile strength while moderately increasing the stiffness of the sheet.

Another of Sheet 3 was instead sized using a latex-kaolin-starch sizing (50% loading), yielding a sheet having a tensile strength of 10.86 MPa, a modulus of 1934 MPa, and an elongation before failure of 1.15%. This sizing material slightly decreases the tensile strength while increasing the stiffness of the sheet.

The sheets of Examples 96 are score cut when dry using a knife blade cutter to form hinges therein. The score cut has a triangular profile and results in the material below the score forming the hinges having a thickness of 0.1 mm. The hinges allow the sheets to be formed into a variety of containers.

EXAMPLE 97

Highly inorganically filled sheets were formed by extruding and then passing between a pair of rollers a moldable mixture having the following components:

|  |  | Specific Gravity | Volume |
|---|---|---|---|
| Calcium Carbonate | 0.5 kg | 2.5 | 20% |
| Southern Pine Fibers | 0.5 kg | 1.29 | 38.8% |
| Tylose ® FL 15002 | 0.3 kg | 1.22 | 24.6% |
| Water | 1.0 kg | 1.0 | 16% |
| Total Solids |  |  | 83.4% |

The volume of the fibers with respect to the total solids volume was 46.5%. The sheets formed in this example were found to have a tensile strength of 56 MPa.

The sheets of Example 97 are pressed while in the wet state with multiple scores having a rectangular profile on one side of the sheets to form a hinge therein. The scores are pressed into the sheets at a 20° angle from the direction of the fibers in the sheets. The hinges allow the sheets to be formed into a variety of containers.

The sheets can be rolled onto a spool much like paper and can be used thereafter much like paper. For example, the rolled paper is later formed into a variety of objects such as a box, french fry carton, etc. In order to fold the sheet it is preferable to score the sheet first, and then fold the sheet along the score.

EXAMPLE 98

The mix design and sheet forming process of Example 97 are repeated in every respect except that some of the calcium carbonate is replaced with calcium oxide. This creates a binding effect as the calcium oxide is converted to calcium carbonate through the reaction with carbon dioxide and water.

EXAMPLE 99

Waste inorganically filled containers were composted along with waste food. After 4 weeks, the containers were completely broken down and resulted in compost that substantially resembled potting soil.

EXAMPLE 100

Using any of the foregoing compositions set forth in the above examples, an inorganically filled sheet is formed, scored and then fashioned into the shape of a carton. Depending on the composition, the carton will exhibit high strength, durability, flexibility, low weight, and/or low density.

EXAMPLE 101

Using any of the foregoing compositions set forth in the above examples, an inorganically filled sheet is formed and then fashioned into the shape of a box. This may be carried out by extrusion, and/or calendering, and/or score cutting, and/or folding. Depending on the composition, the box will exhibit high strength, durability, flexibility, low weight, and/or low density.

EXAMPLE 102

Using any of the foregoing compositions set forth in the above examples, inorganically filled sheets are formed, scored to produce hinges therein, and made into food or beverage containers using any appropriate procedure set forth in this Specification.

As more fiber is added, the inorganically filled material has greater flexibility and toughness, which make the material more suitable for making a fold or bend therein. The added fibers make the hardened sheets suitable to make a hinge, such as by scoring the sheets with single, double or multiple scores, which allow the sheets to be bent.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An article of manufacture comprising a first member hingedly attached to a second member by a hinge, at least a substantial portion of said hinge comprising an inorganically filled matrix including a substantially homogeneous mixture of organic binder and inorganic aggregate, said organic binder being selected from the group consisting of polysaccharides, proteins, and mixture or derivatives thereof, said inorganic aggregate having a concentration in a range from about 40% to about 95% by weight of total solids in the matrix, the inorganically filled matrix further including a fibrous material substantially homogeneously dispersed throughout said matrix.

2. An article of manufacture as defined in claim 1, further including a coating material on a surface of said inorganically filled matrix of said hinge.

3. An article of manufacture as defined in claim 2, wherein said coating material renders said inorganically filled matrix more resistant to water penetration.

4. An article of manufacture as defined in claim 2, wherein said coating material renders said inorganically filled matrix more flexible.

5. An article of manufacture as defined in claim 2, wherein said coating material is safe for use with food or beverages.

6. An article of manufacture as defined in claim 2, wherein said coating material comprises a biodegradable material.

7. An article of manufacture as defined in claim 2, wherein said coating material is selected from the group consisting of melamine, polyvinyl chloride, polyvinyl alcohol, polyvinyl acetate, polyacrylates, hydroxypropylmethylcellulose, polyethylene glycol, acrylics, polyurethane, polylactic acid, starch, soy bean protein, polyethylene, synthetic polymers, waxes, elastomers, edible oils, and mixtures or derivatives thereof.

8. An article of manufacture as defined in claim 2, wherein said coating material is selected from the group consisting of sodium silicate, calcium carbonate, kaolin, silicon oxide, aluminum oxide, ceramic, and mixtures thereof.

9. An article of manufacture as defined in claim 1, wherein said inorganically filled matrix of said hinge further includes a pulp-containing material disposed thereon.

10. An article of manufacture as defined in claim 9, wherein said pulp-containing material is a paper strip.

11. An article of manufacture as defined in claim 1, wherein said first and second members have a mechanical resistance to bending and elongation within a first range and wherein said hinge comprises an area of reduced mechanical resistance to bending and elongation within a second range that is less than the first range of mechanical resistance.

12. An article of manufacture as defined in claim 1, wherein said first and second members have a thickness within a first range and wherein said hinge comprises an area of reduced thickness within a second range that is less than the first range of thickness.

13. An article of manufacture as defined in claim 1, wherein each of said first and second member comprises an inorganically filled matrix comprising a substantially homogenous mixture of a water-dispersible organic binder and an aggregate material.

14. An article of manufacture as defined in claim 1, wherein said inorganically filled matrix of said hinge has a thickness in a range from about 0.01 mm to about 1 mm.

15. An article of manufacture as defined in claim 1, wherein said hinge is a living hinge.

16. An article of manufacture as defined in claim 1, wherein said inorganically filled matrix of said hinge has a thickness in a range from about 0.05 mm to about 0.5 min.

17. An article of manufacture as defined in claim 1, wherein said inorganic aggregate has a concentration in a range from about 50% to about 95% by volume of total solids in said matrix.

18. An article of manufacture as defined in claim 1, wherein said inorganic aggregate has a concentration in a range from about 60% to about 80% by volume of total solids in said matrix.

19. An article of manufacture as defined in claim 1, wherein said inorganic aggregate comprises a lightweight aggregate selected from the group consisting of perlite, vermiculite, hollow glass spheres, porous ceramic spheres, lightweight expanded geologic materials, pumice, and mixtures thereof.

20. An article of manufacture as defined in claim 1, wherein said inorganic aggregate is selected from the group consisting of clay, gypsum, calcium carbonate, mica, silica, alumina, sand, gravel, sandstone, limestone, and mixtures thereof.

21. An article of manufacture as defined in claim 1, wherein said inorganically filled matrix further includes an organic aggregate selected from the group consisting of cork, seeds, starches, gelatins, agar materials, and mixtures thereof.

22. An article of manufacture as defined in claim 1, wherein said inorganic aggregate comprises a polymerized silicate.

23. An article of manufacture as defined in claim 1, wherein said organic binder has a concentration in a range from about 1% to about 50% by volume of total solids in said inorganically filled matrix.

24. An article of manufacture as defined in claim 1, wherein said organic binder has a concentration in a range from about 2% to about 30% by volume of total solids in said inorganically filled matrix.

25. An article of manufacture as defined in claim 1, wherein said organic binder has a concentration in a range from about 5% to about 20% by volume of total solids in said inorganically filled matrix.

26. An article of manufacture as defined in claim 1, wherein said organic binder comprises a cellulosic ether selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures or derivatives thereof.

27. An article of manufacture as defined in claim 1, wherein said organic binder comprises a starch or derivative thereof selected from the group consisting of amylopectin, amylose, seagel, starch acetates, starch hydroxyethyl ethers, ionic starches, long-chain alkylstarches, dextrins, amine starches, phosphate starches, dialdehyde starches, and mixtures or derivatives thereof.

28. An article of manufacture as defined in claim 1, wherein said organic binder comprises a protein or derivative thereof selected from the group consisting of prolamine, collagen, gelatin, glue, casein, and mixtures or derivatives thereof.

29. An article of manufacture as defined in claim 1, wherein said organic binder is selected from the group consisting of alginic acid, phycocolloids, agar, gum arabic, guar gum, locust bean gum, gum karaya, gum tragacanth, and mixtures or derivatives thereof.

30. An article of manufacture as defined in claim 1, wherein said inorganically filled matrix further includes a synthetic organic polymer selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, polylactic acid, ethylene oxide polymers, synthetic clay, latex, and mixtures or derivatives thereof.

31. An article of manufacture as defined in claim 1, wherein said fibrous material has a concentration in a range from about 0.5% to about 50% by volume of total solids in said inorganically filled matrix.

32. An article of manufacture as defined in claim 1, wherein said fibrous material has a concentration in a range from about 2% to about 30% by volume of total solids in said inorganically filled matrix.

33. An article of manufacture as defined in claim 1, wherein said fibrous material has a concentration in a range from about 5% to about 20% by volume of total solids in said inorganically filled matrix.

34. An article of manufacture as defined in claim 1, wherein said fibrous material comprises organic fibers.

35. An article of manufacture as defined in claim 34, wherein said organic fibers are selected from the group consisting of hemp, cotton, bagasse, abaca, flax, southern pine, southern hardwood fibers, and mixtures thereof.

36. An article of manufacture as defined in claim 1, wherein said fibrous material comprises inorganic fibers.

37. An article of manufacture as defined in claim 36, wherein said inorganic fibers are selected from the group consisting of glass fibers, silica fibers, ceramic fibers, carbon fibers, metal fibers, and mixtures thereof.

38. An article of manufacture as defined in claim 1, wherein said fibrous material includes individual fibers having an aspect ratio greater than about 10:1.

39. An article of manufacture as defined in claim 1, wherein said fibrous material includes individual fibers having an average aspect ratio greater than about 100:1.

40. An article of manufacture as defined in claim 1, wherein said fibrous material comprises individual fibers having a substantially random orientation within said inorganically filled matrix.

41. An article of manufacture as defined in claim 1, wherein said fibrous material comprises individual fibers having a substantially unidirectional orientation within said inorganically filled matrix.

42. An article of manufacture as defined in claim 1, wherein said hinge is formed at least in part by cutting a score in said inorganically filled matrix.

43. An article of manufacture as defined in claim 1, wherein said hinge is formed at least in part by pressing a score in said inorganically filled matrix.

44. An article of manufacture as defined in claim 1, wherein said hinge may be bent up to an angle of about 90° without substantial fracture of said inorganically filled matrix.

45. An article of manufacture as defined in claim 1, wherein said hinge may be bent up to an angle of about 180° without substantial fracture of said inorganically filled matrix.

46. A container comprising a first member hingedly attached to a second member by a hinge, at least a substantial portion of said hinge comprising an inorganically filled matrix including a substantially homogeneous mixture of organic binder and inorganic aggregate, said organic binder being selected from the group consisting of polysaccharides, proteins, and mixtures or derivatives thereof, said inorganic aggregate having a concentration in a range from about 40% to about 95% by weight of total solids in said matrix, said inorganically filled matrix further including a fibrous material substantially homogeneously dispersed throughout said matrix.

47. A container as defined in claim 46, wherein said first and second members have a mechanical resistance to bending and elongation within a first range and wherein said hinge comprises an area of reduced mechanical resistance to bending and elongation within a second range that is less than the first range of mechanical resistance.

48. A container as defined in claim 46, wherein said first and second members have a thickness within a first range and wherein said hinge comprises an area of reduced thickness within a second range that is less than the first range of thickness.

49. A container as defined in claim 46, wherein said inorganically filled matrix of said hinge has a thickness in a range from about 0.01 mm to about 1 mm.

50. An article of manufacture as defined in claim 46, wherein said inorganically filled matrix of said hinge further includes a pulp-containing material disposed thereon.

51. An article of manufacture as defined in claim 50, wherein said pulp-containing material is a paper strip.

52. A container as defined in claim 46, further including a coating material on at least a portion of a surface of said inorganically filled matrix.

53. A container as defined in claim 52, wherein said coating material selected from the group consisting of melamine, polyvinylchloride, polyvinylalcohol, polyvinyl acetate, polyacrylates, hydroxypropylmethylcellulose, polyethyleneglycol, acrylics, polyurethane, polylactic acid, starch, soybean protein, polyethylene, synthetic polymers, waxes, elastomers, edible oils, and mixtures or derivatives thereof.

54. A container as defined in claim 52, wherein said coming material is selected from the group consisting of sodium silicate, calcium carbonate, kaoline, silicone oxide, aluminum oxide, ceramic, and mixtures thereof.

55. A container as defined in claim 46, wherein each of said first and second members comprises an inorganically filled matrix comprising a substantially homogeneous mixture of a water-dispersible organic binder and an organic material.

56. A container as defined in claim 46, wherein said hinge is a living hinge.

57. A container as defined in claim 46, wherein said inorganic aggregate has a concentration in a range from about 50% to about 95% by volume of total solids in said matrix.

58. A container as defined in claim 46, wherein said inorganic aggregate has a concentration in range from about 60% to about 80% by volume of total solids in said matrix.

59. A container as defined in claim 46, wherein said inorganic aggregate comprises a lightweight aggregate selected from a group consisting of perlite, vermiculite, hollow glass spheres, porous ceramic spheres, lightweight expanded geologically materials, pumice, and mixtures thereof.

60. A container as defined in claim 46, wherein said inorganic aggregate is selected from a group consisting of clay, gypsum, calcium carbonate, mica, silica, alumina, sand, gravel, sandstone, limestone, and mixtures thereof.

61. A container as defined in claim 46, wherein said organic binder has a concentration in a range from about 1% to about 5.0% percent by volume of total solids in said inorganically filled matrix.

62. A container as defined in claim 46, wherein said organic binder has a concentration in a range from about 2% to about 30% by volume of total solids in said inorganically filled matrix.

63. A container as defined in claim 46, wherein said organic binder has a concentration in a range from about 5% to about 20% by volume of total solids in said inorganically filled matrix.

64. A container as defined in claim 46, wherein said organic binder comprises cellulosic ether selected from a group of methylhydroxylethylcellulose, hydroxymethylethylcellulose, carboxymethylcellulose, methylcellulose, ethylcellulose, hydroxyethylcellulose, hydroxyethylpropylcellulose, and mixtures or derivative thereof.

65. A container as defined in claim 46, wherein said organic binder comprises a starch selected from the group consisting of amylopectin, amylose, sea gel, starch acetates, starch hydroxyethylethers, ionic starches, long-chain alkyl starches, dextrins, amine starches, phosphate starches, dialdehyde starches, and mixtures or derivatives thereof.

66. A container as defined in claim 46, wherein said organic binder comprises a protein selected from the group consisting of prolamine, collagen, gelatin, glue, casein, and mixtures or derivatives thereof.

67. A container as defined in claim 46, wherein said organic binder is selected from the group consisting of alginic acid, phycocolloids, agar, gum arabic, guar gum, locust bean gum, gum karaya, gum tragacanth, and mixtures or derivatives thereof.

68. A container as defined in claim 46, wherein said fibrous material has a concentration in a range from about 0.5% to about 50% by volume of total solids in said inorganically filled matrix.

69. A container as defined in claim 46, wherein said fibrous material has a concentration in a range from about 2% to about 30% by volume of total solids in said inorganically filled matrix.

70. A container as defined in claim 46, wherein said fibrous material has a concentration in a range from about 5% to about 20% by volume of total solids in said inorganically filled matrix.

71. A container as defined in claim 46, wherein said fibrous material comprises organic fibers.

72. A container as defined in claim 71, wherein said organic fibers are selected from the group consisting of hemp, cotton, bagasse, abaca, flax, southern pine, southern hardwood fibers, and mixtures thereof.

73. A container as defined in claim 46, wherein said fibrous material comprises inorganic fibers.

74. A container as defined in claim 73, wherein said inorganic fibers are selected from the group consisting of glass, fibers, silica fibers, ceramic fibers, carbon fibers, metal fibers, and mixtures thereof.

75. A container as defined in claim 46, wherein said fibrous material includes individual fibers having an aspect ratio greater than about 10:1.

76. A container as defined in claim 46, wherein said hinge is formed at least in part by pressing a score in said inorganically filled matrix.

77. An article of manufacture comprising a first member hingedly attached to a second member by a hinge, at least a substantial portion of said hinge comprising an inorganically filled matrix including a substantially homogeneous mixture of organic binder and inorganic aggregate, said inorganically filled matrix being formed by removing a substantial quantity of water by evaporation from an inorganically filled mixture comprising an organic binder selected from the group consisting of polysaccharides, proteins, and mixtures or derivatives thereof, water, an inorganic aggregate material having a concentration in a range from about 40% to about 95% by weight of total solids in said mixture, and fibers substantially homogeneously dispersed throughout said mixture.

78. An article of manufacture as defined in claim 77, further including a coating material on at least a portion of a surface of said inorganically filled matrix.

79. An article of manufacture as defined in claim 78, wherein said coating material selected from the group consisting of melamine, polyvinylchloride, polyvinylalcohol, polyvinyl acetate, polyacrylates, hydroxypropylmethylcellulose, polyethyleneglycol, acrylics, polyurethane, polylactic acid, starch, soybean protein, polyethylene, synthetic polymers, waxes, elastomers, edible oils, and mixtures or derivatives thereof.

80. An article of manufacture as defined in claim 78, wherein said coating material is selected from the group consisting of sodium silicate, calcium carbonate, kaoline, silicone oxide, aluminum oxide, ceramic, and mixtures thereof.

81. An article of manufacture as defined in claim 77, wherein each of said first and second members comprises an inorganically filled matrix comprising a substantially homogeneous mixture of a water-dispersible organic binder and an organic material.

82. An article of manufacture as defined in claim 77, wherein said hinge is a living hinge.

83. An article of manufacture as defined in claim 77, wherein said inorganic aggregate has a concentration in range from about 50% to about 95% by volume of total solids in said mixture.

84. An article of manufacture as defined in claim 77, wherein said inorganic aggregate has a concentration in range from about 60% to about 80% by volume of total solids in said mixture.

85. An article of manufacture as defined in claim 77, wherein said inorganic aggregate comprises a lightweight aggregate selected from a group consisting of perlite, vermiculite, hollow glass spheres, porous ceramic spheres, lightweight expanded geologically materials, pumice, and mixtures thereof.

86. An article of manufacture as defined in claim 77, wherein said inorganic aggregate is selected from a group consisting of clay, gypsum, calcium carbonate, mica, silica, alumina, sand, gravel, sandstone, limestone, and mixtures thereof.

87. An article of manufacture as defined in claim 77, wherein said organic binder has a concentration in a range from about 1% to about 50% percent by volume of total solids in said inorganically filled mixture.

88. An article of manufacture as defined in claim 77, wherein said organic binder has a concentration in a range from about 2% to about 30% by volume of total solids in said inorganically filled mixture.

89. An article of manufacture as defined in claim 77, wherein said organic binder has a concentration in a range from about 5% to about 20% by volume of total solids in said inorganically filled mixture.

90. An article of manufacture as defined in claim 77, wherein said organic binder comprises cellulosic ether selected from a group of methylhydroxylethylcellulose, hydroxymethylethylcellulose, carboxymethylcellulose, methylcellulose, ethylcellulose, hydroxyethylcellulose, hydroxyethylpropylcellulose, and mixtures or derivative thereof.

91. An article of manufacture as defined in claim 77, wherein said organic binder comprises a starch selected from the group consisting of amylopectin, amylose, sea gel, starch acetates, starch hydroxyethylethers, ionic starches, long-chain alkyl starches, dextrins, amine starches, phosphate starches, dialdehyde starches, and mixtures or derivatives thereof.

92. An article of manufacture as defined in claim 77, wherein said organic binder comprises a protein selected from the group consisting of prolamine, collagen, gelatin, glue, casein, and mixtures or derivatives thereof.

93. An article of manufacture as defined in claim 77, wherein said organic binder is selected from the group consisting of alginic acid, phycocolloids, agar, gum arabic, guar gum, locust bean gum, gum karaya, gum tragacanth, and mixtures or derivatives thereof.

94. An article of manufacture as defined in claim 77, wherein said fibers have a concentration in a range from about 0.5% to about 50% by volume of total solids in said inorganically filled mixture.

95. An article of manufacture as defined in claim 77, wherein said fibers have a concentration in a range from about 2% to about 30% by volume of total solids in said inorganically filled mixture.

96. An article of manufacture as defined in claim 77, wherein said fibers have a concentration in a range from about 5% to about 20% by volume of total solids in said inorganically filled mixture.

97. An article of manufacture as defined in claim 77, wherein said fibers comprise organic fibers.

98. An article of manufacture as defined in claim 97, wherein said organic fibers are selected from the group consisting of hemp, cotton, bagasse, abaca, flax, southern pine, southern hardwood fibers, and mixtures thereof.

99. An article of manufacture as defined in claim 77, wherein said fibers comprise inorganic fibers.

100. An article of manufacture as defined in claim 99, wherein said inorganic fibers are selected from the group consisting of glass, fibers, silica fibers, ceramic fibers, carbon fibers, metal fibers, and mixtures thereof.

101. An article of manufacture as defined in claim 77, wherein said fibers have an aspect ratio greater than about 10:1.

102. An article of manufacture as defined in claim 77, wherein said hinge is formed at least in part by pressing a score in said inorganically filled matrix.

103. An article of manufacture as defined in claim 77, wherein said inorganically filled matrix of said hinge further includes a pulp-containing material disposed thereon.

104. An article of manufacture as defined in claim 103, wherein said pulp-containing material comprises a paper strip.

* * * * *

UNITED STATES PATENT AND TRADEMARK OFFICE
CERTIFICATE OF CORRECTION

PATENT NO. : 5,631,053
DATED : May 20, 1997
INVENTOR(S) : Per J. Andersen, et. al.

It is certified that error appears in the above-identified patent and that said Letters Patent is hereby corrected as shown below:

Col. 16, line 9, "more; the" should be --more, the--

Col. 25, line 24, "wettability" should be --wetability--

Col. 30, line 4, "theology-modifying" should be --rheology-modifying--

Col. 51, line 49, "theology" should be --rheology--

Col. 55, line 13, "theology" should be --rheology--

Col. 65, line 22, "of 0.1" should be --of 0.1 mm.--

Col. 68, lines 63-64 "additional minutes" should be --additional 6 minutes--

Col. 69, line 19, "35+angle" should be --35° angle--

Col. 81, line 54, "coming" should be --coating--

Signed and Sealed this

Tenth Day of February, 1998

Attest:

BRUCE LEHMAN

*Attesting Officer*  *Commissioner of Patents and Trademarks*